June 6, 1967  S. A. BLACK ETAL  3,323,970
AUTOMATIC TIRE CARCASS BUILDING APPARATUS
Original Filed Dec. 4, 1962   73 Sheets-Sheet 39

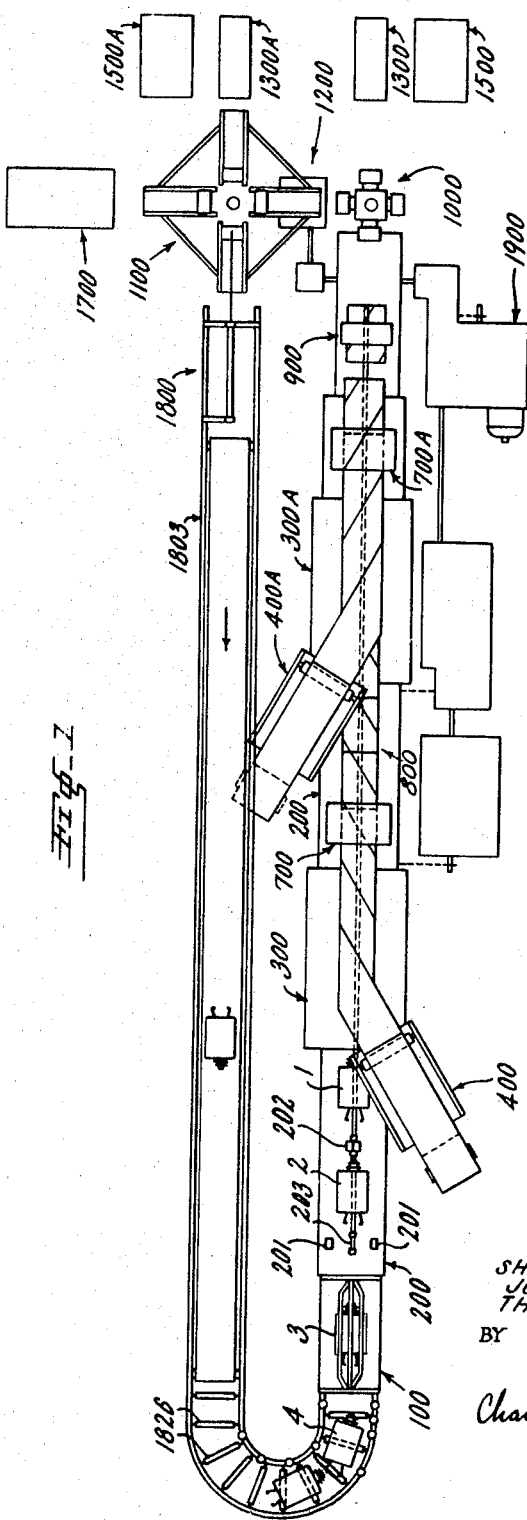

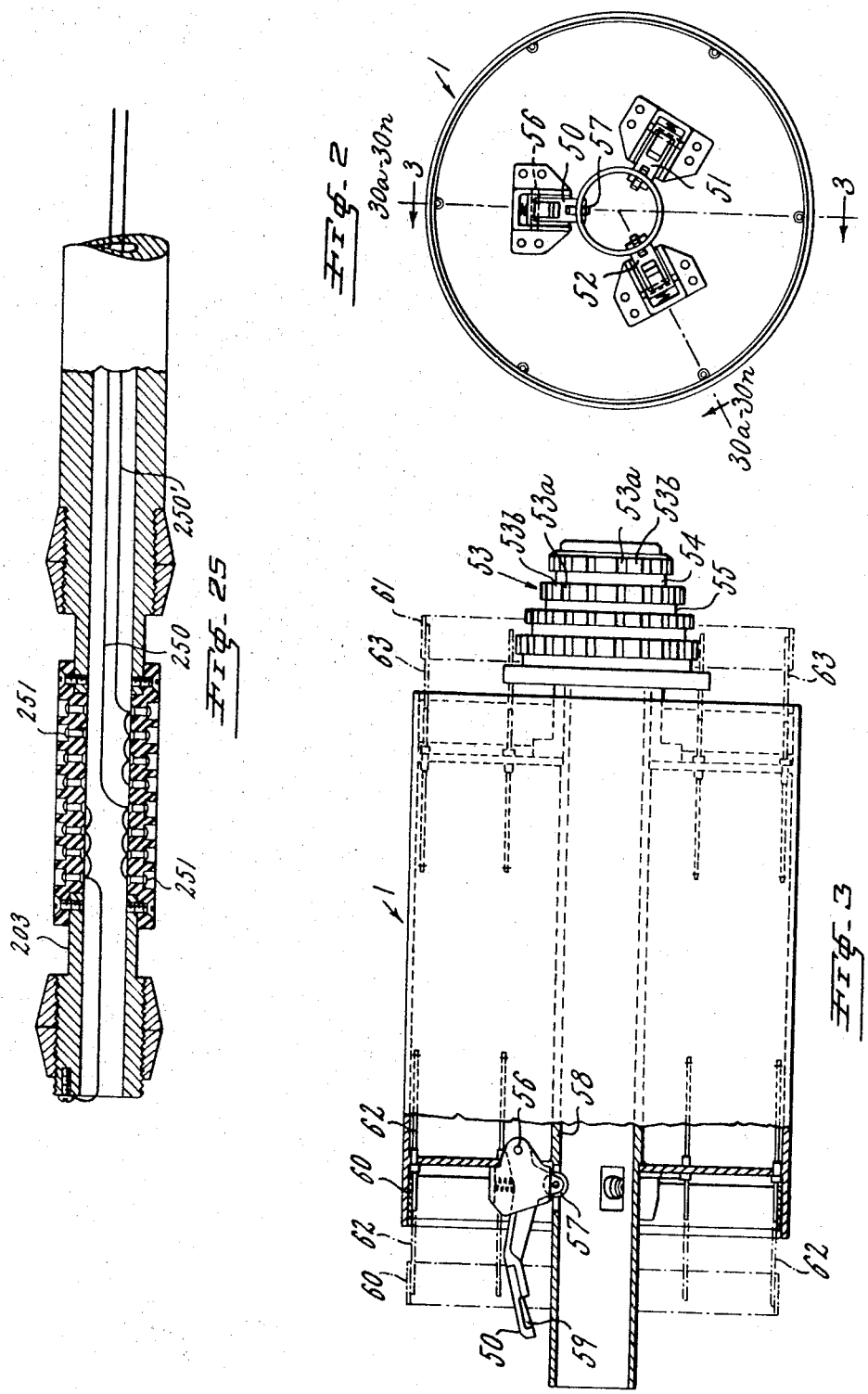

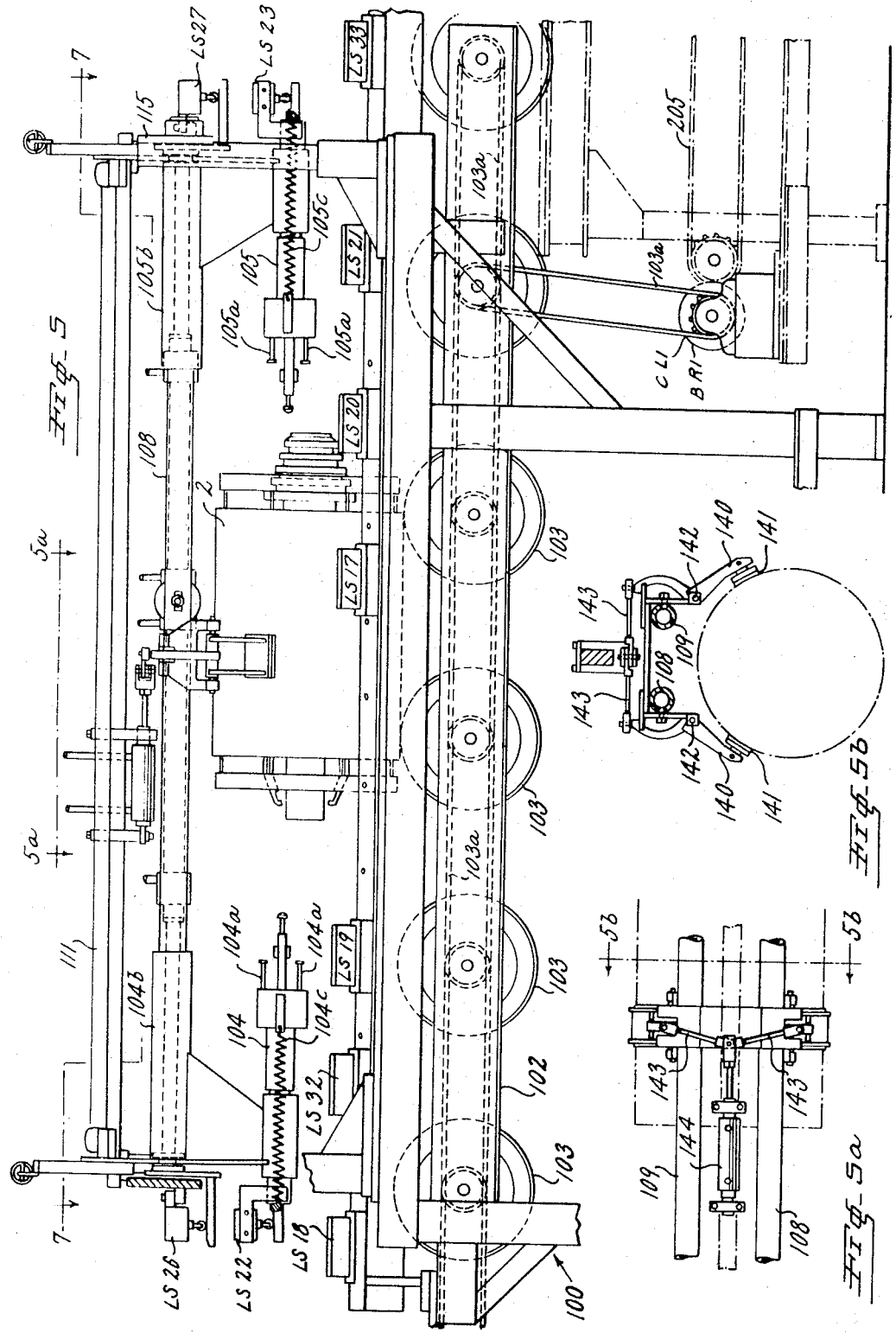

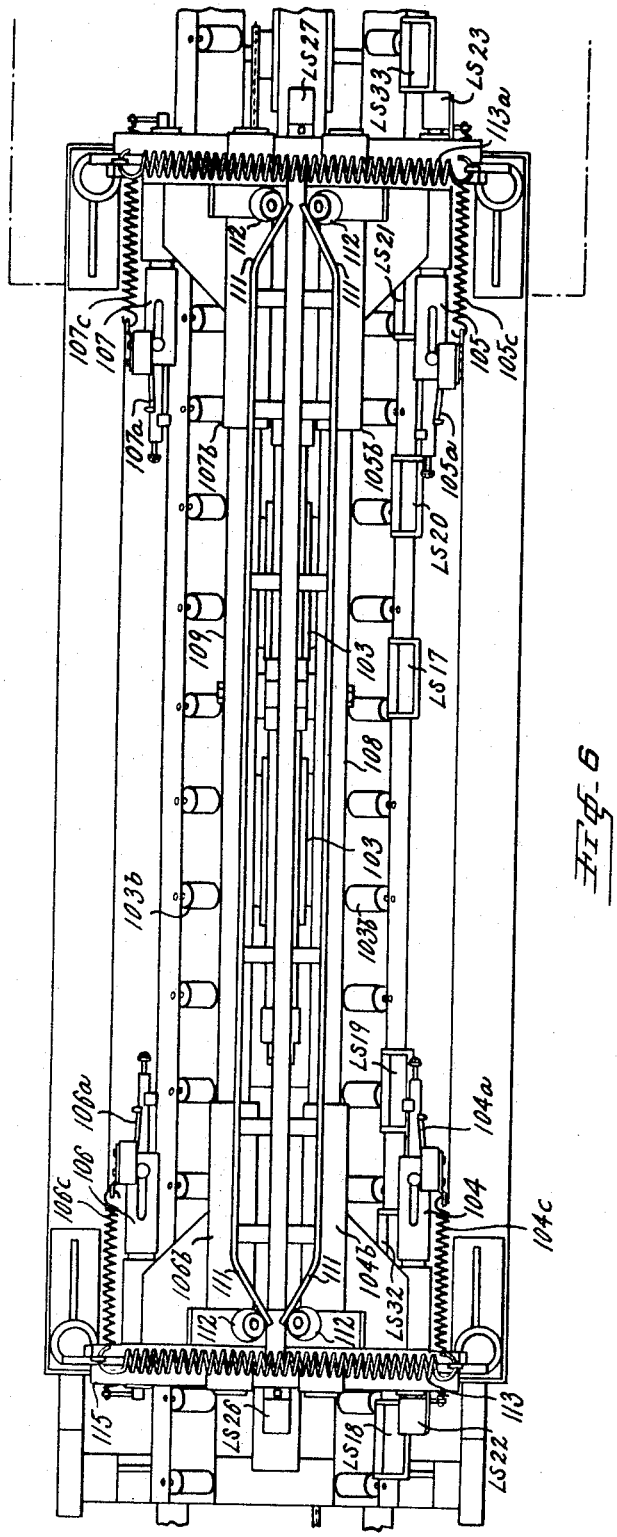

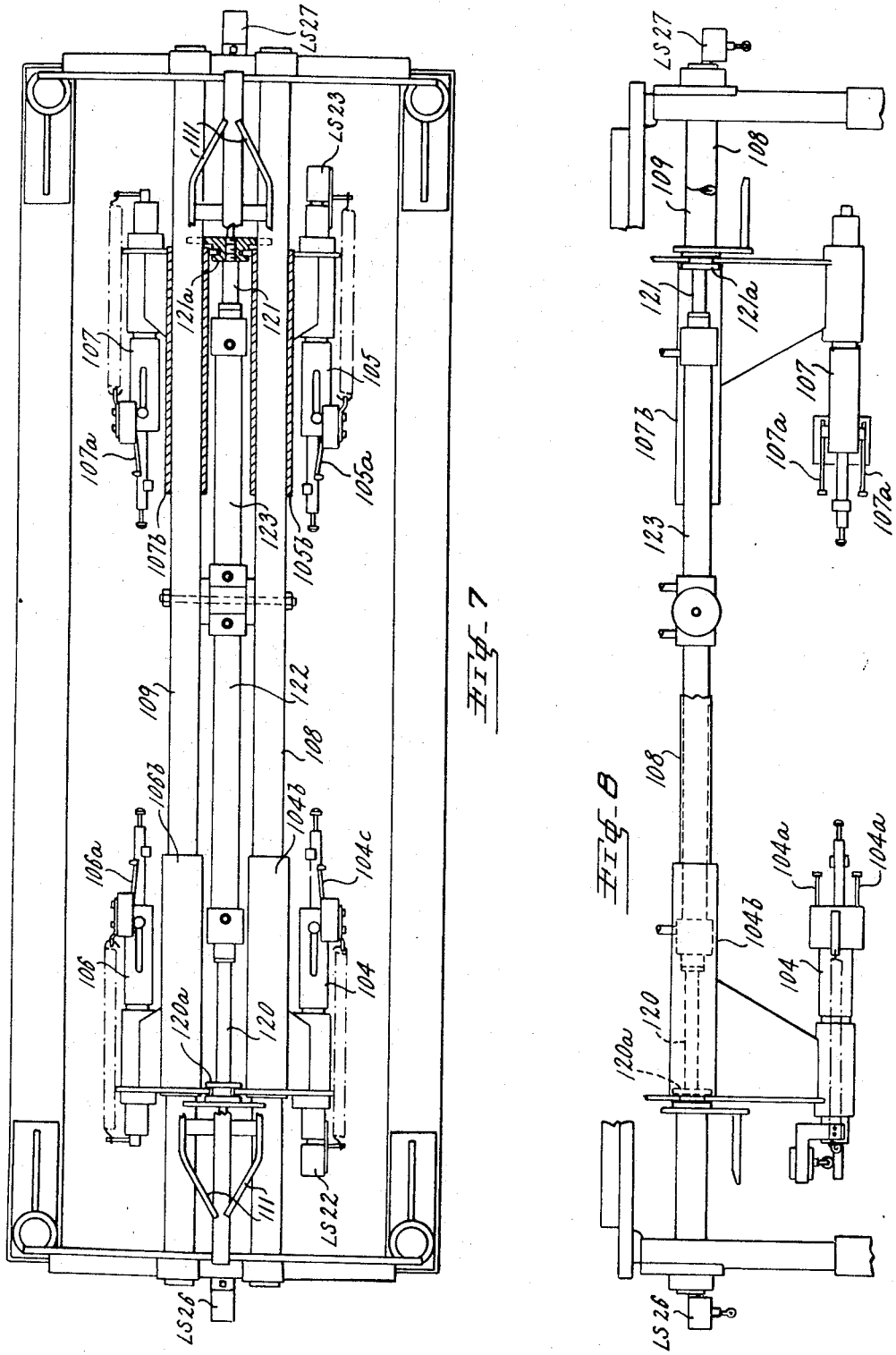

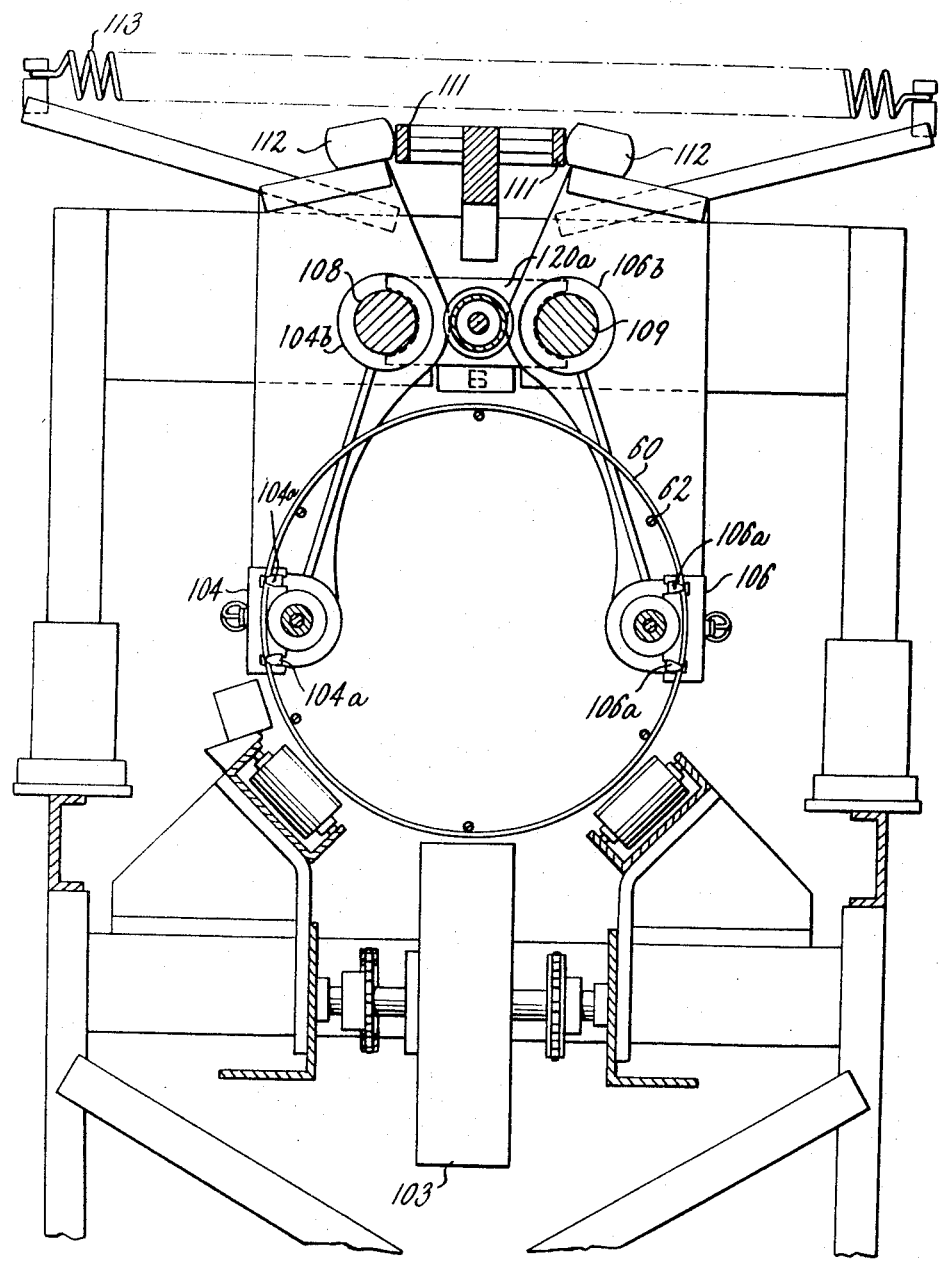

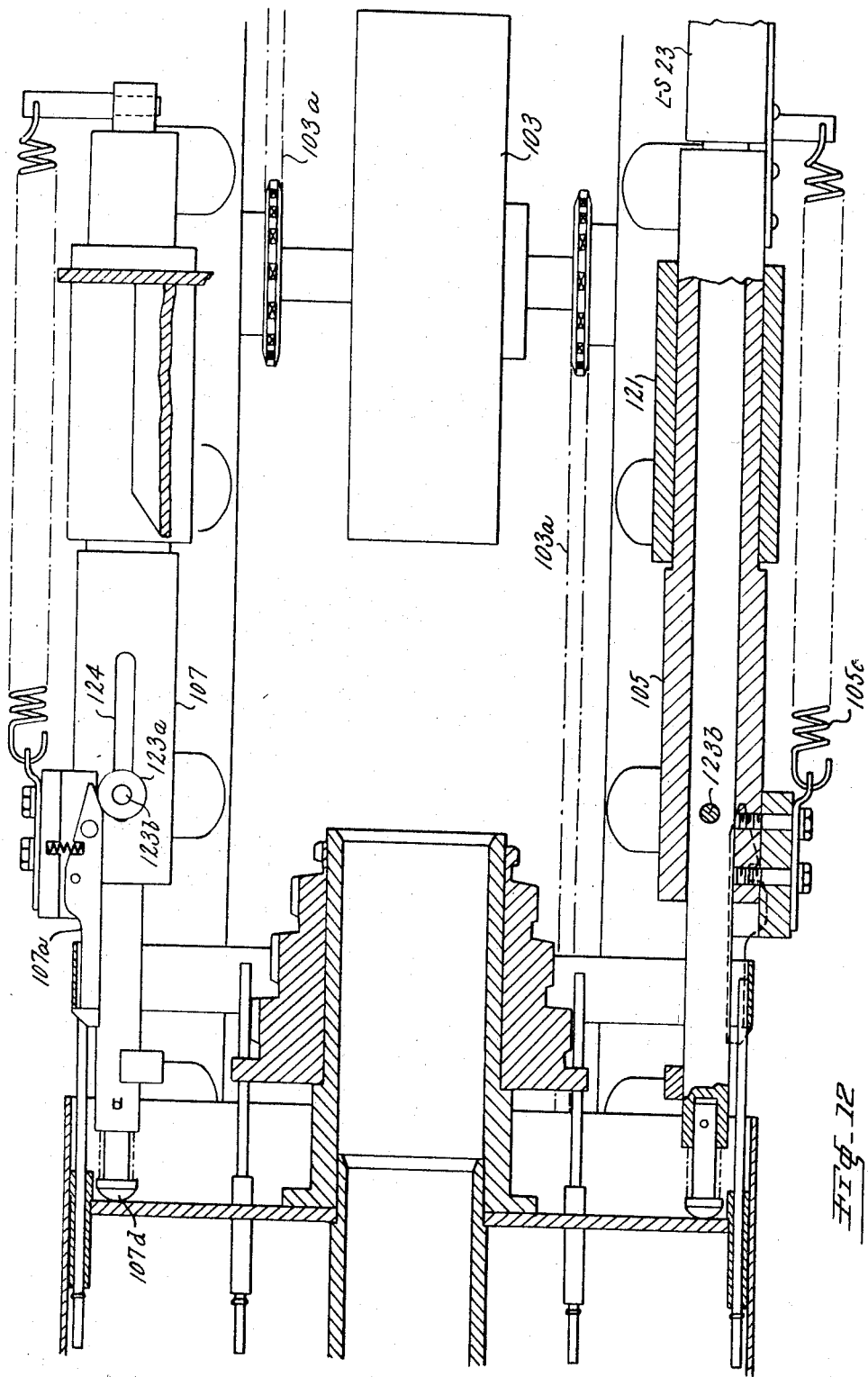

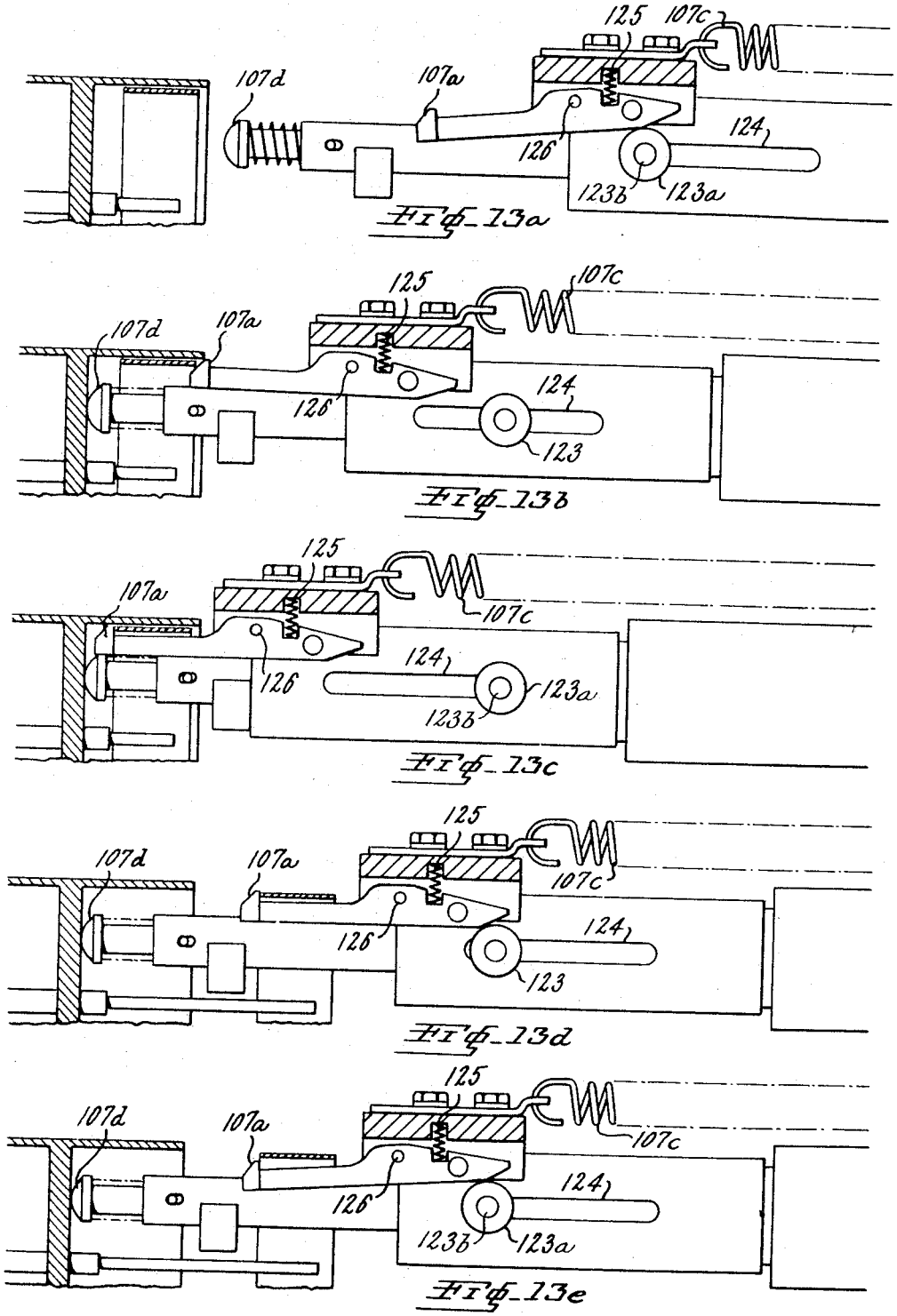

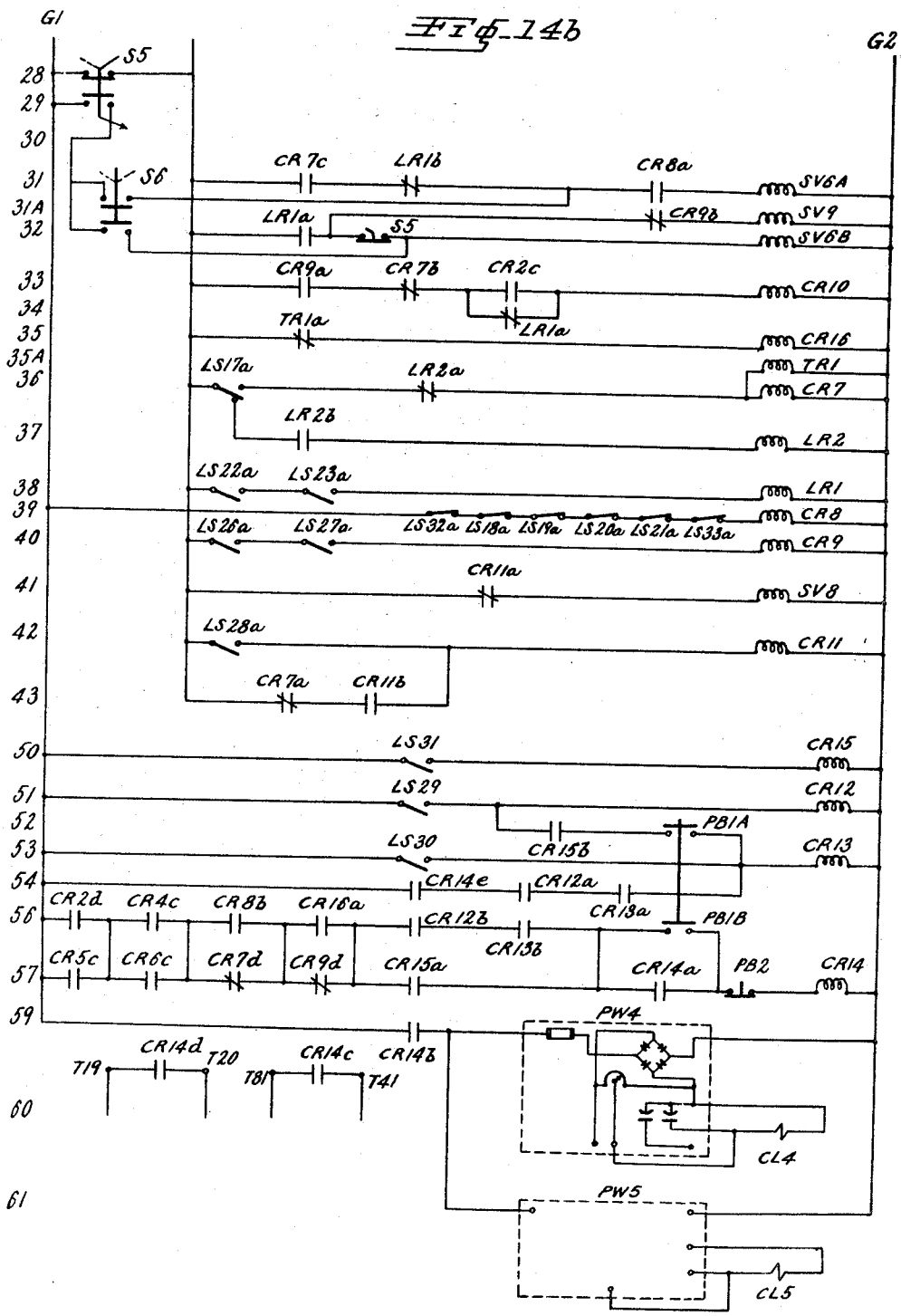

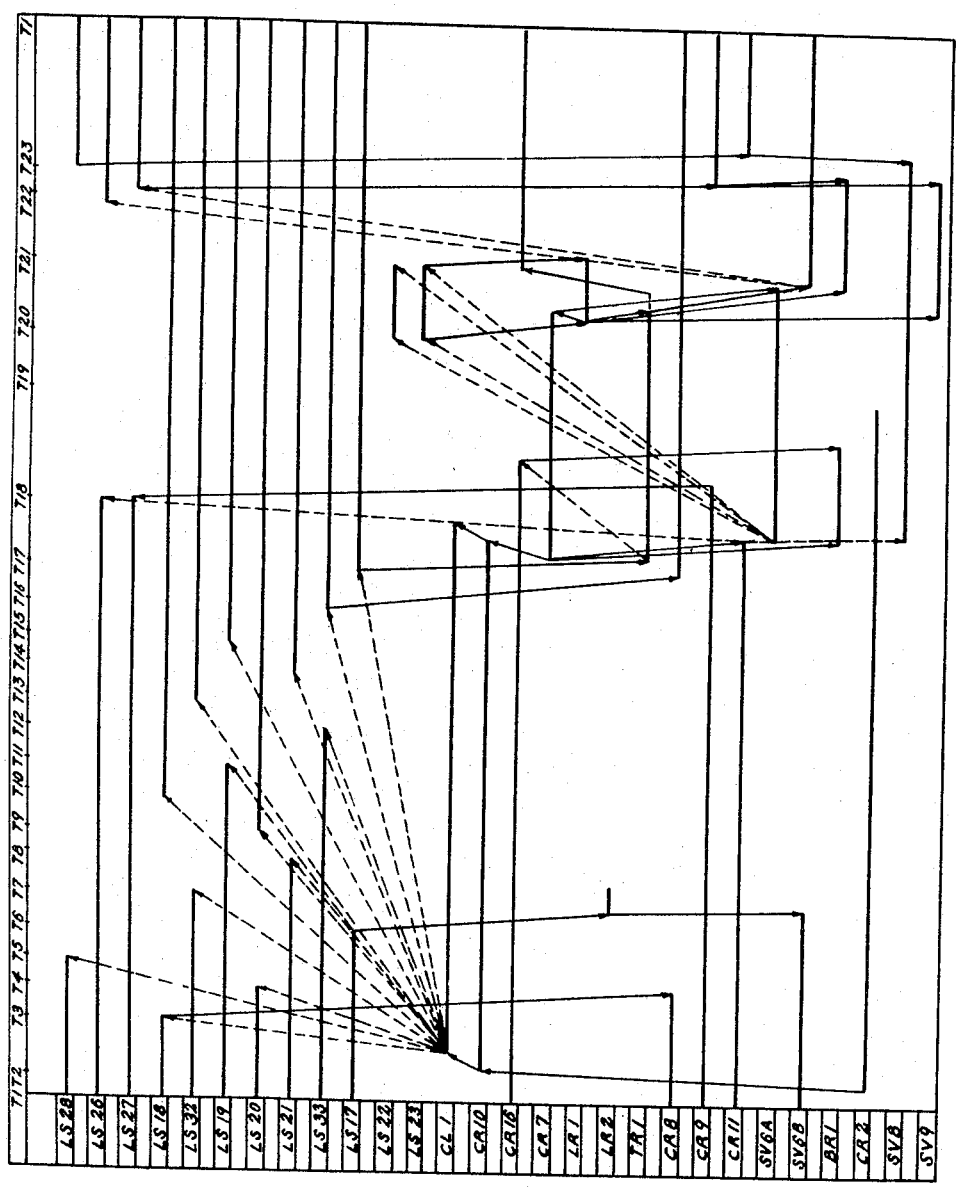

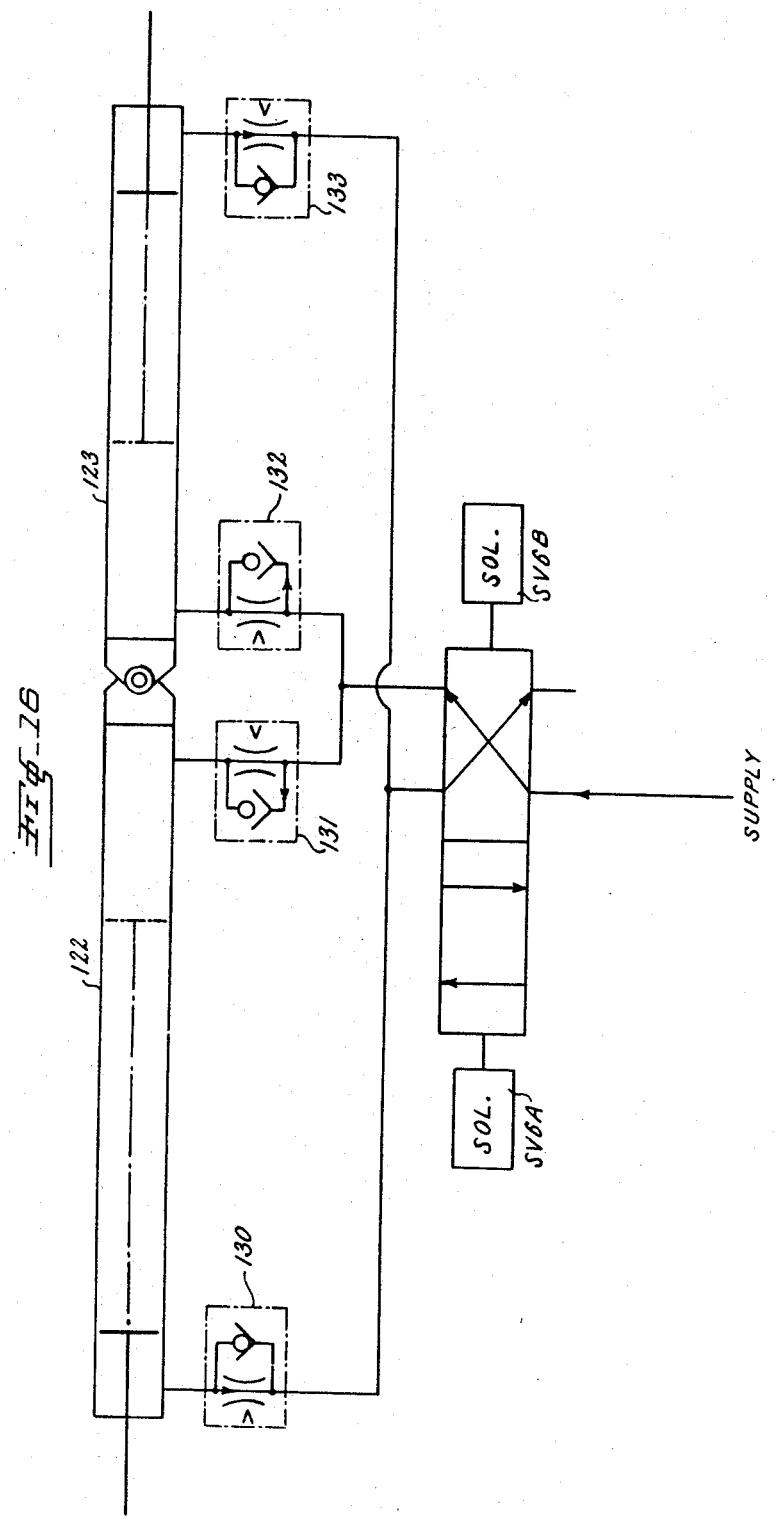

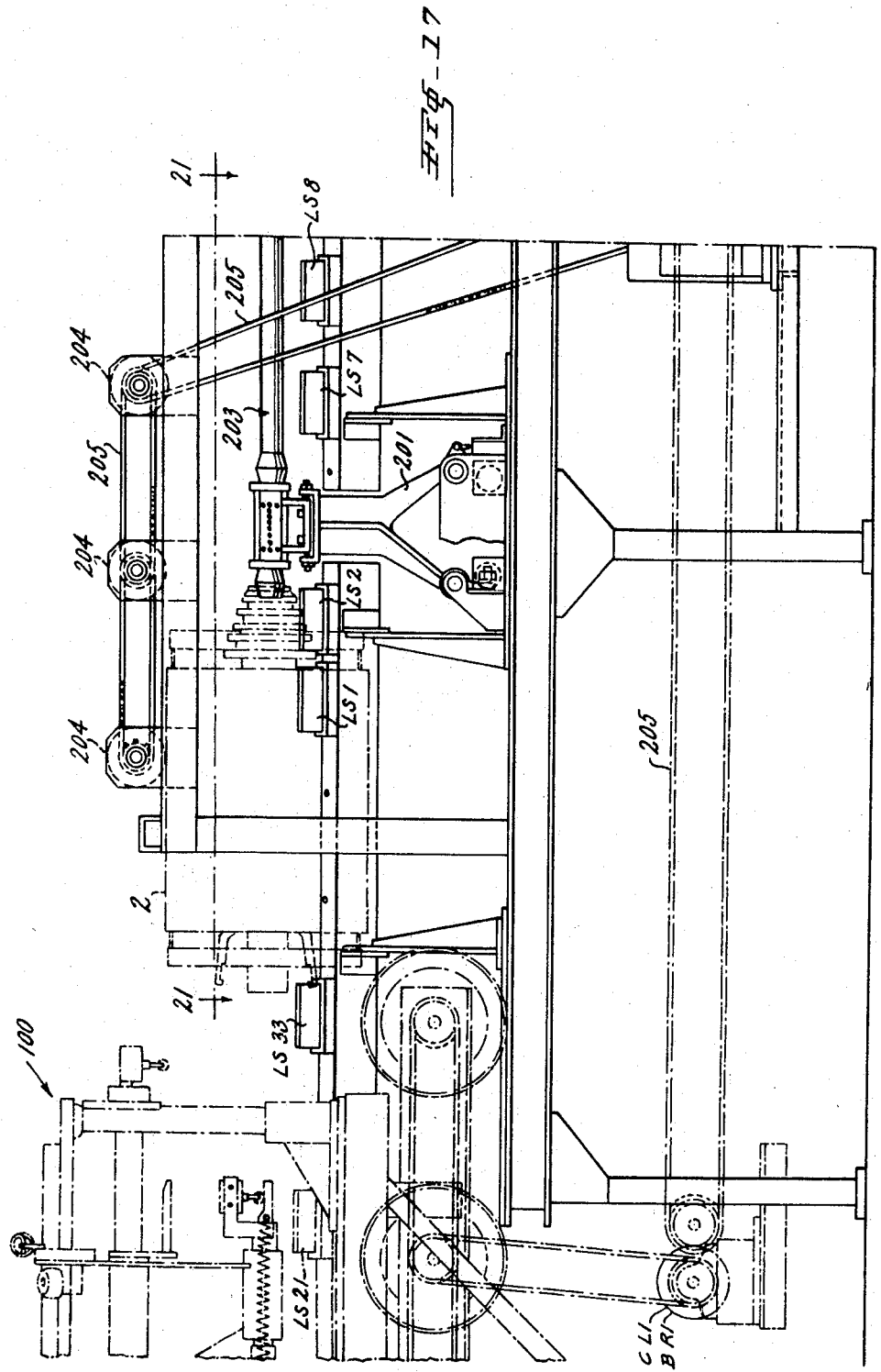

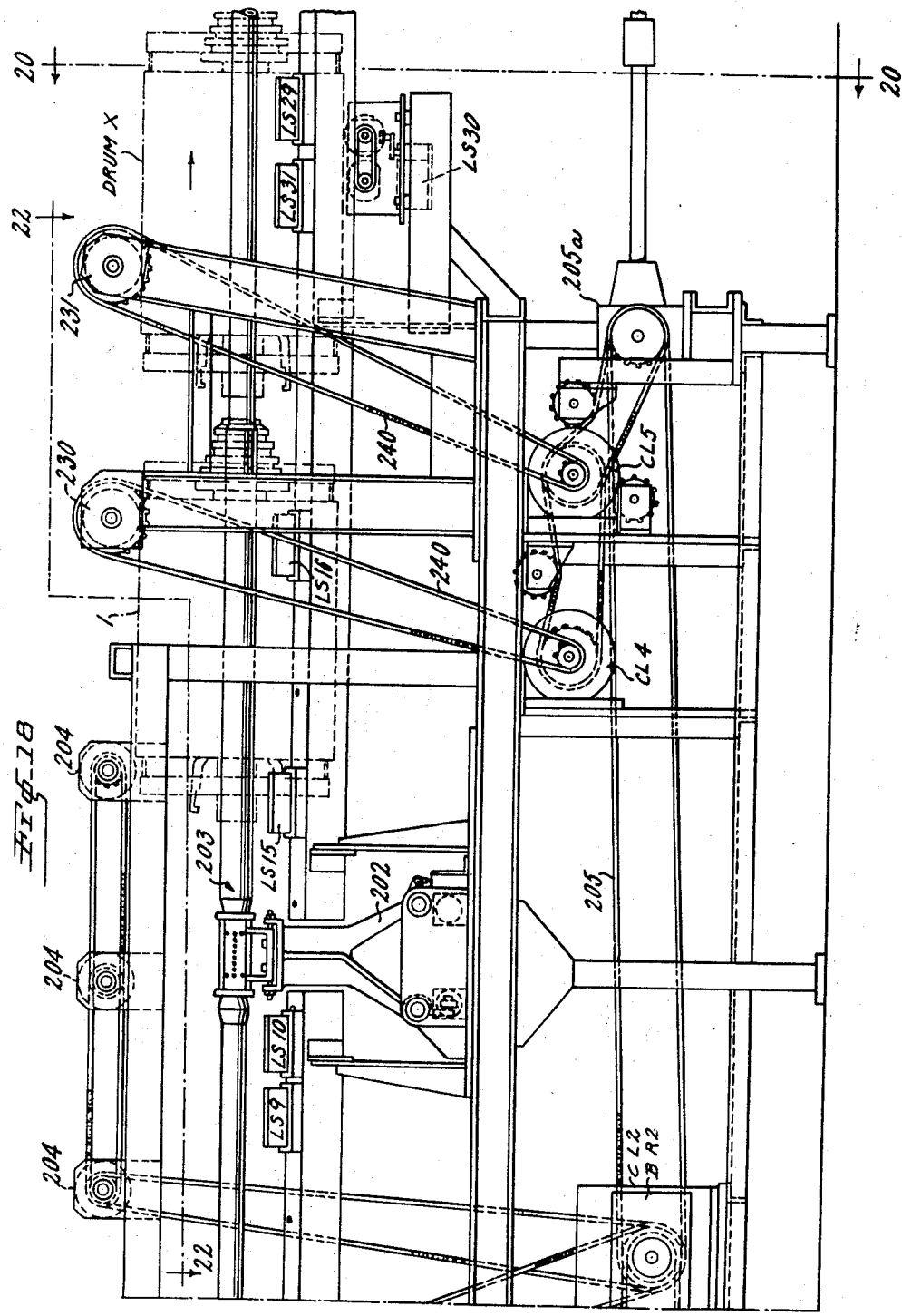

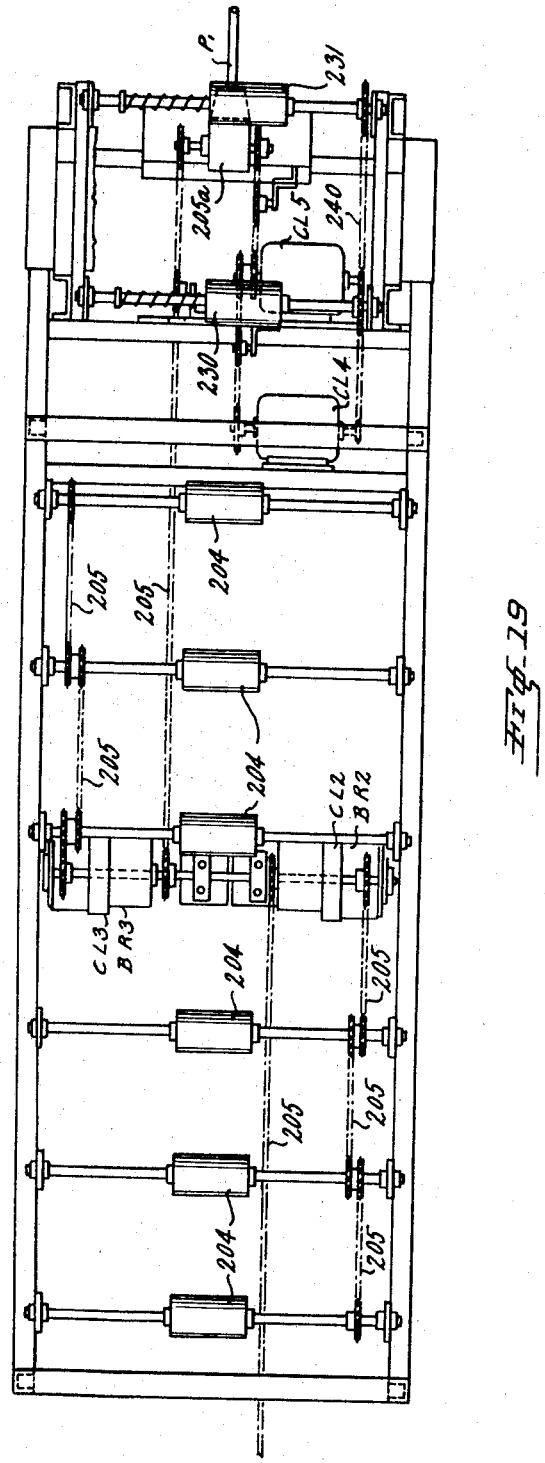

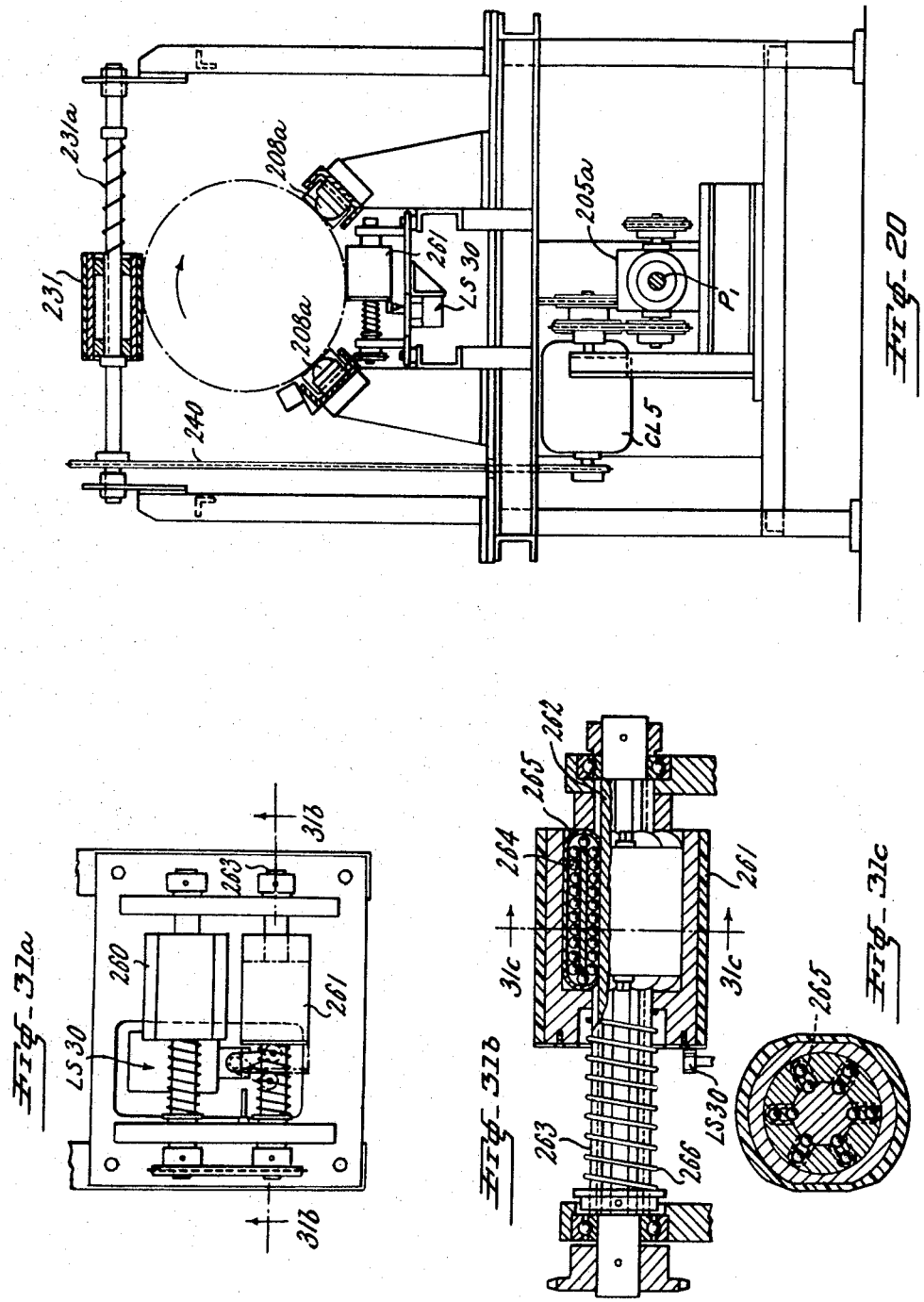

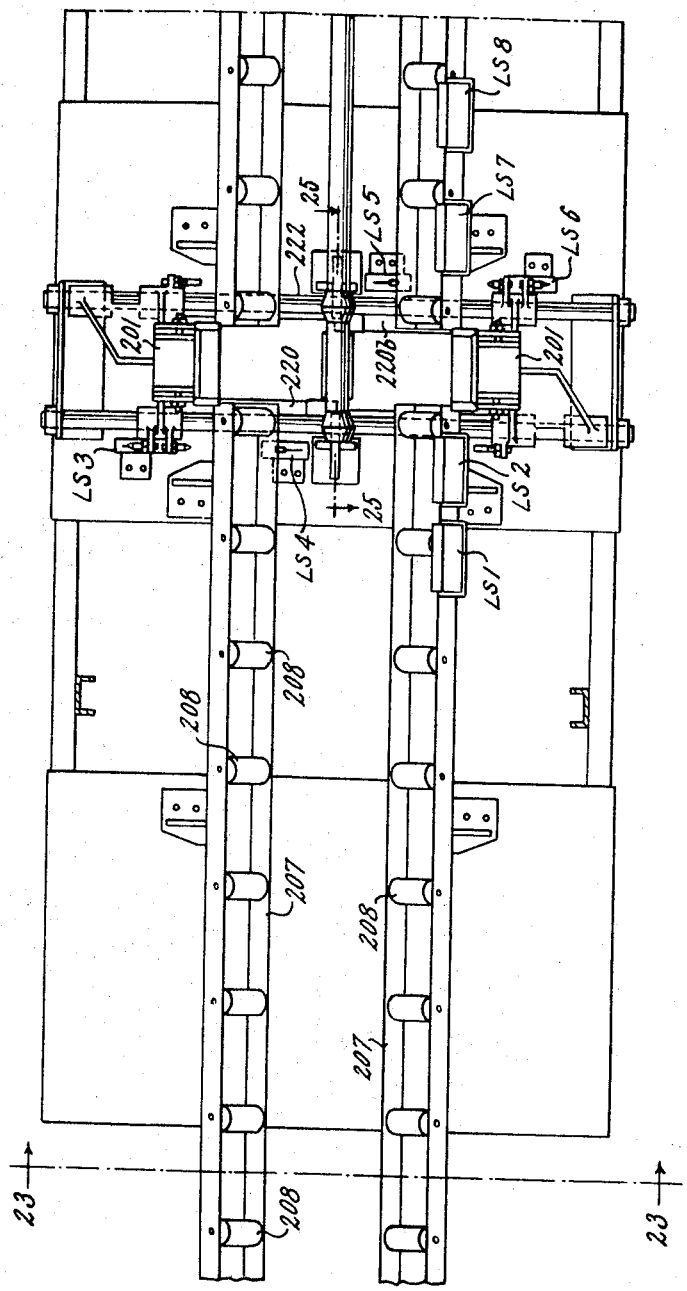

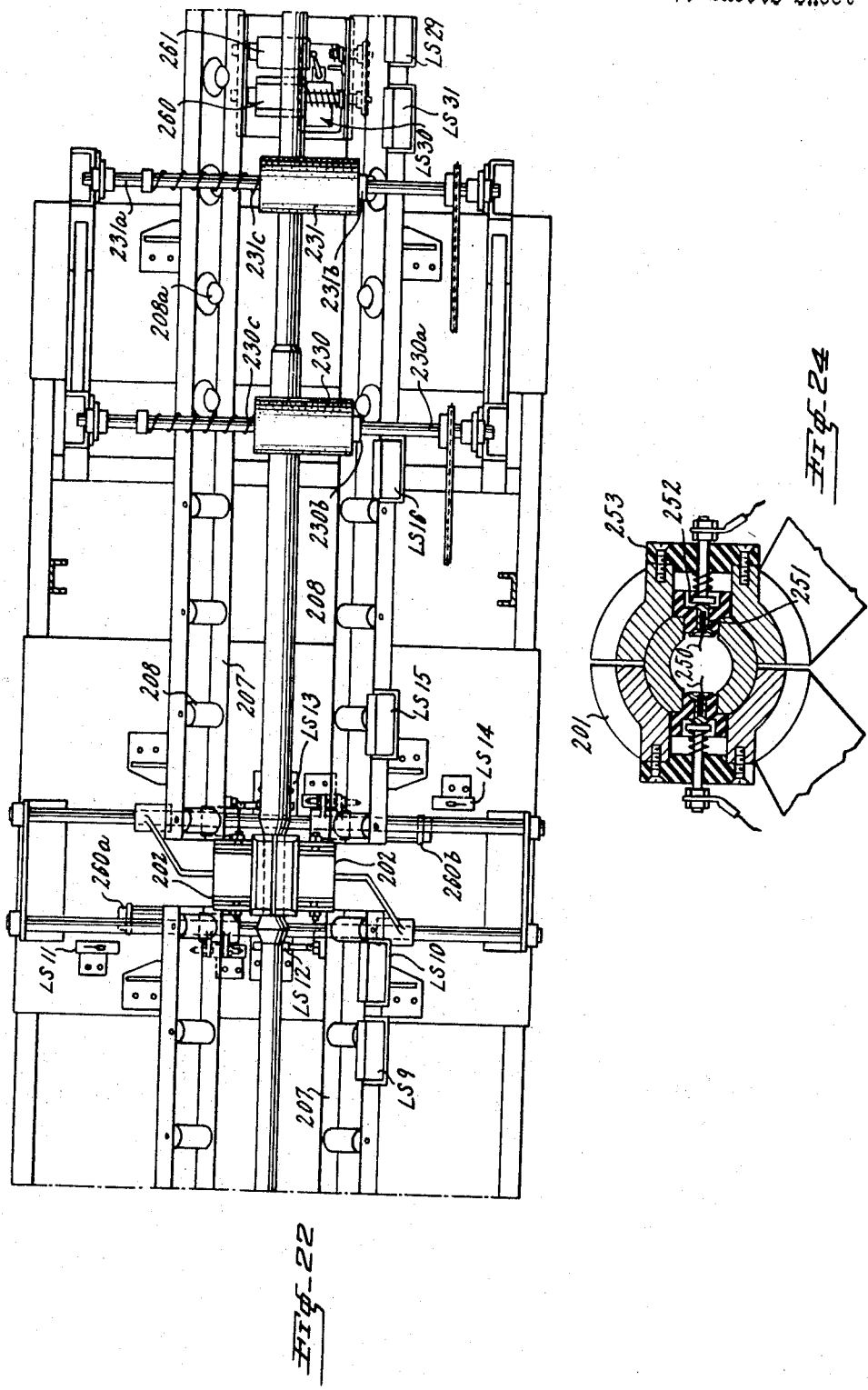

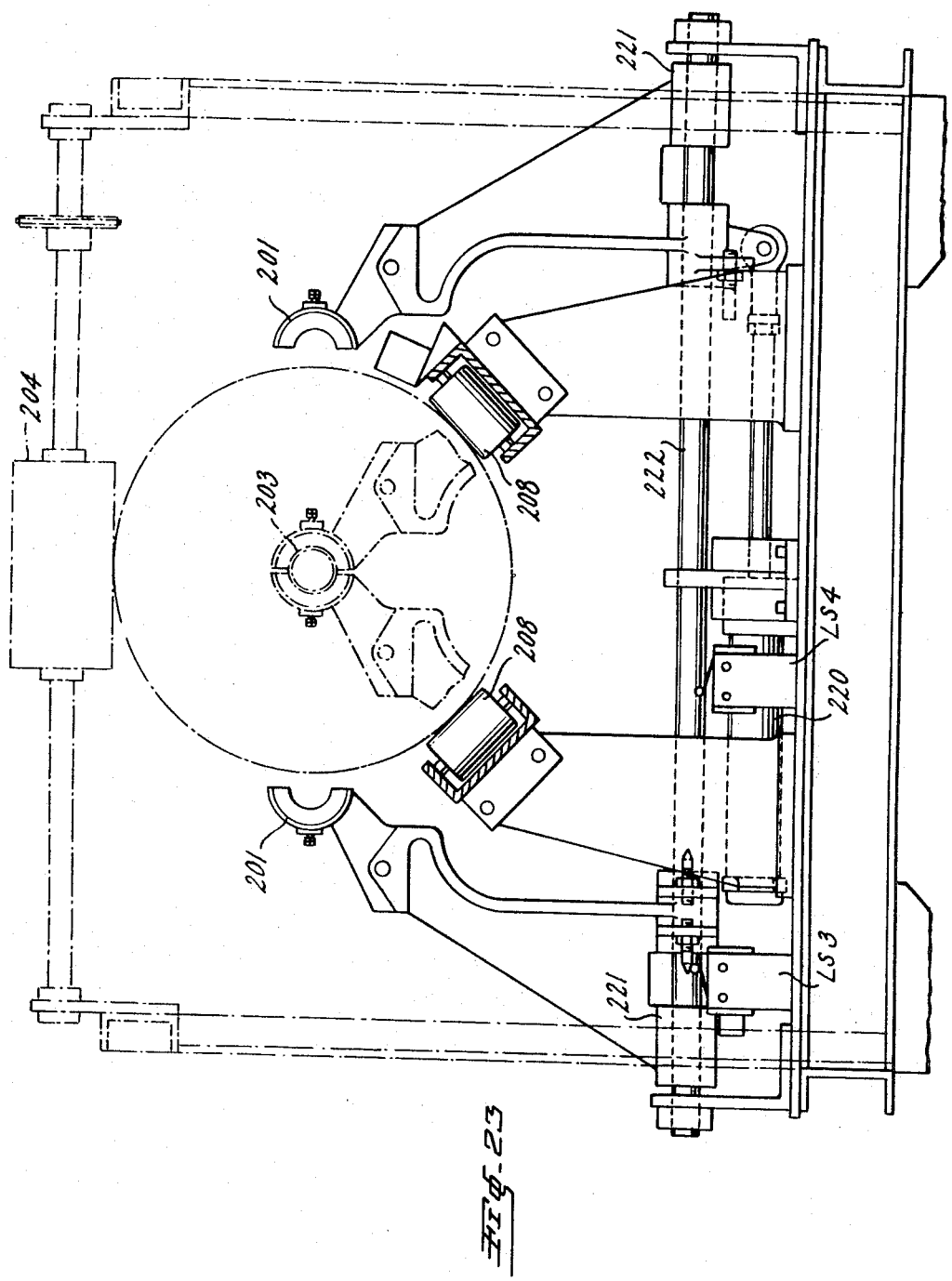

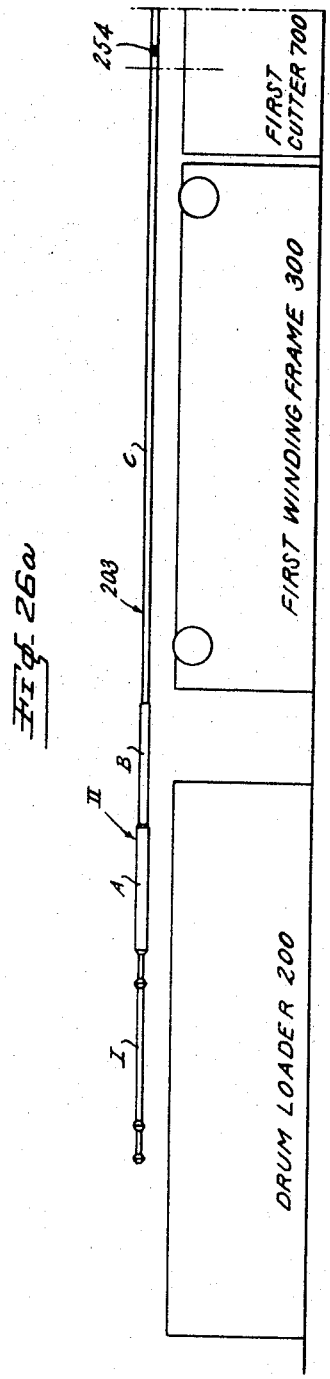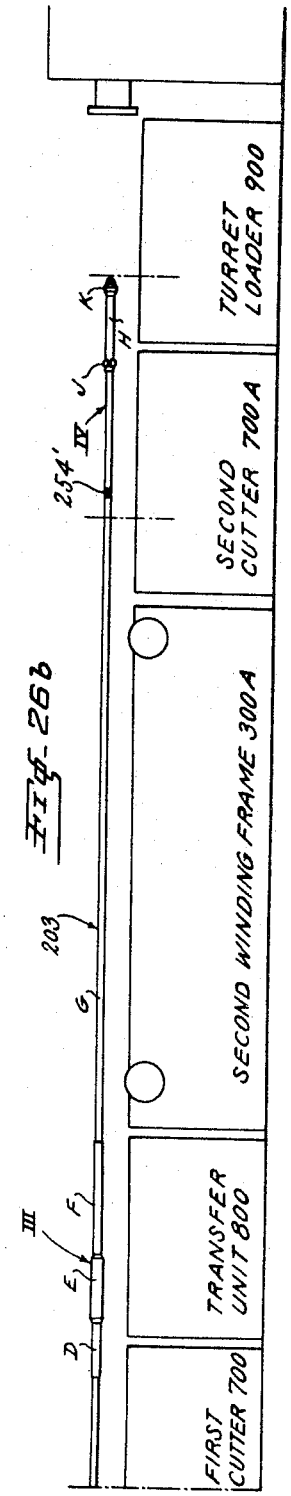

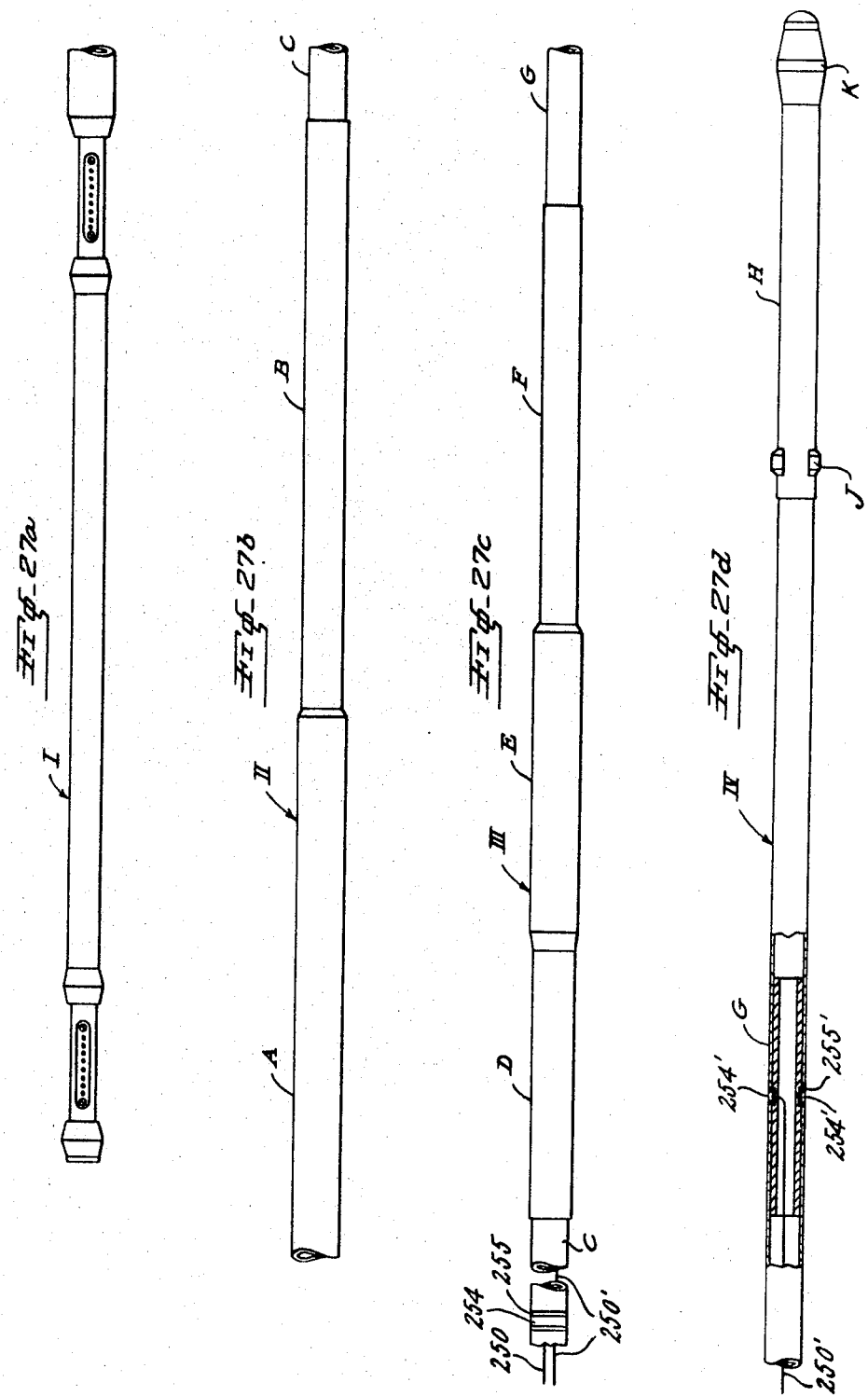

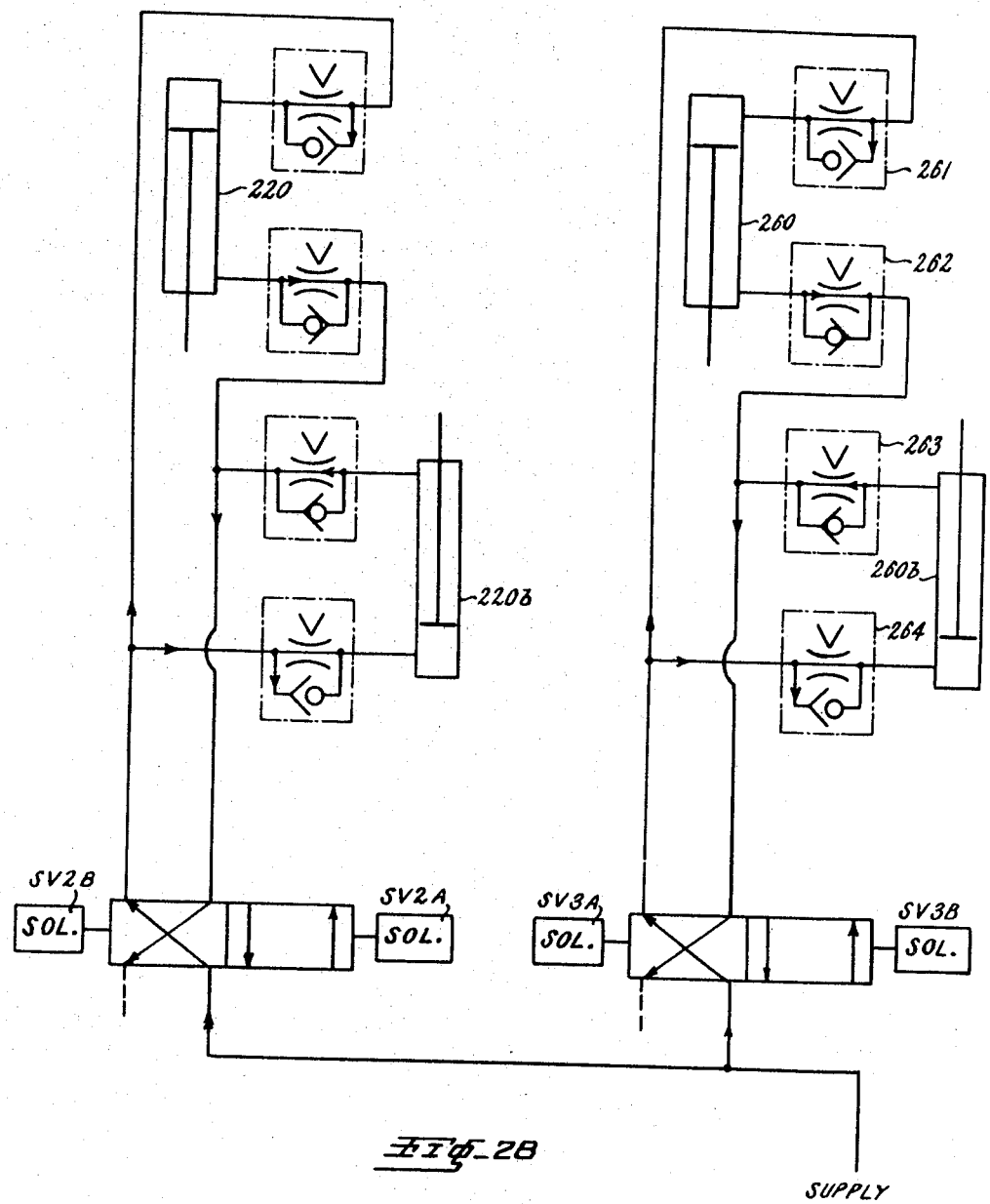

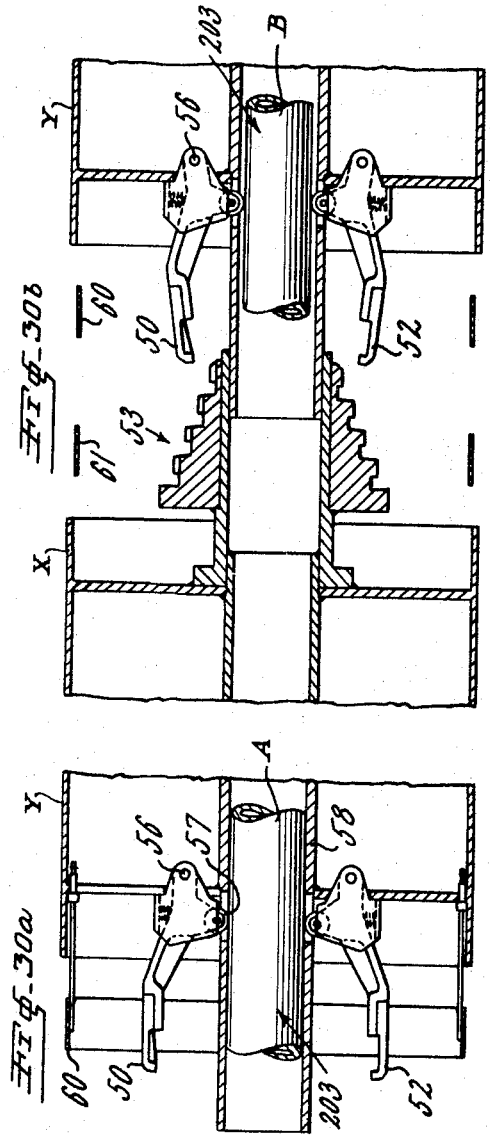
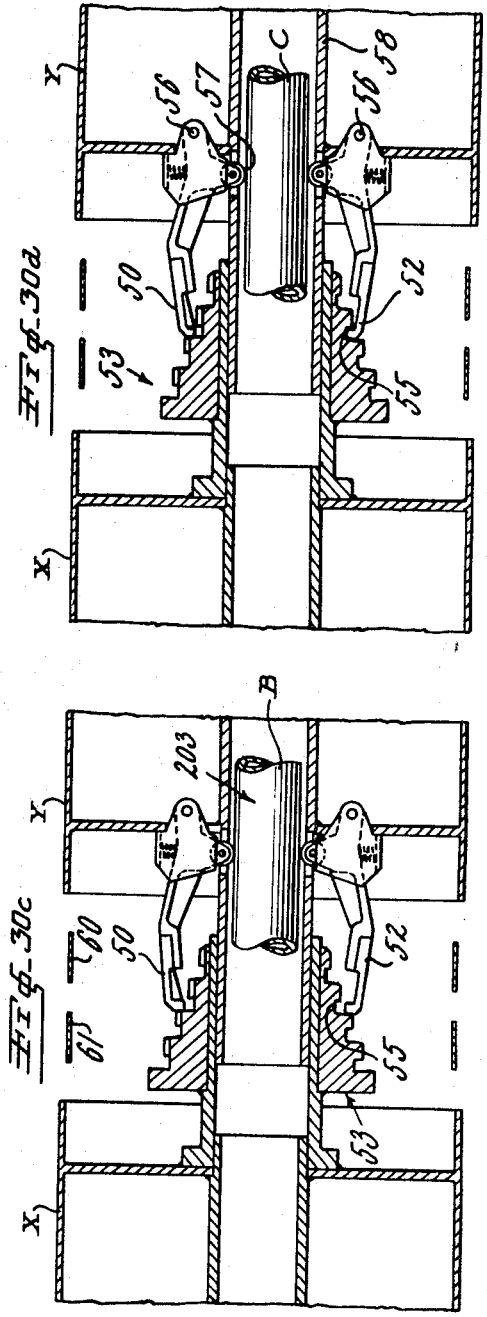

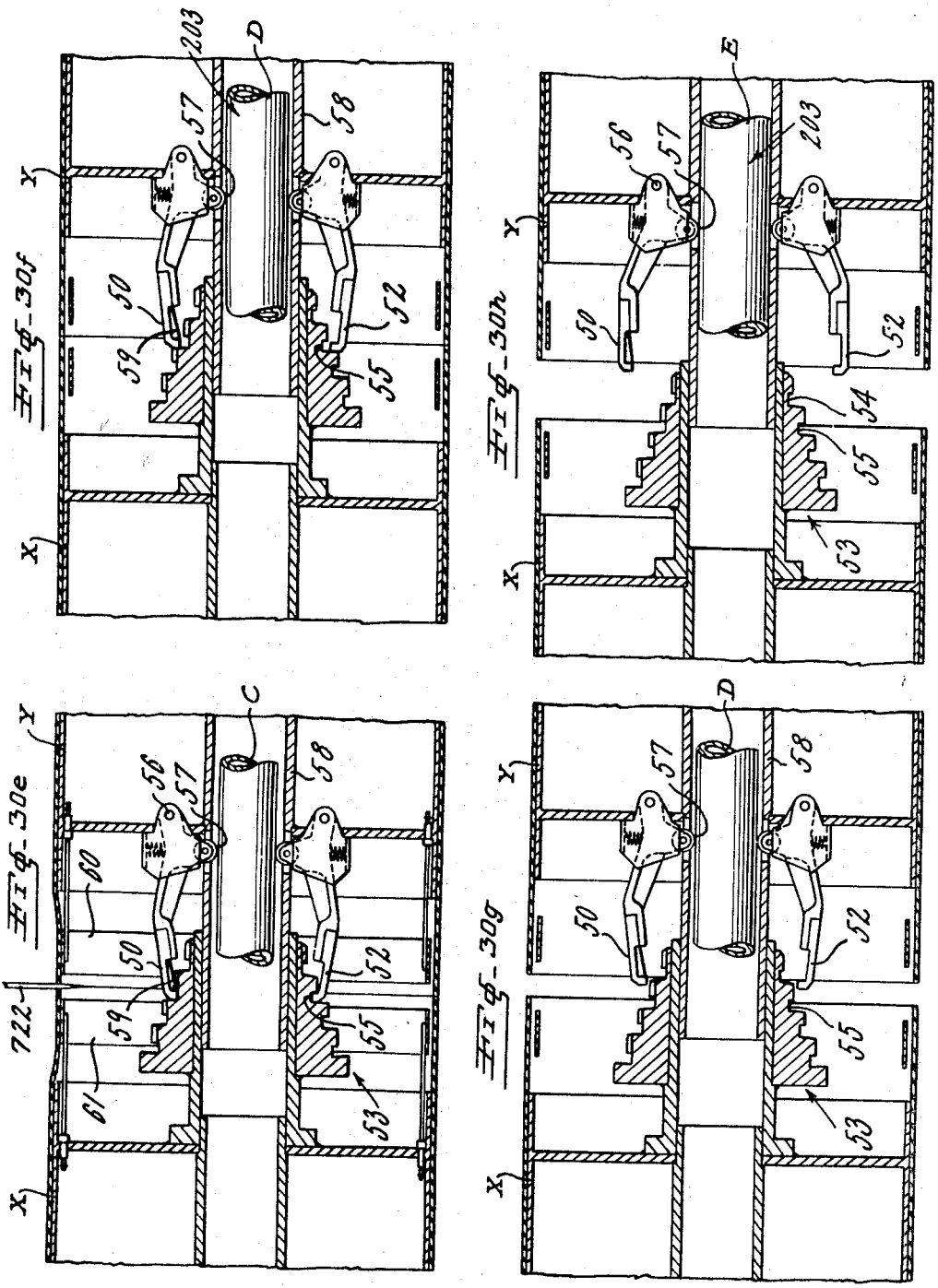

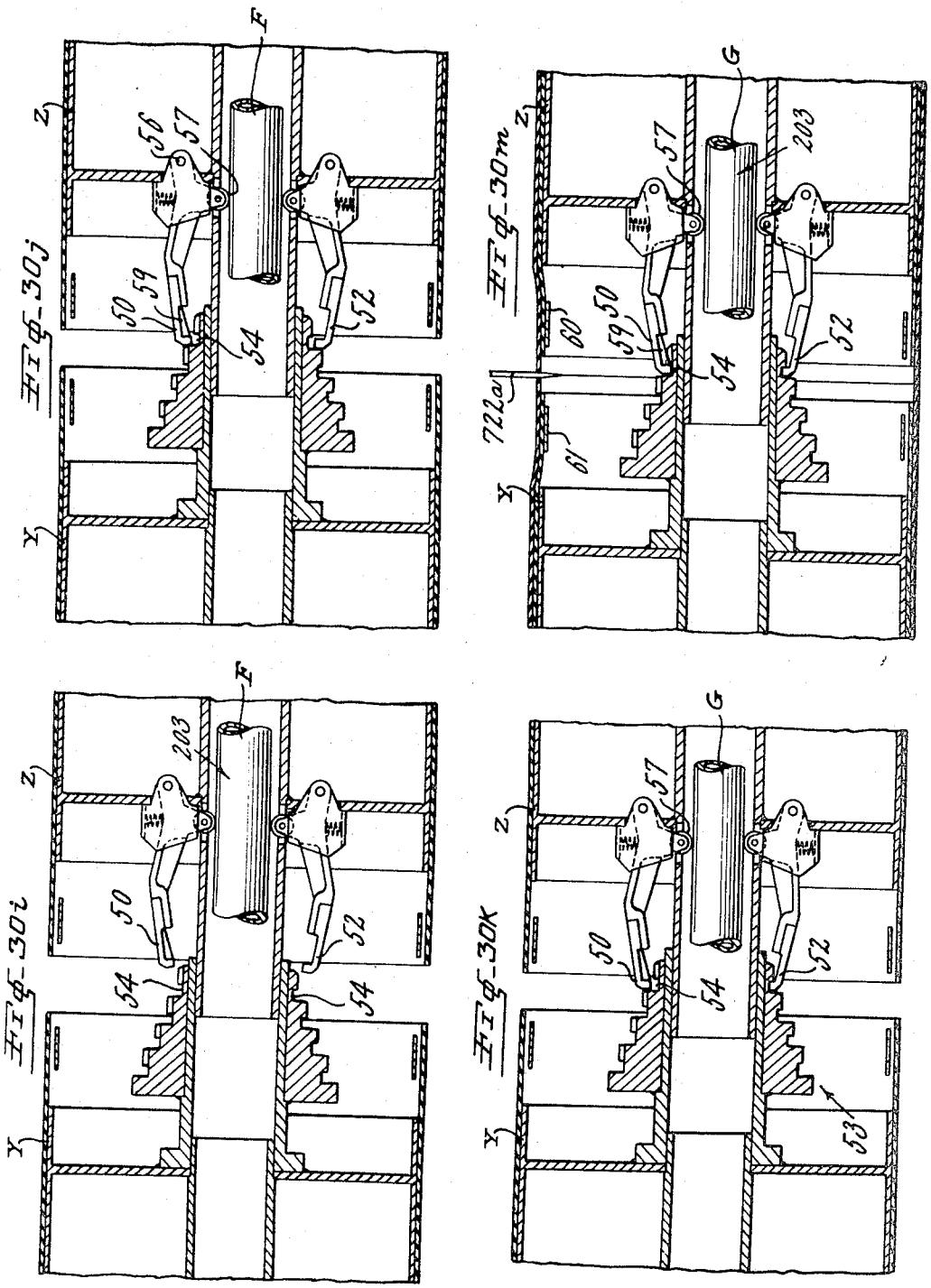

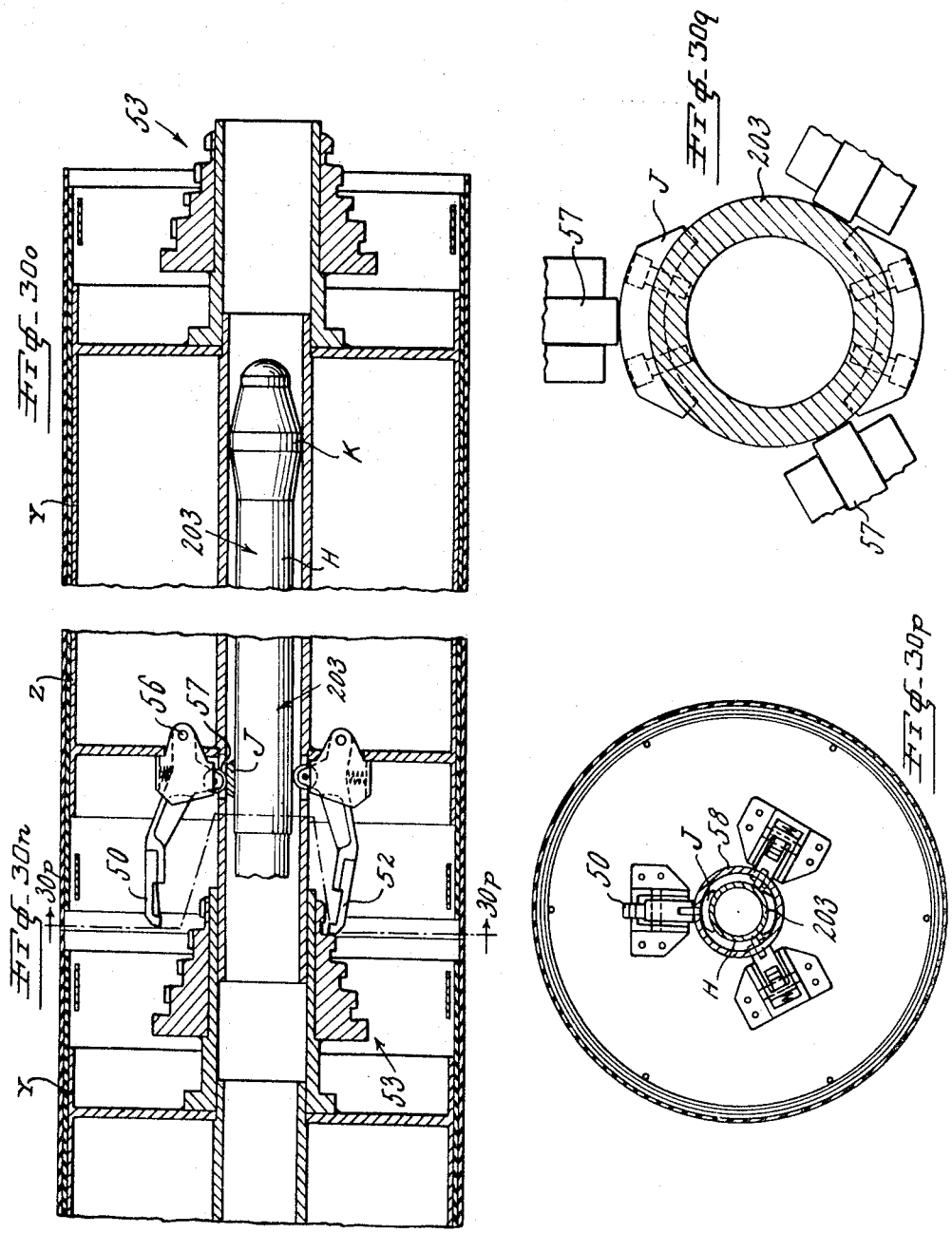

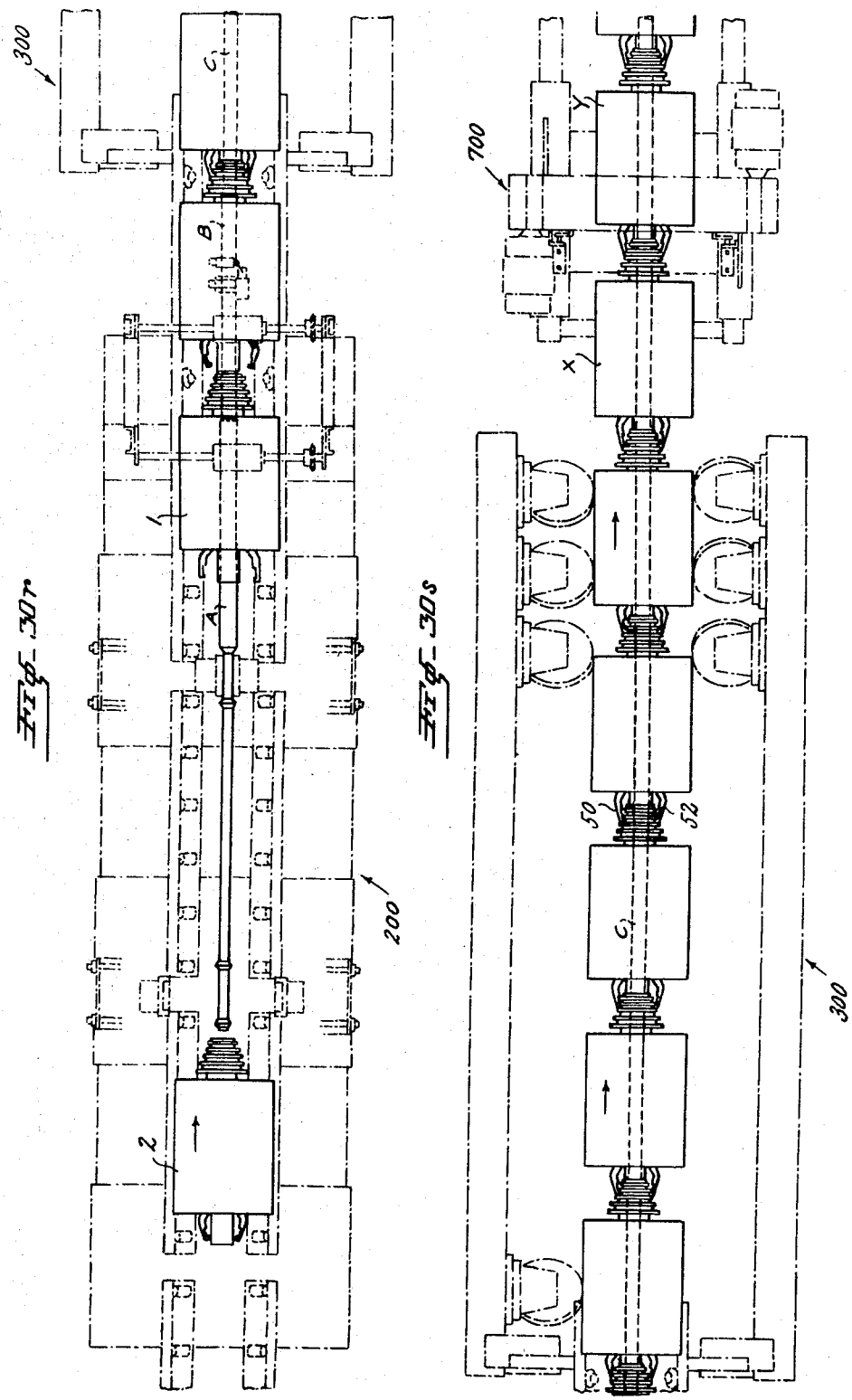

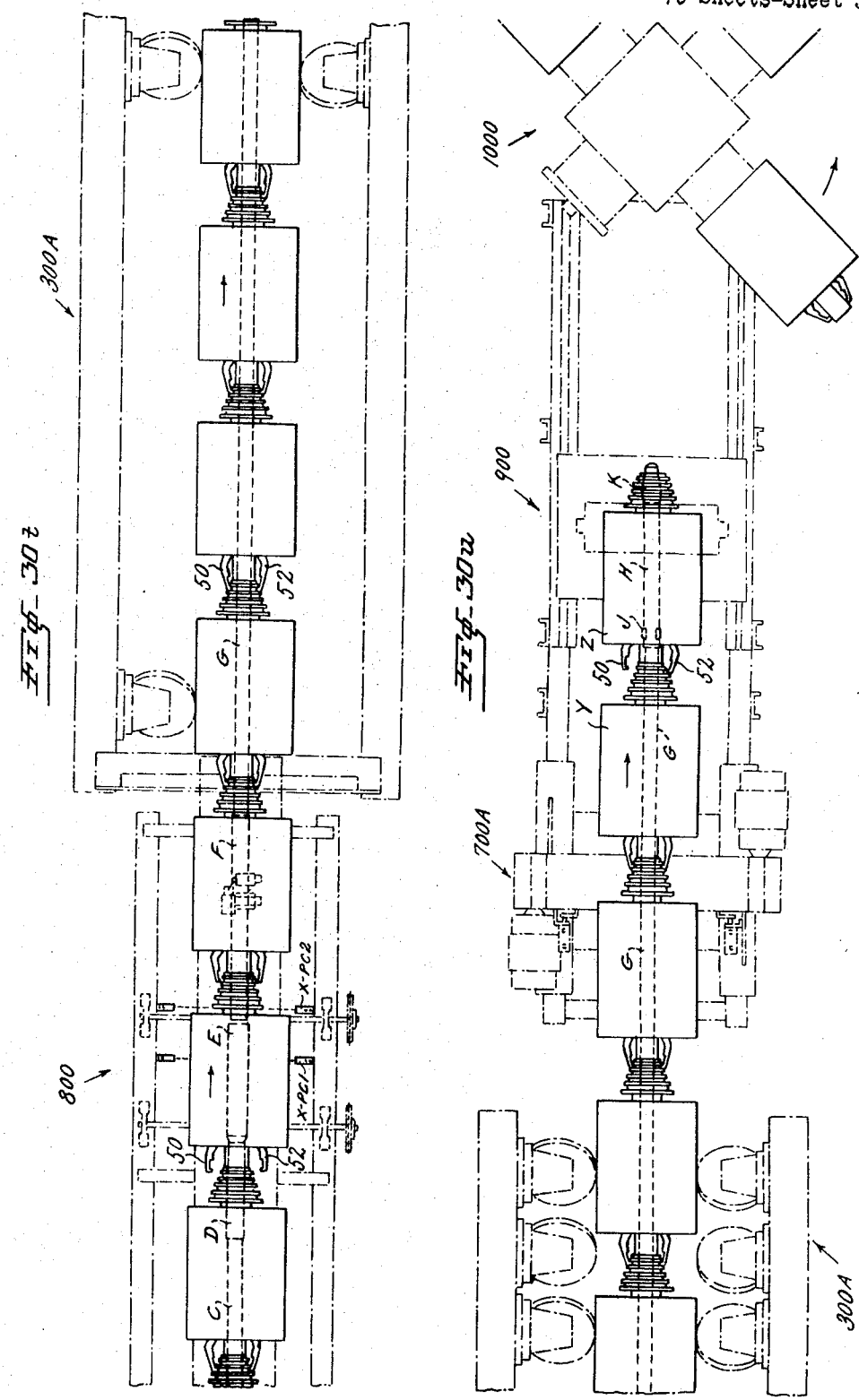

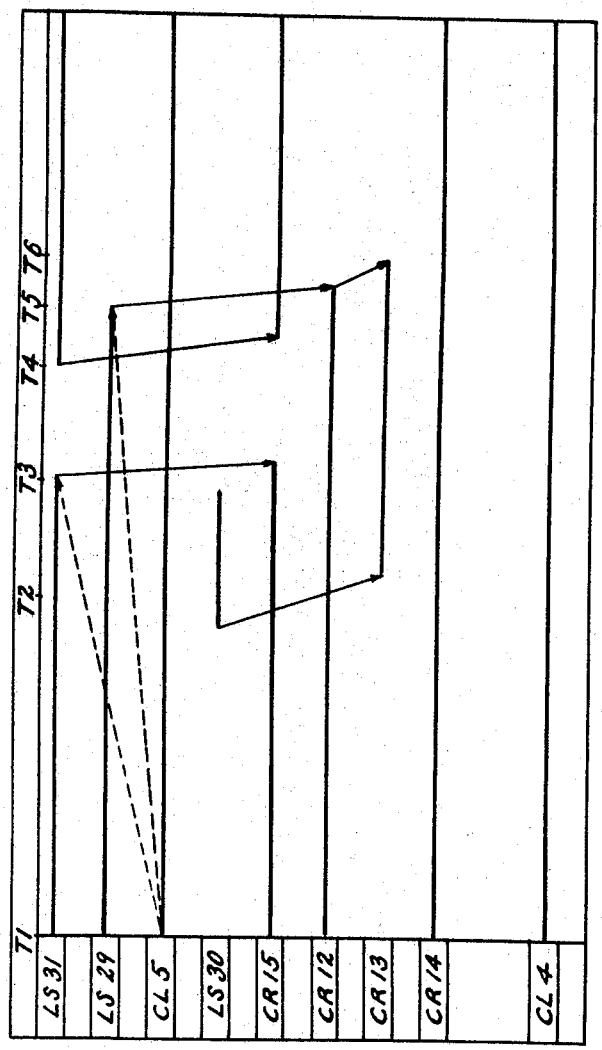

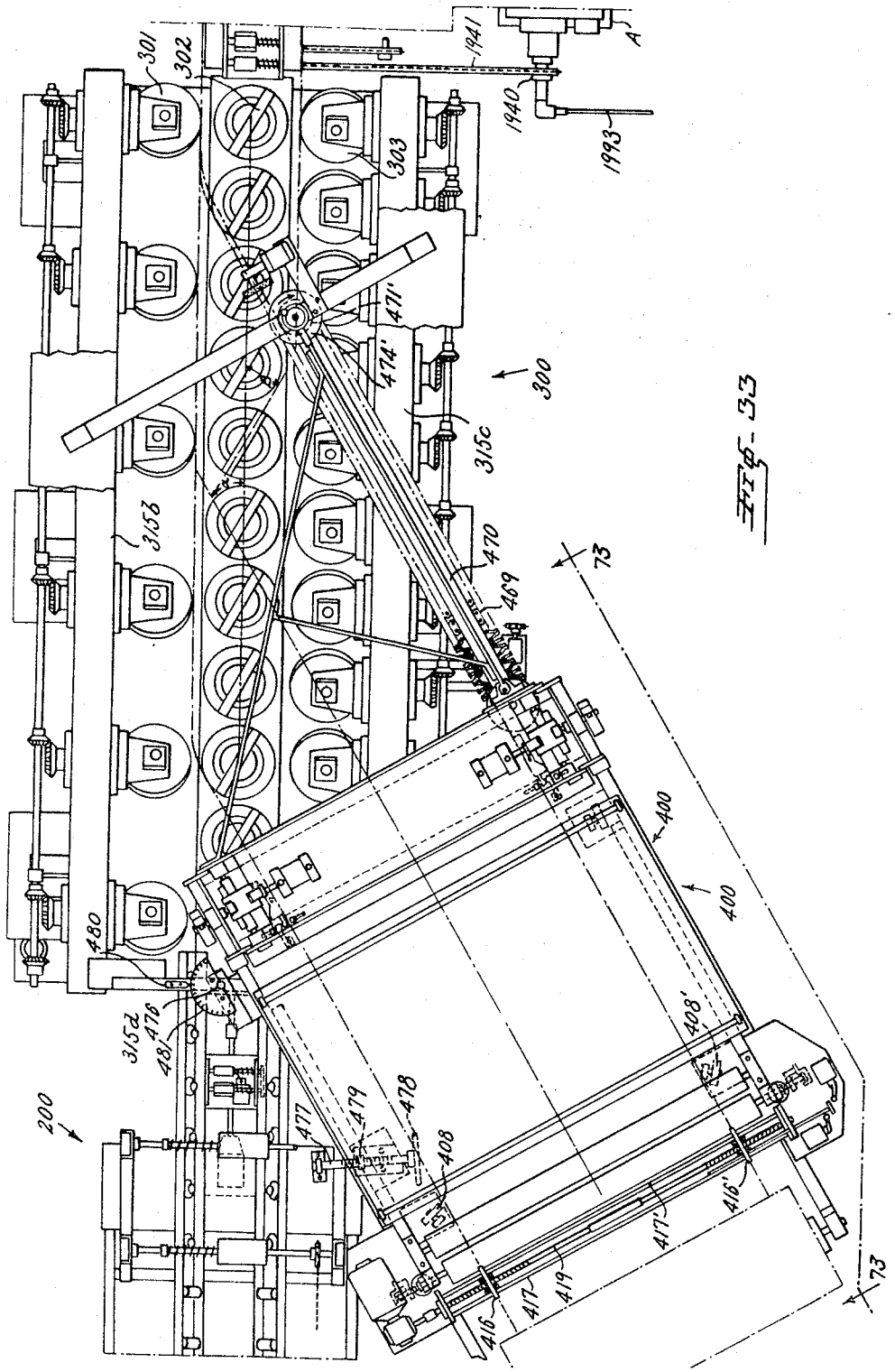

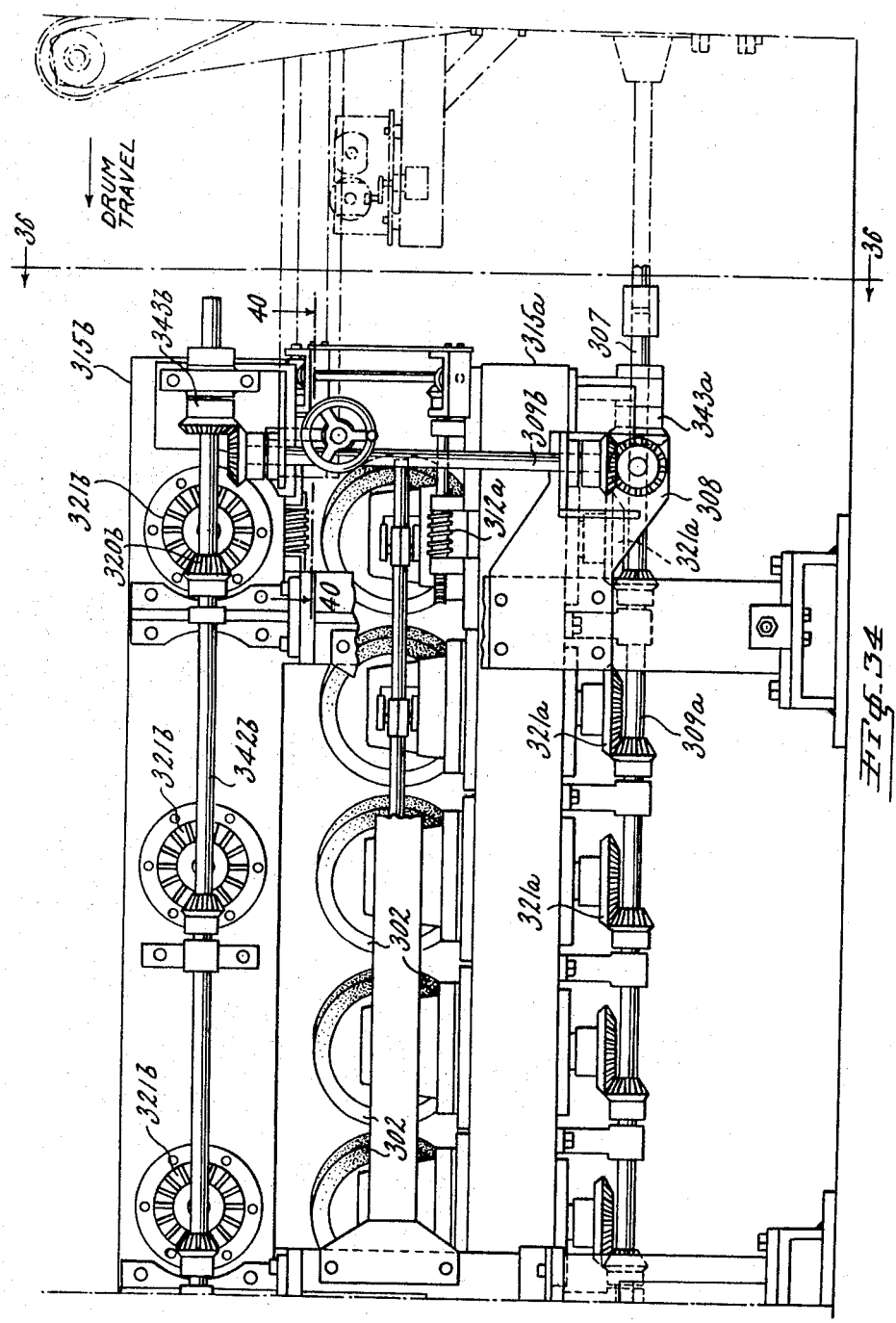

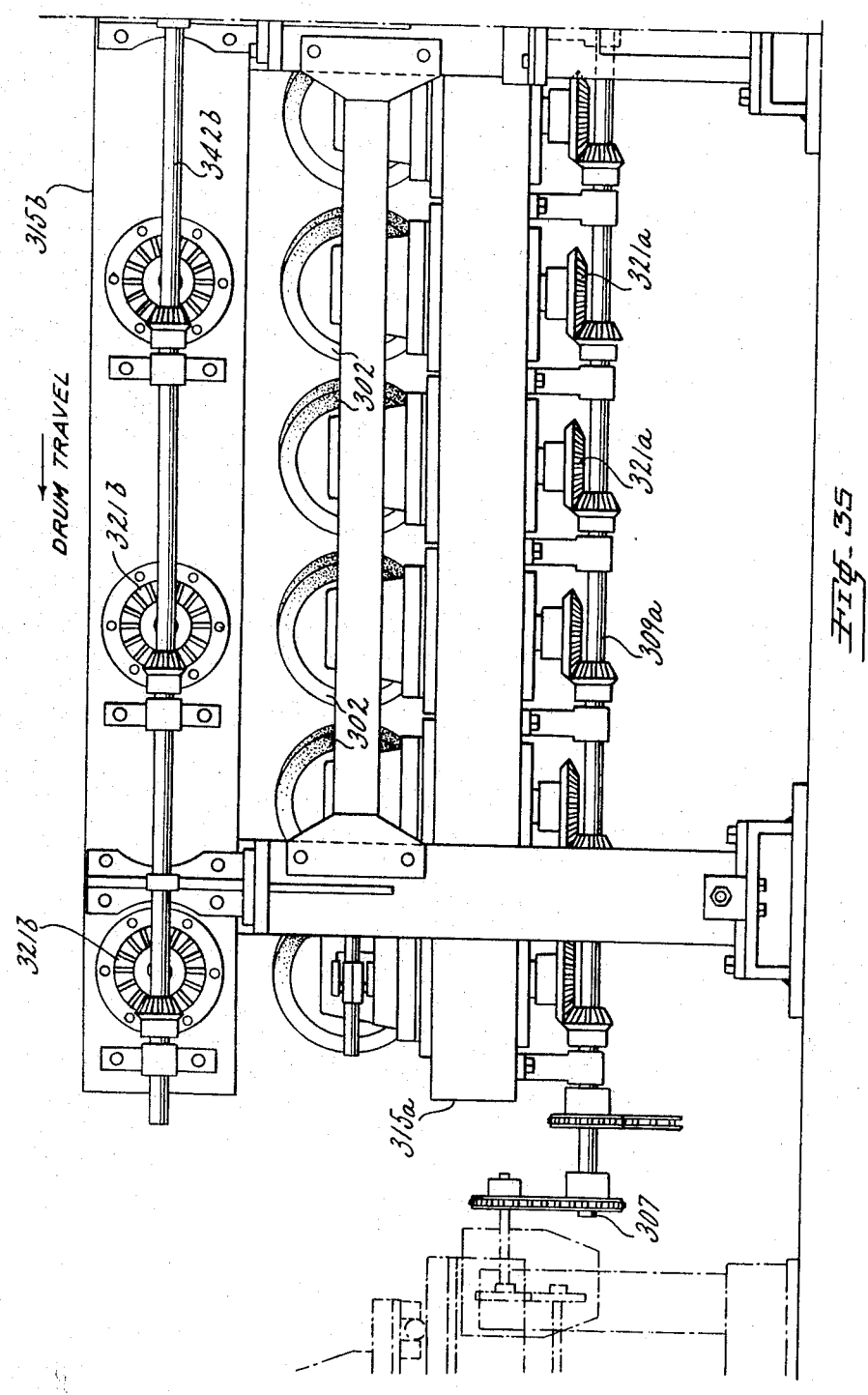

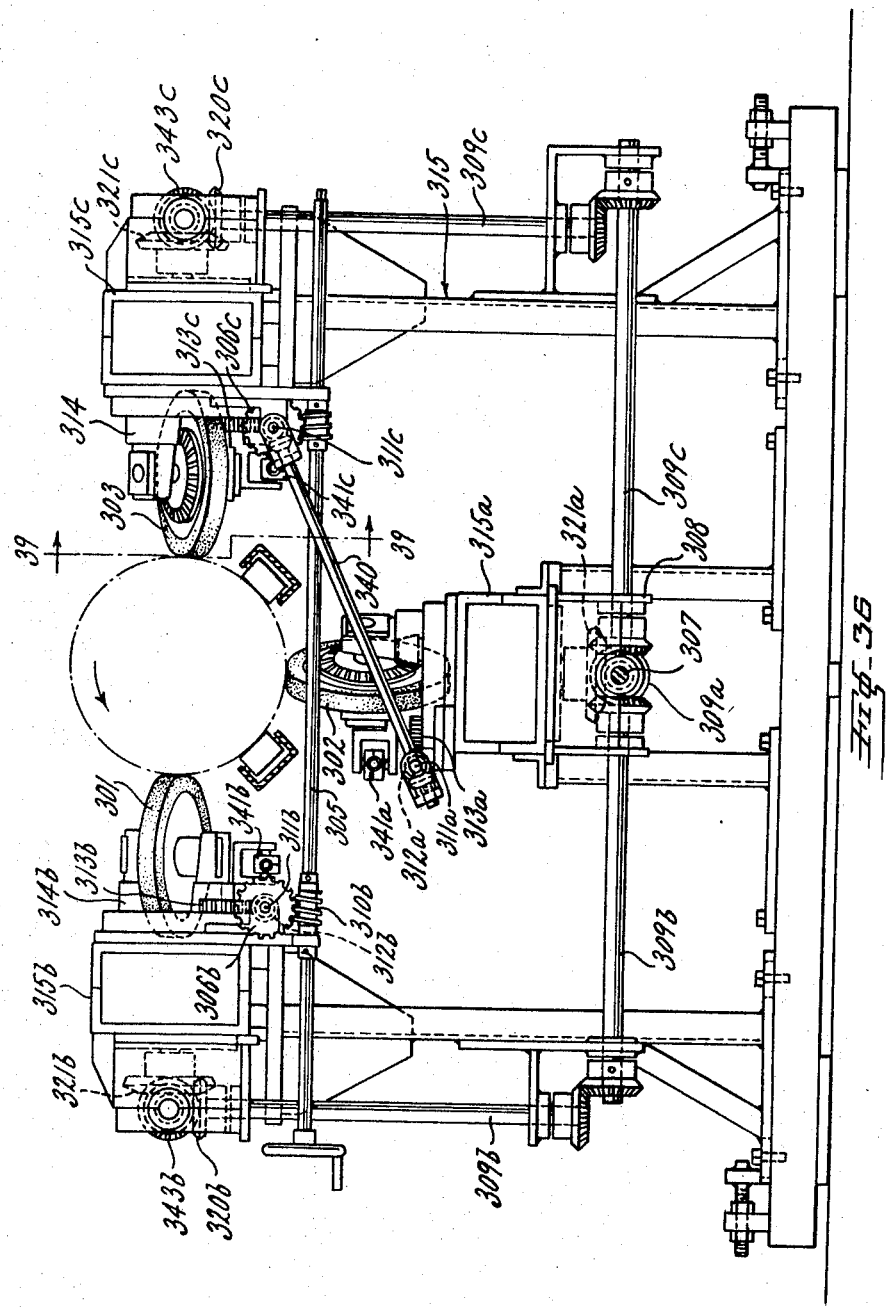

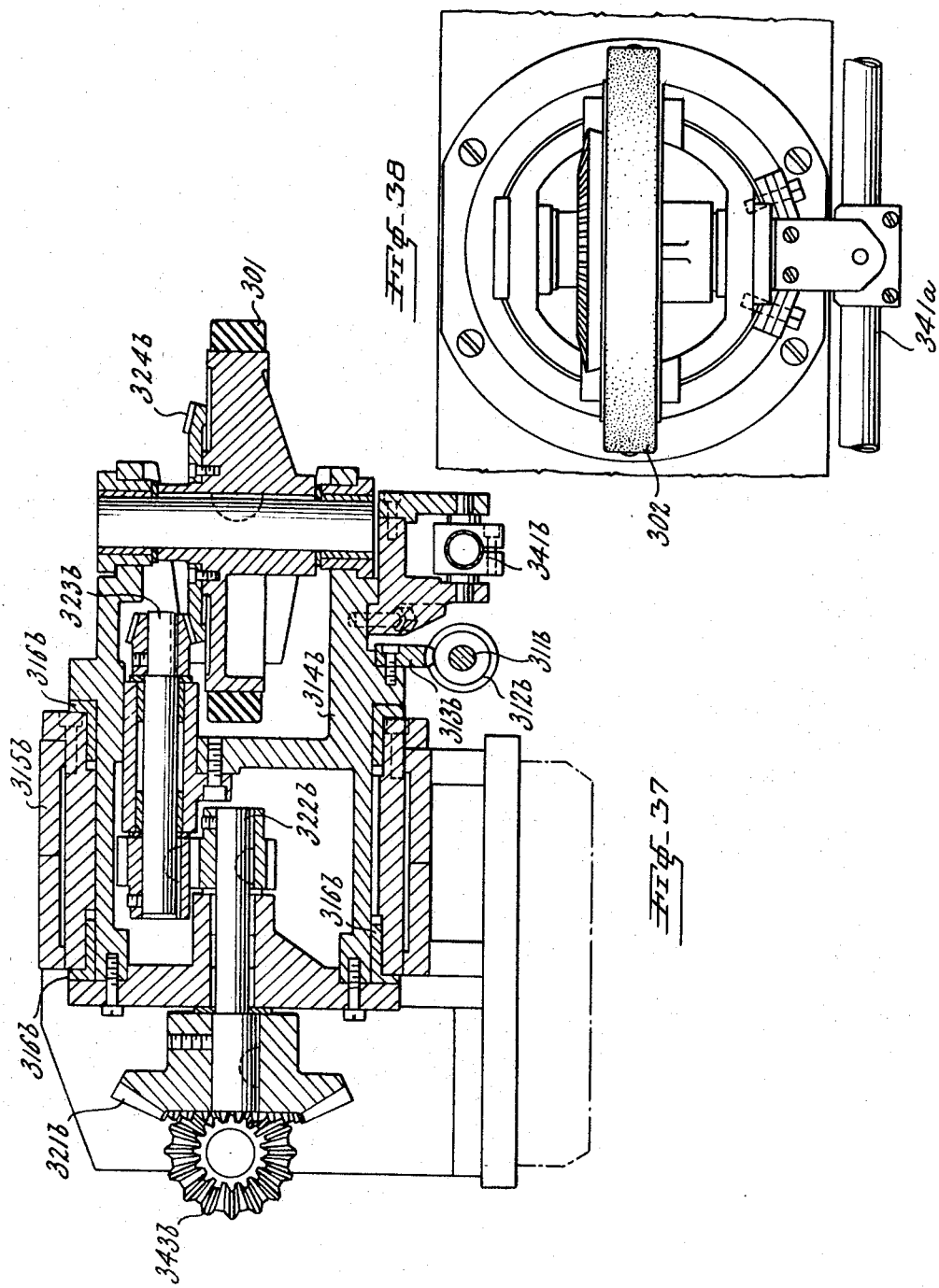

Fig. 62

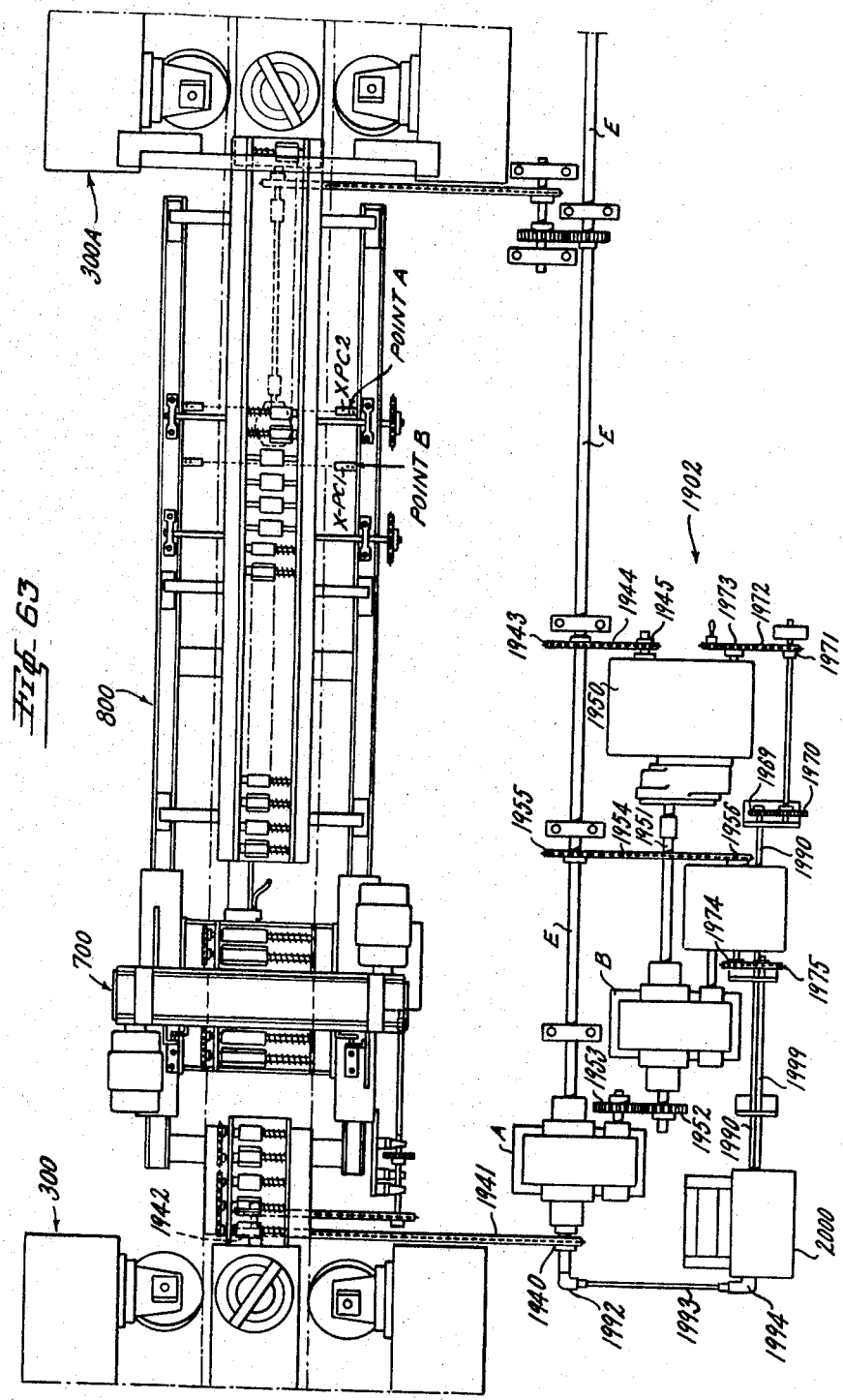

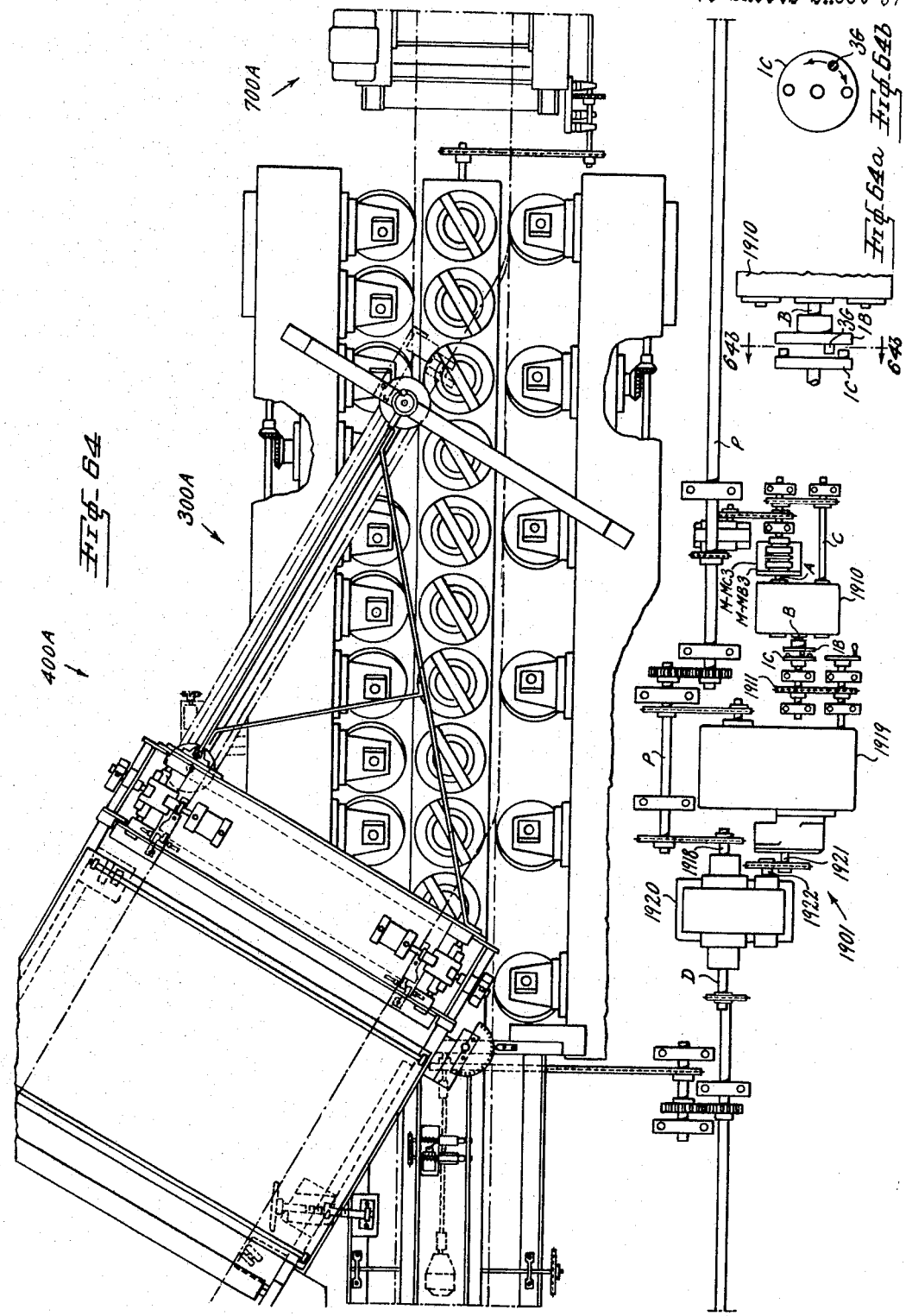

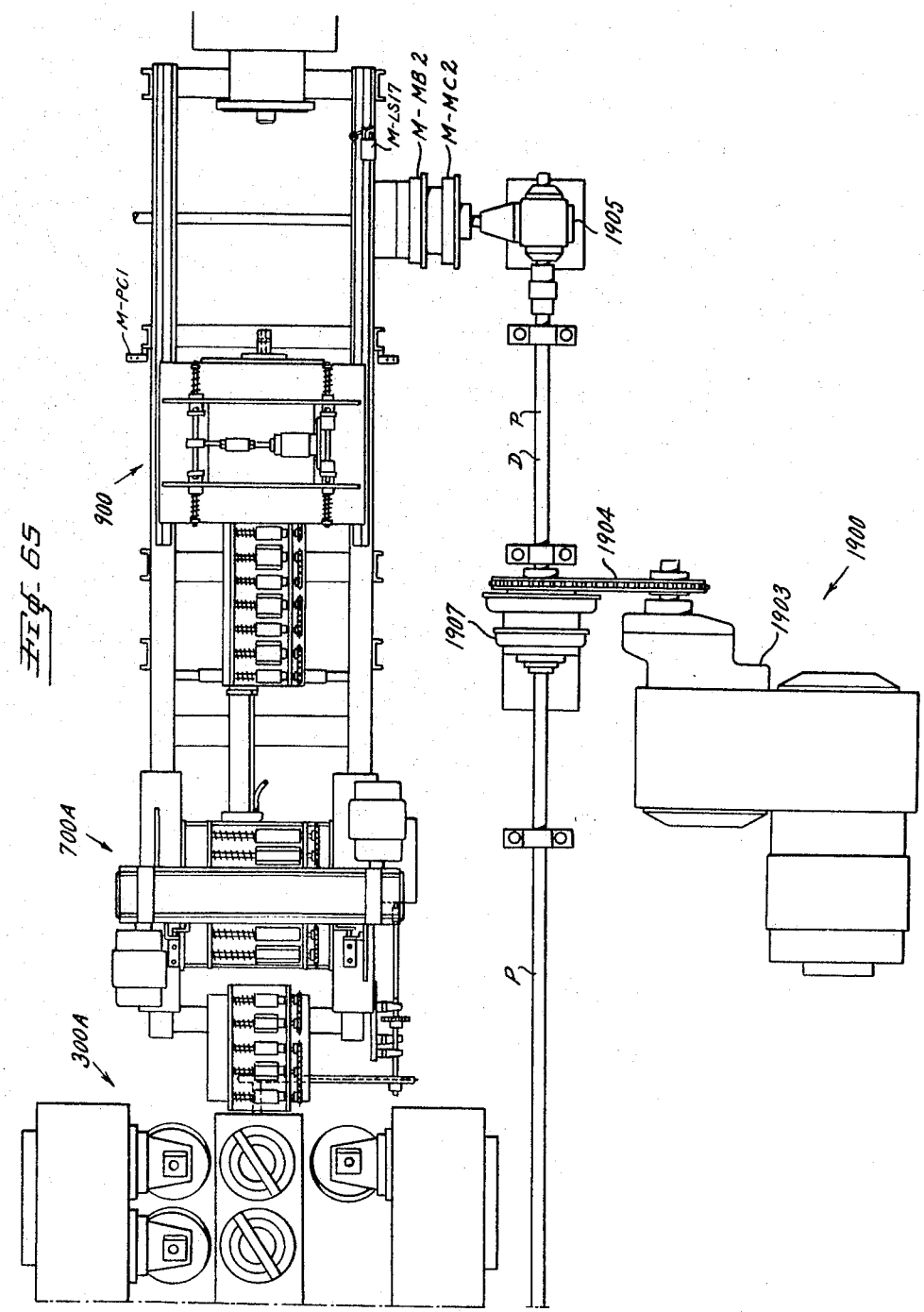

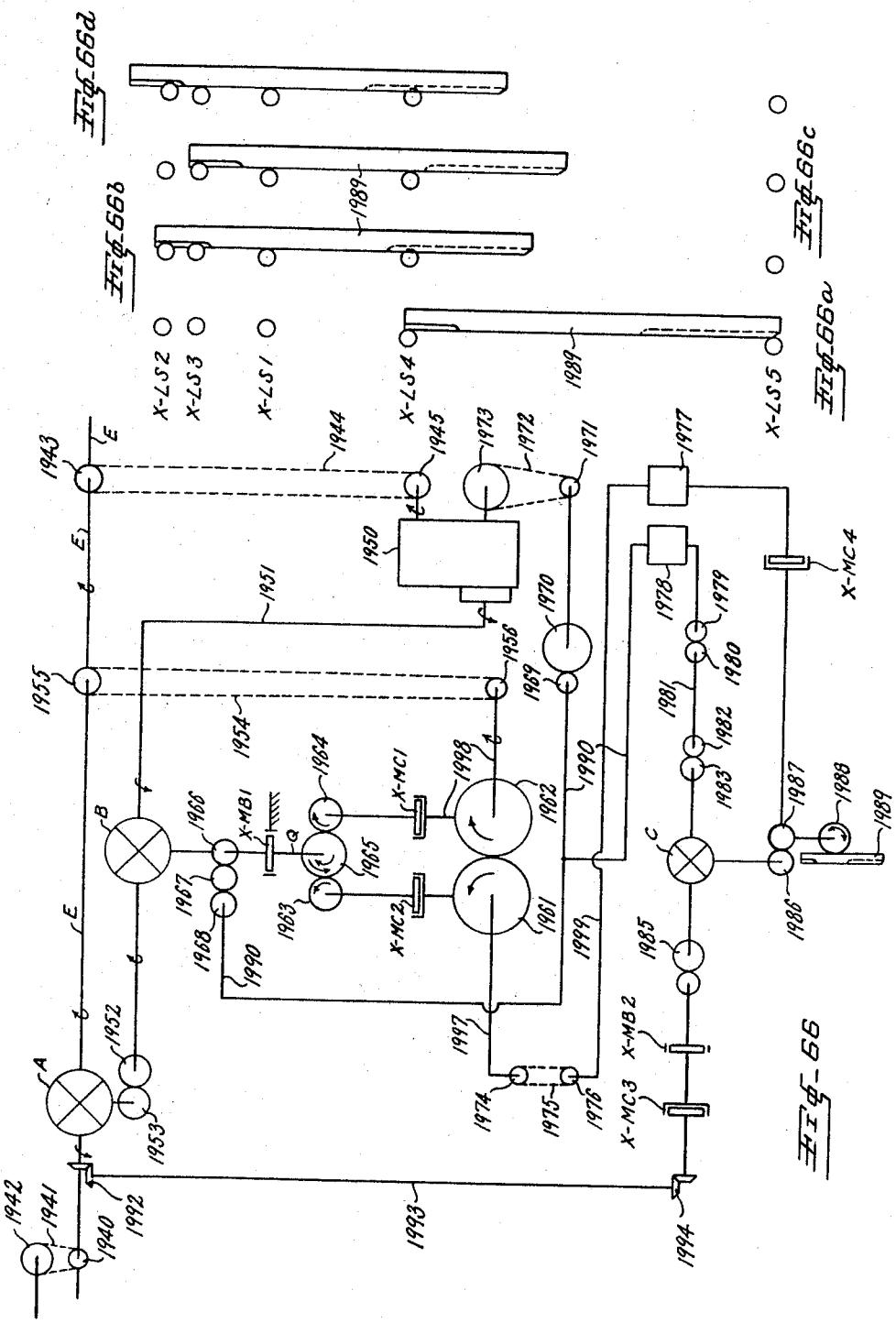

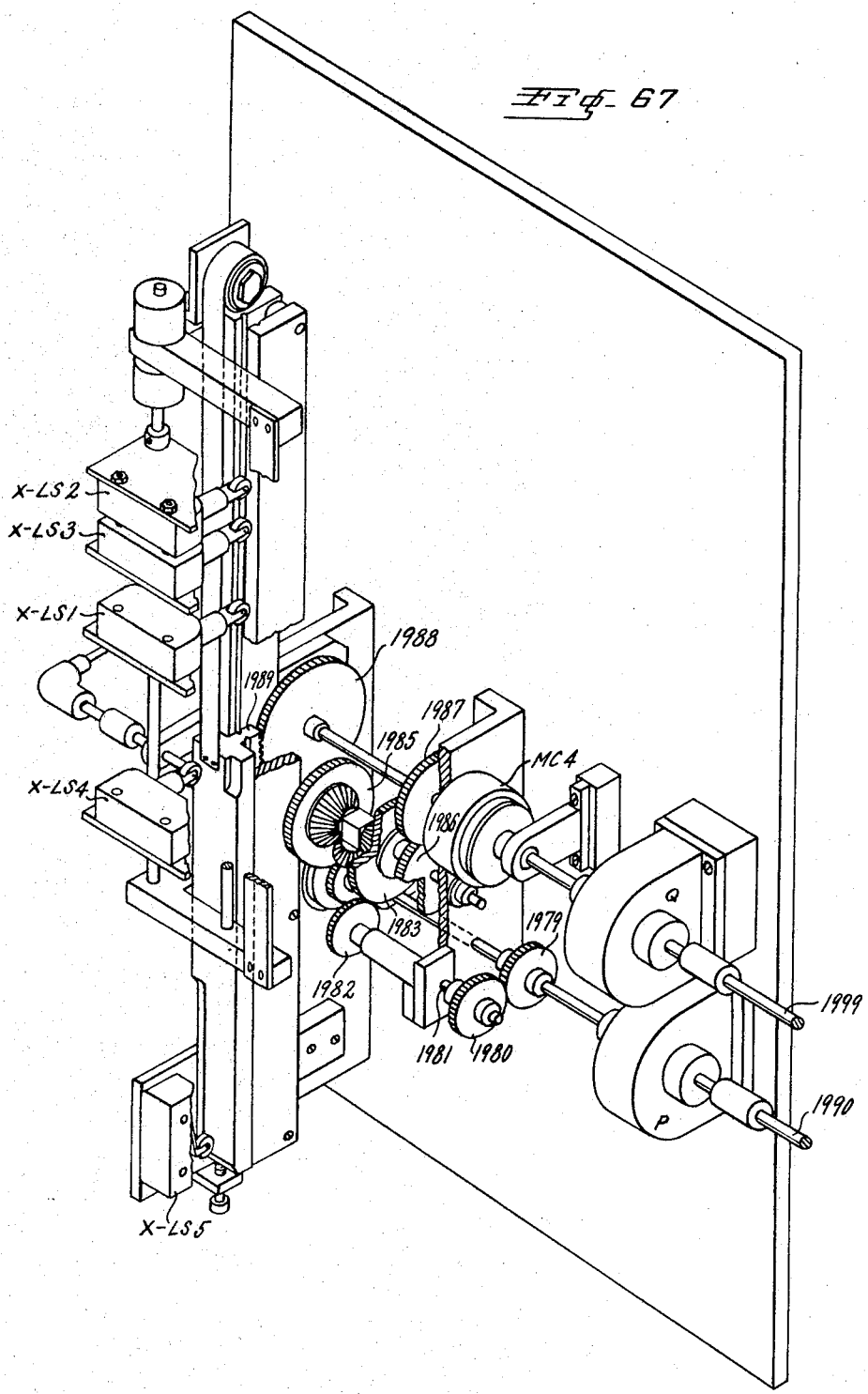

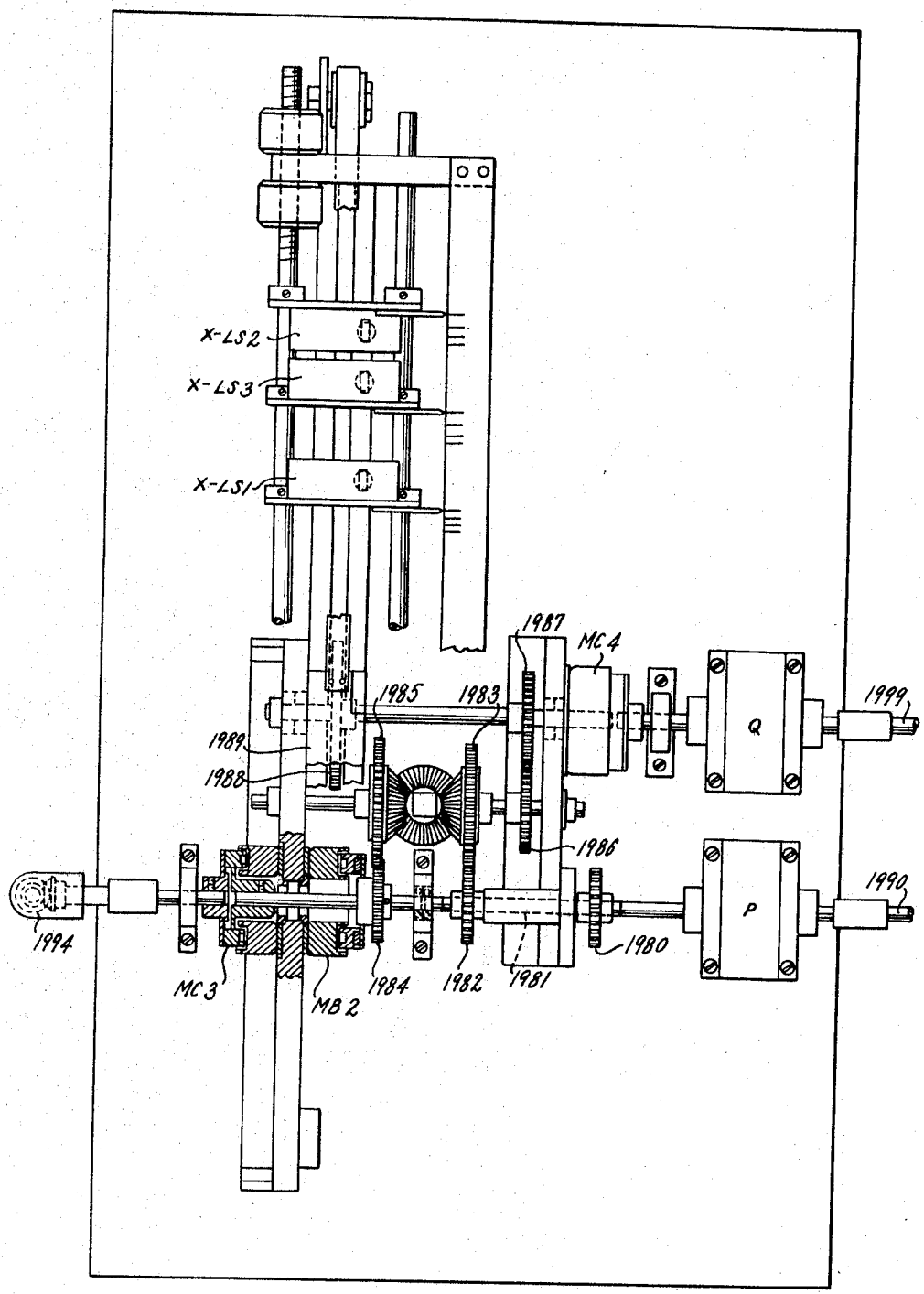

Fig. 69

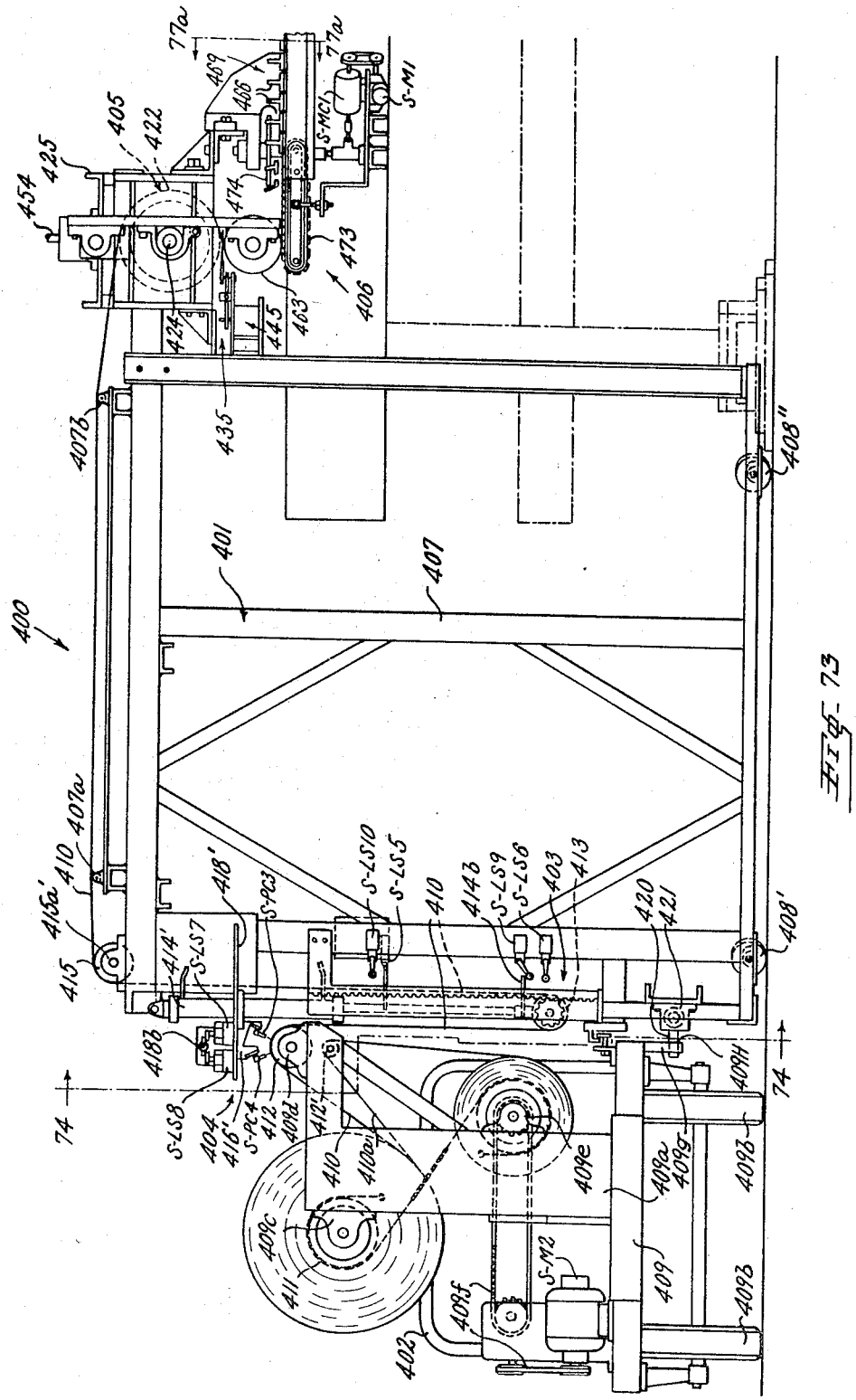

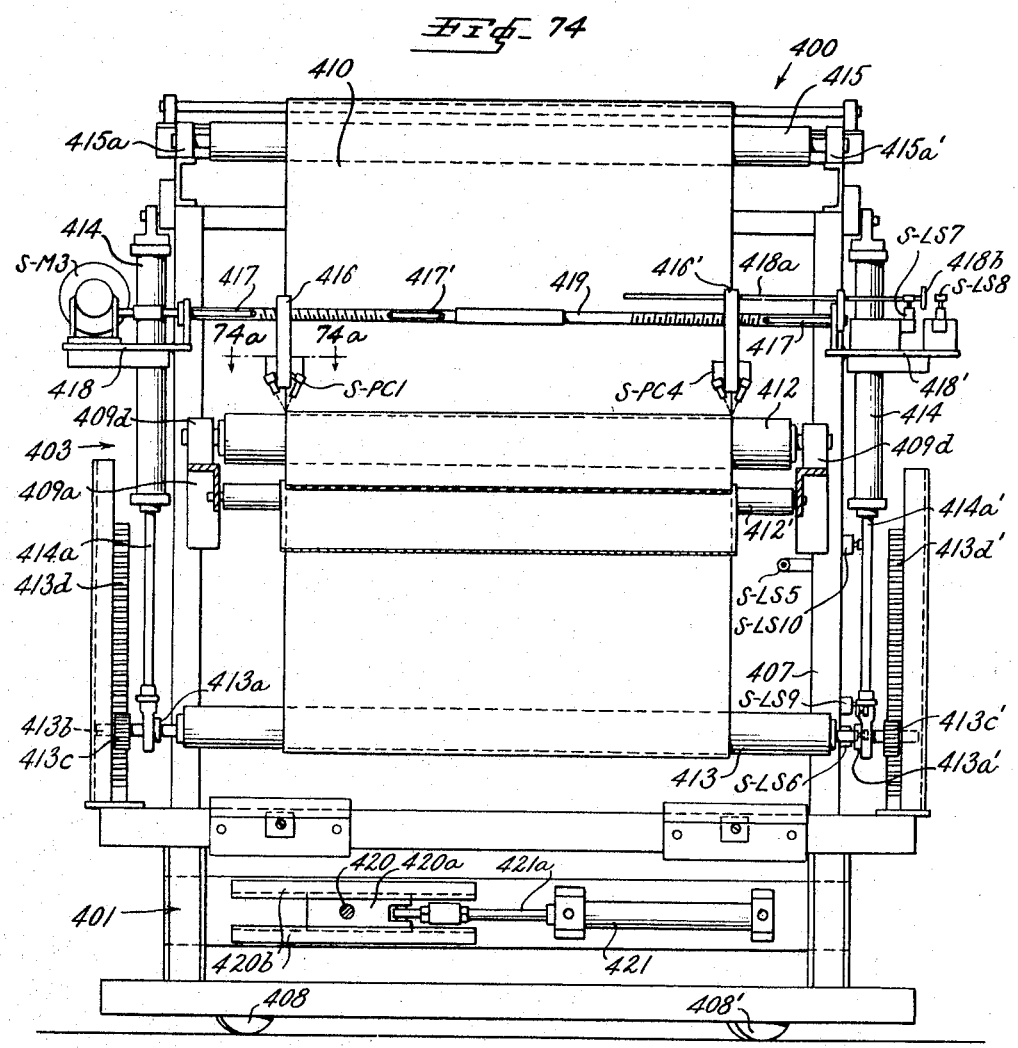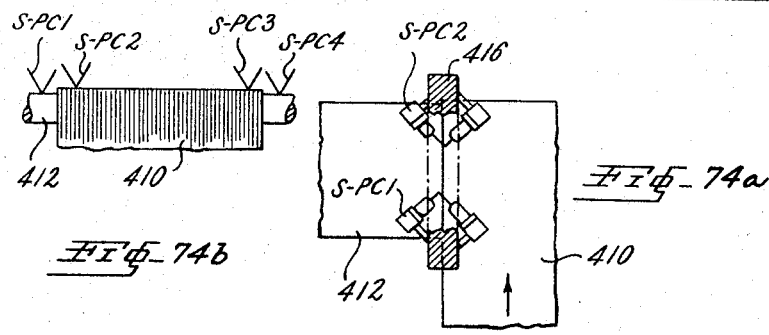

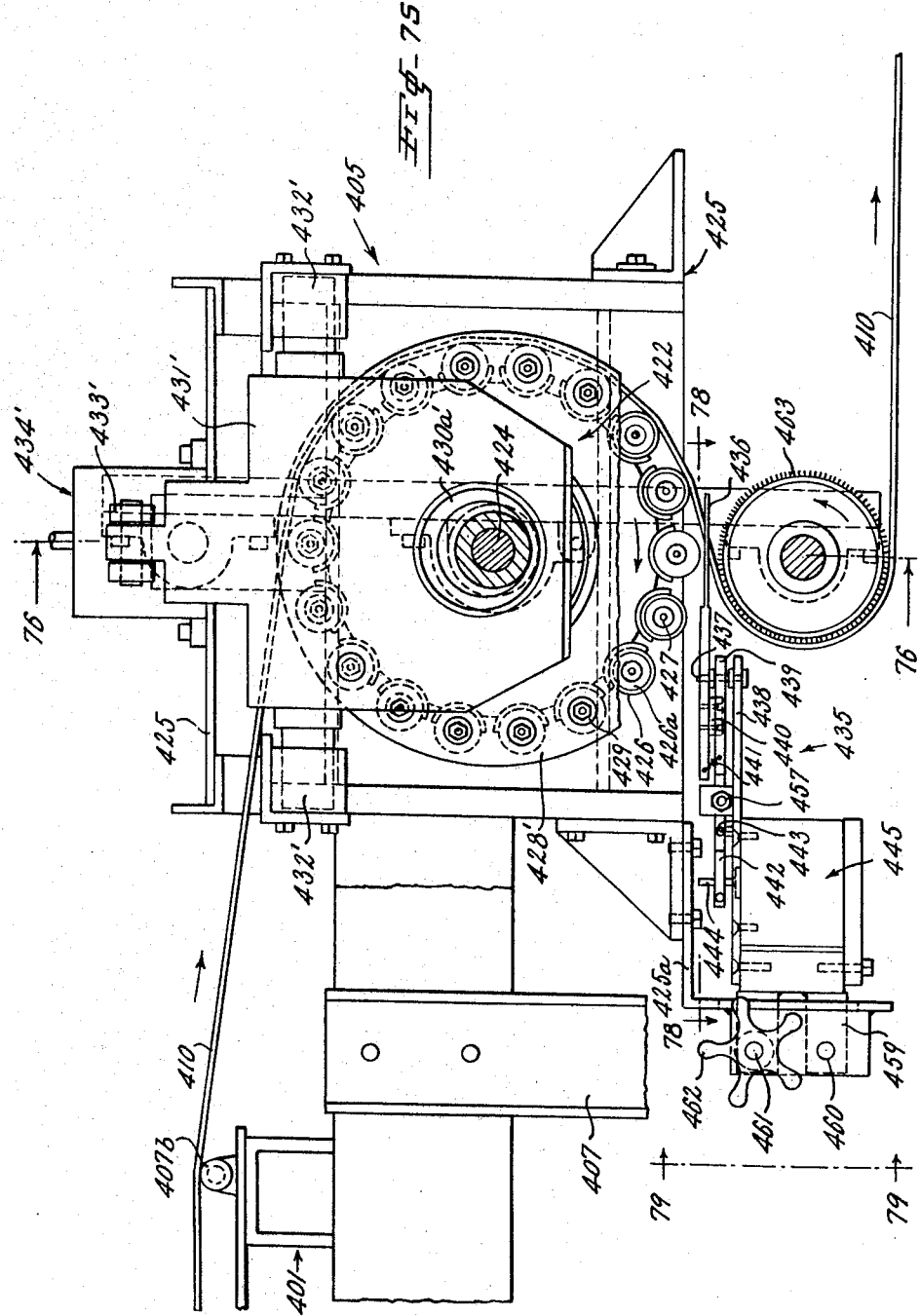

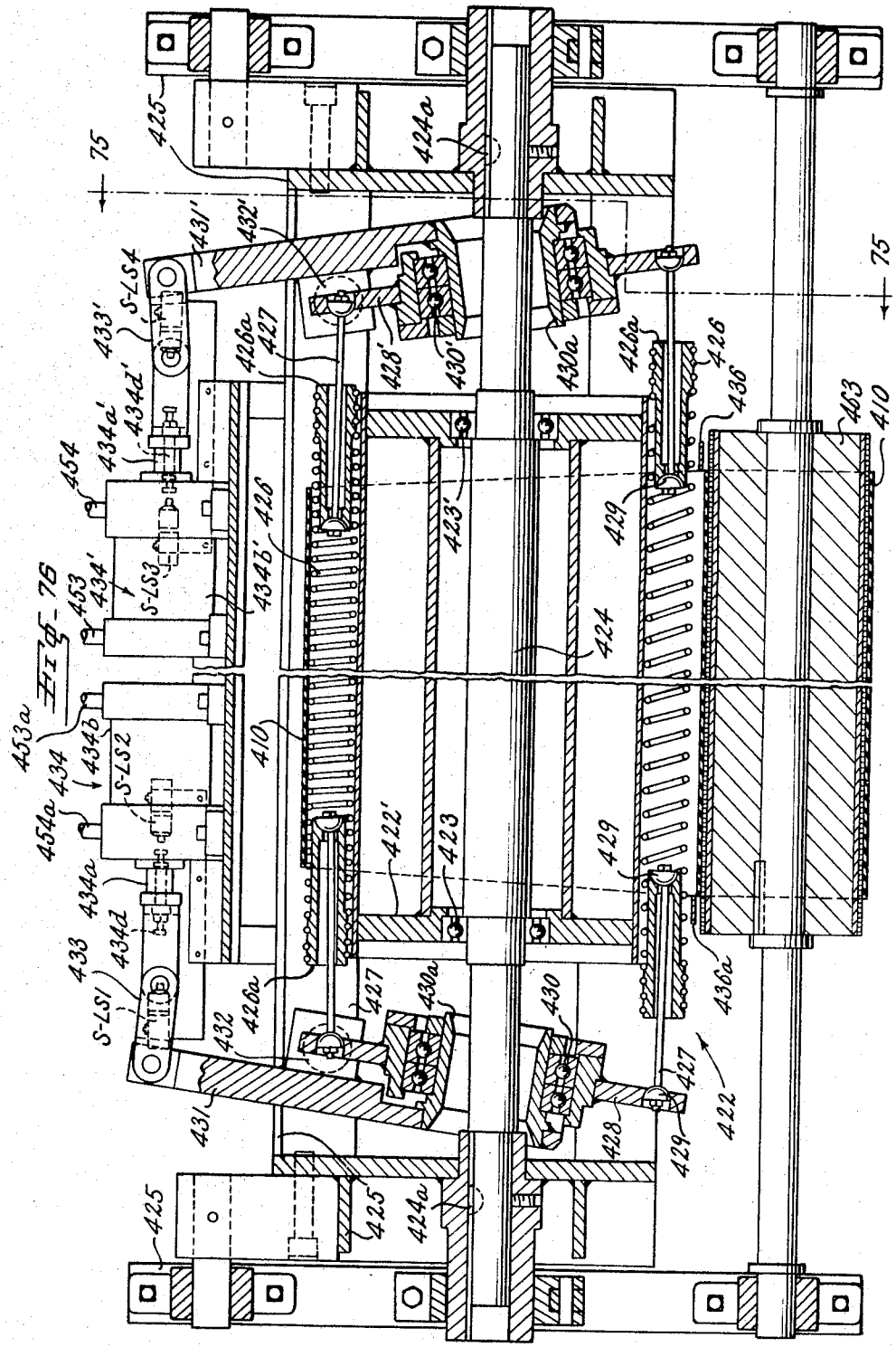

June 6, 1967  S. A. BLACK ET AL  3,323,970
AUTOMATIC TIRE CARCASS BUILDING APPARATUS
Original Filed Dec. 4, 1962  73 Sheets-Sheet 70

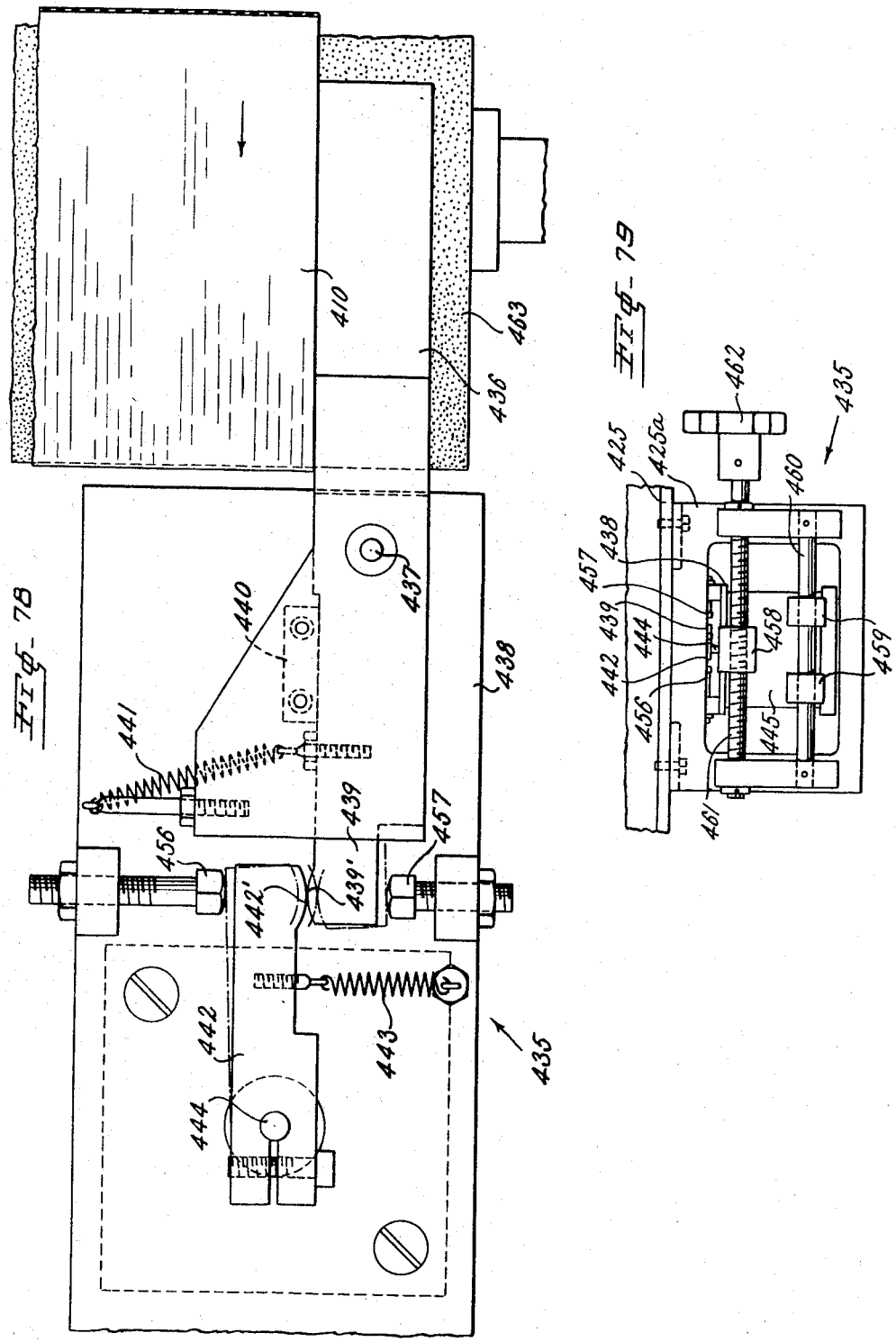

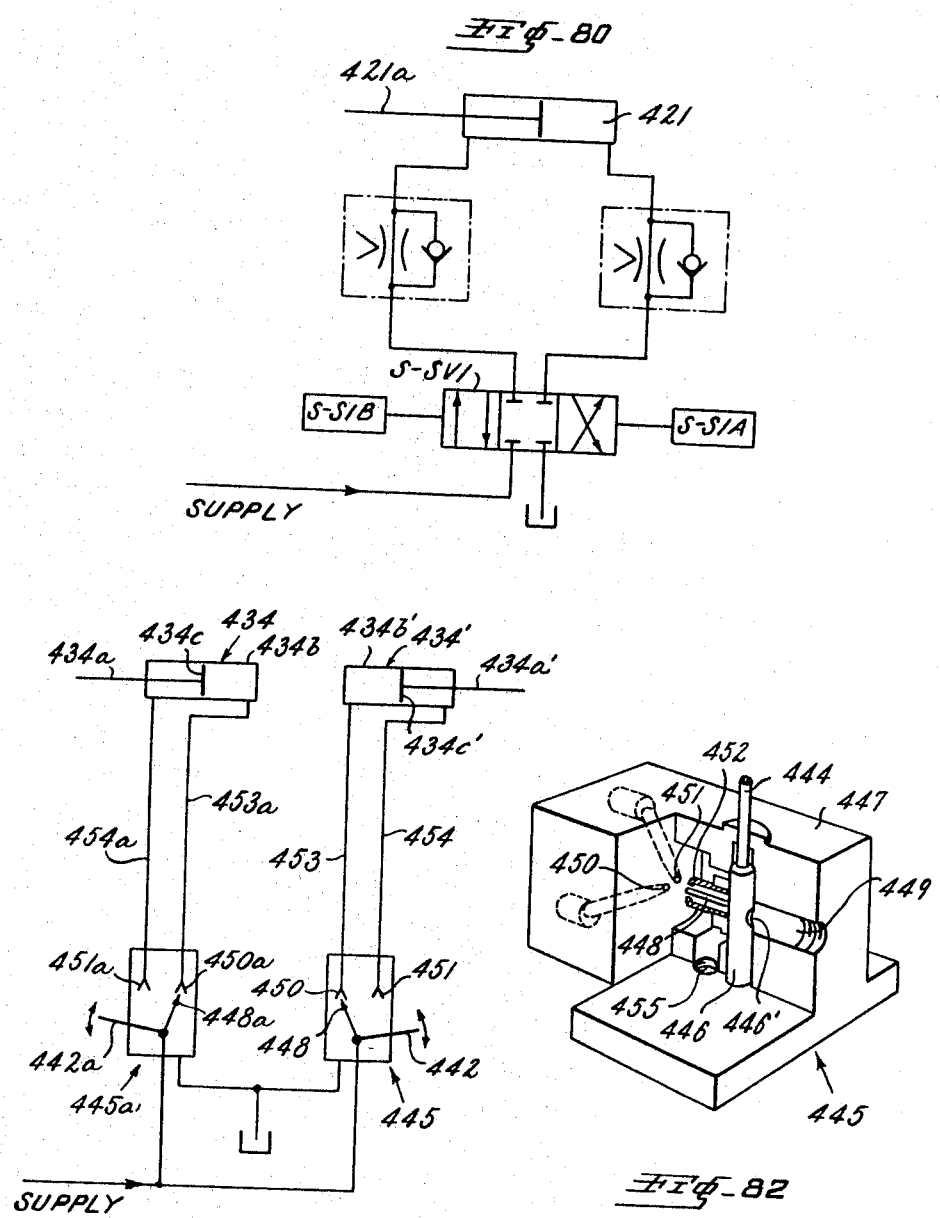

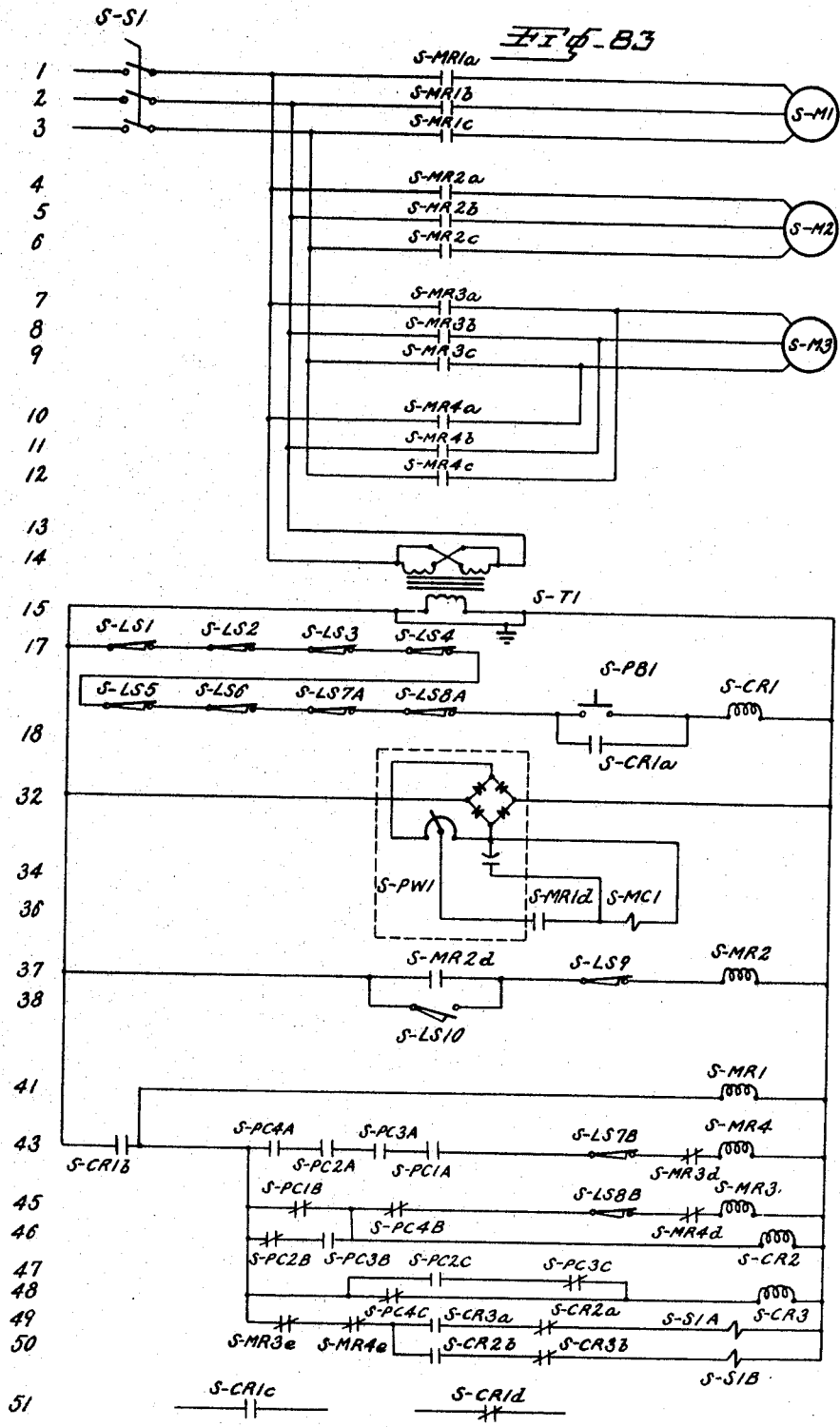

3,323,970
AUTOMATIC TIRE CARCASS BUILDING
APPARATUS
Sheppard A. Black, Wayne, John D. Heide, Ramsey, and Thomas J. Rhodes, Kinnelon, N.J., assignors to Uniroyal, Inc., a corporation of New Jersey
Original application Dec. 4, 1962, Ser. No. 242,197. Divided and this application Mar. 15, 1966, Ser. No. 534,361
20 Claims. (Cl. 156—396)

TABLE OF CONTENTS

| | Column |
|---|---|
| General Description and Explanation of Operation of FIG. 1 apparatus | 5 |
| Description of Drum | 6 |
| Description and Explanation of Operation of Band-Positioning apparatus 100 | 7 |
| Description and Explanation of Operation of Drum Loader 200 | 11 |
| Description of Winding Frame 300 | 16 |
| Description and Explanation of Operation of the First Cutter 700 | 17 |
| Description and Explanation of Operation of Transfer Apparatus 800 | 25 |
| Operation of Second Rotational Lock Apparatus | 26 |
| Description of Second Winding Frame 300A | 26 |
| Description of Second Cutter 700A | 27 |
| Description and Explanation of Operation of Line-to-Turret Synchronizer | 27 |
| Description and Explanation of Operation of Gap Control Mechanism | 28 |
| Description and Explanation of Operation of the First Fabric Let-Off Assembly | 33 |

This application is a division of our copending application Ser. No. 242,197, filed Dec. 4, 1962, and entitled "Method of Making a Tire Carcass."

This invention relates to apparatus for making tire carcasses and, more particularly, to apparatus operative as an automatically controlled system for making tire carcasses continuously.

Prior machines have been proposed for making tire carcasses, but those machines are not capable of making the carcasses automatically. Further, such prior machines are not capable of production of tires at high rates. Further, such prior machines have limitations of accuracy with resulting non-uniformity of tires manufactured.

It is an object of the present invention, therefore, to provide a new and improved apparatus for making tire carcasses which avoids one or more of the above-mentioned disadvantages of prior such apparatus.

It is another object of the invention to provide a new and improved apparatus for making tire carcasses which operates automatically.

It is another object of the invention to provide a new and improved apparatus for making tire carcasses at a high production rate of, for example, 480 tires per hour.

It is another object of the invention to provide a new and improved apparatus for making tire carcasses automatically which provides a high degree of uniformity of the tires manufactured thereby.

In accordance with a particular form of the invention, apparatus for making tire carcasses comprises an elongated support and a plurality of longitudinally aligned drums which are displaceable along the support and which include means for interconnecting the drums with predetermined spacings therebetween. The apparatus includes cam means fixedly positioned with respect to the support and extending longitudinally through the drums for actuating the connecting means to control the interconnection of the drums in accordance with the position of the drums along the cam means. The apparatus also includes means for continuously supplying fabric to the drums and means for driving the drums longitudinally and rotationally along the support to wind the fabric helically around the drums to form a ply for tire carcasses.

For a better understanding of the present invention, together with other and further objects thereof, reference is made to the following description, taken in connection with the accompanying drawings, and its scope will be pointed out in the appended claims.

Referring to the drawings:

FIG. 1 is a plan view, partly schematic, of apparatus constructed in accordance with the invention;

FIG. 2 is an end view of a drum constructed in accordance with the invention;

FIG. 3 is a partly sectional view of a drum, taken along line 3—3 of FIG. 2;

FIG. 5 is a side elevational view of the band-positioning apparatus;

FIG. 5a is a fragmentary plan view of the band-positioning apparatus to represent a drum clamp mechanism, taken along line 5a—5a of FIG. 5;

FIG. 5b is a sectional view of the drum clamp mechanism, taken along line 5b—5b of FIG. 5a;

FIG. 6 is a plan view of the band-positioning apparatus with the drum clamp of FIGS. 5a and 5b removed for clarity;

FIG. 7 is a fragmentary plan view, taken along line 7—7 of FIG. 5 with the drum clamp of FIGS. 5a and 5b removed for clarity;

FIG. 8 is a fragmentary side elevational view of apparatus represented in FIG. 7;

FIG. 11 is a sectional view of the band-positioning apparatus taken along line 11—11 of FIG. 10;

FIG. 12 is an enlarged fragmentary view, partly in section, of a portion of the band-positioning apparatus to represent the arms and fingers thereof;

FIGS. 13a–13e are fragmentary views of the arms and fingers of the band-positioning apparatus to represent the operation thereof;

Figure 14A:
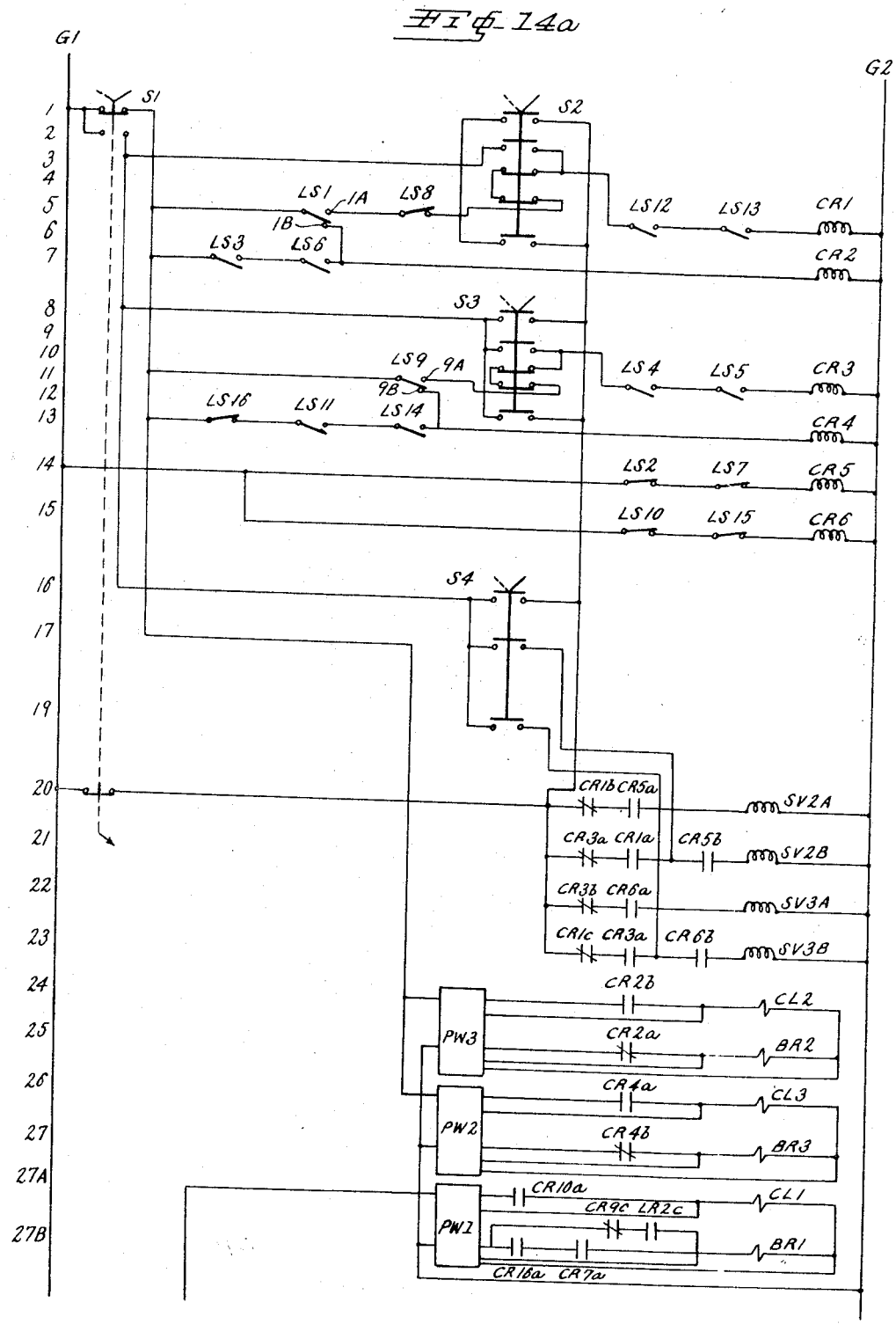
Figure 29:
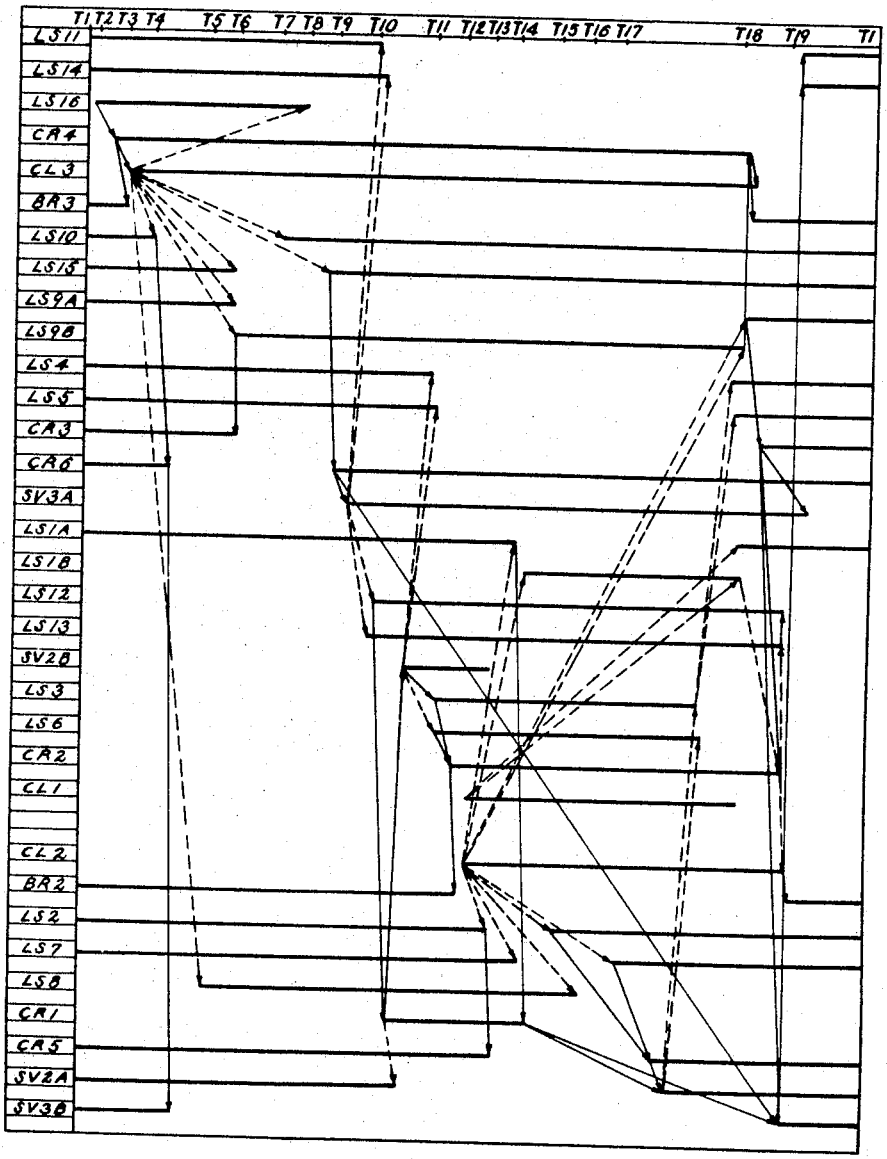
Figure 39:
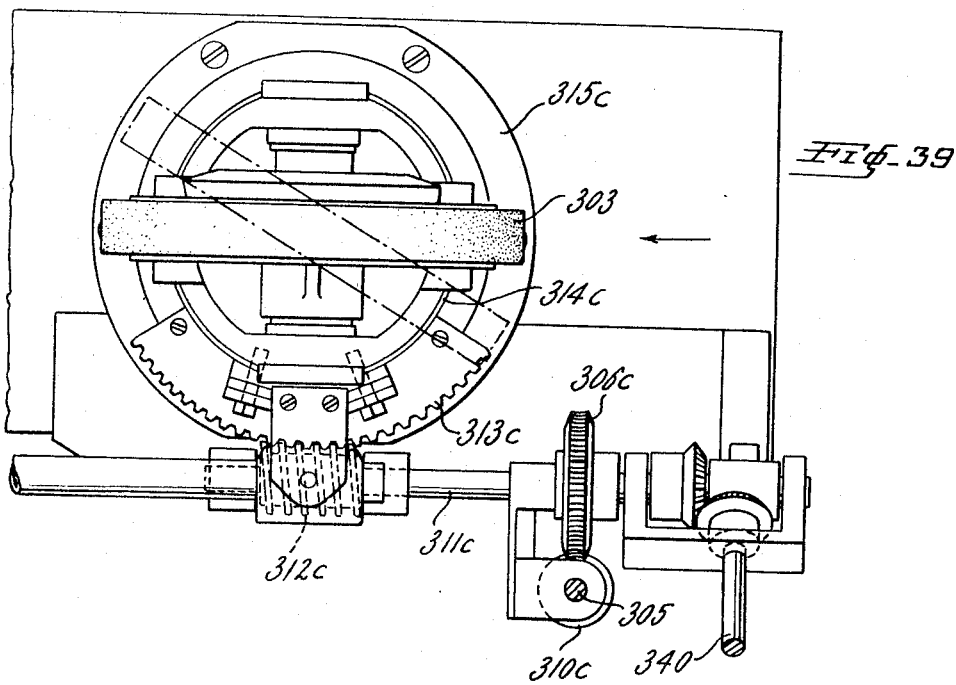
Figure 40:
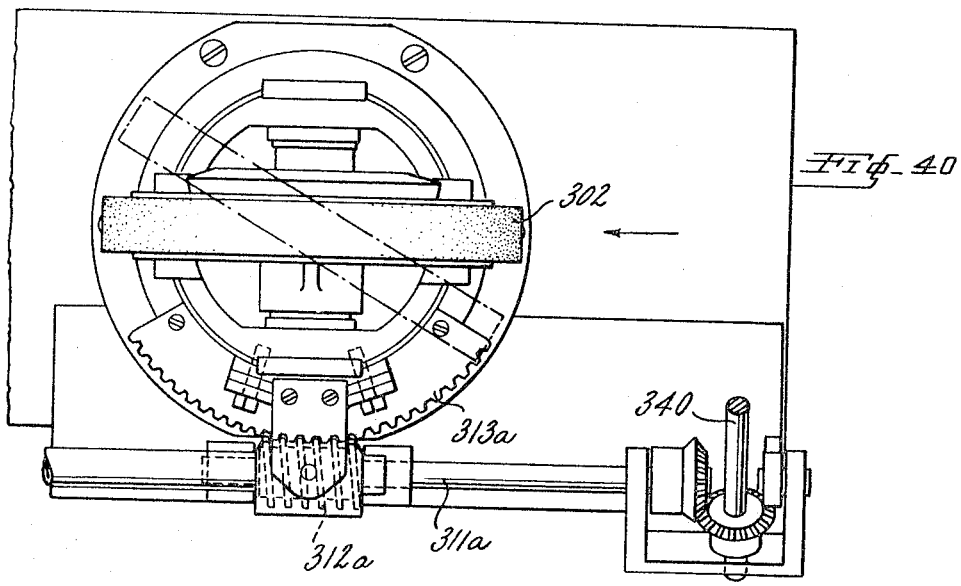
Figure 41:
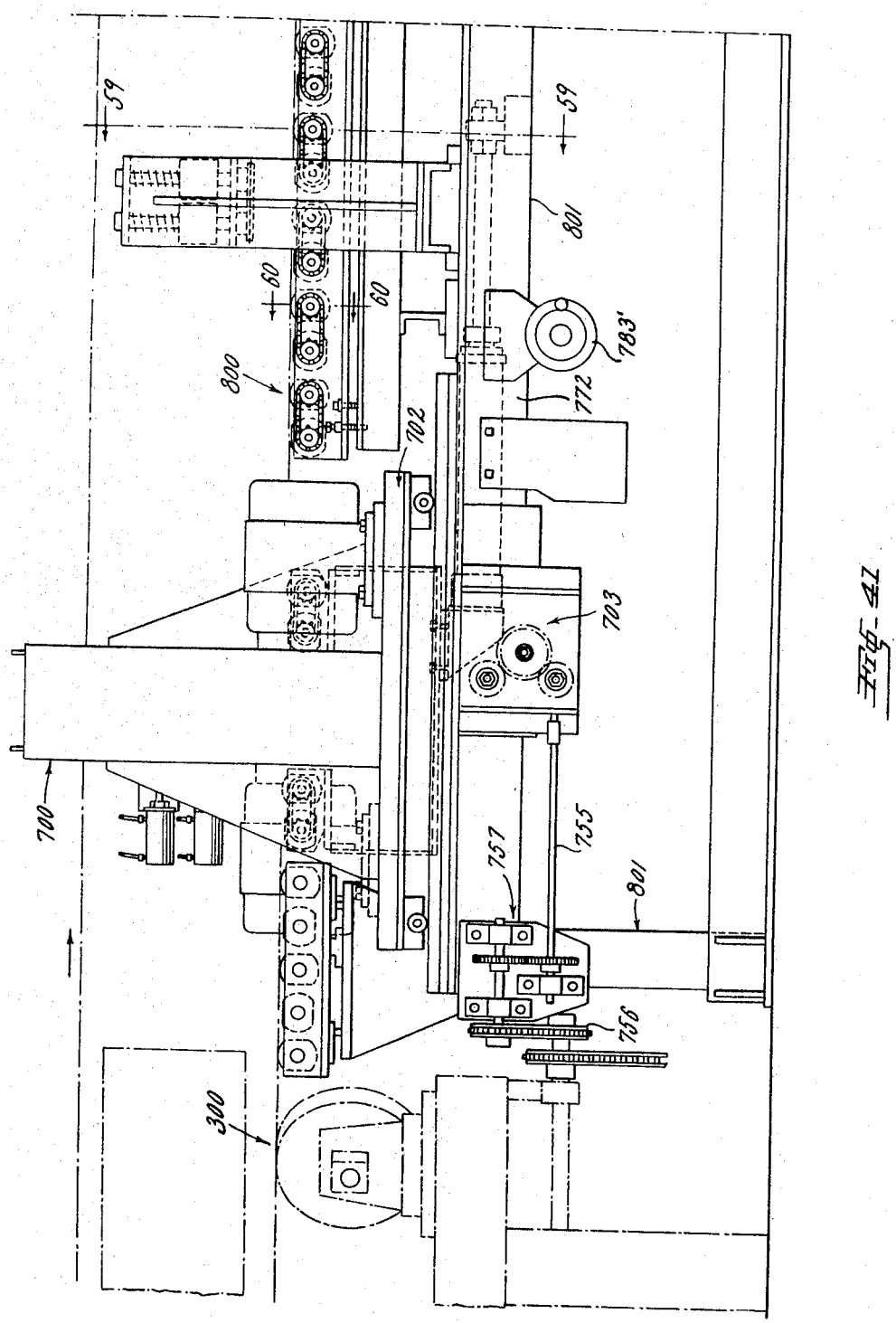
Figure 42:
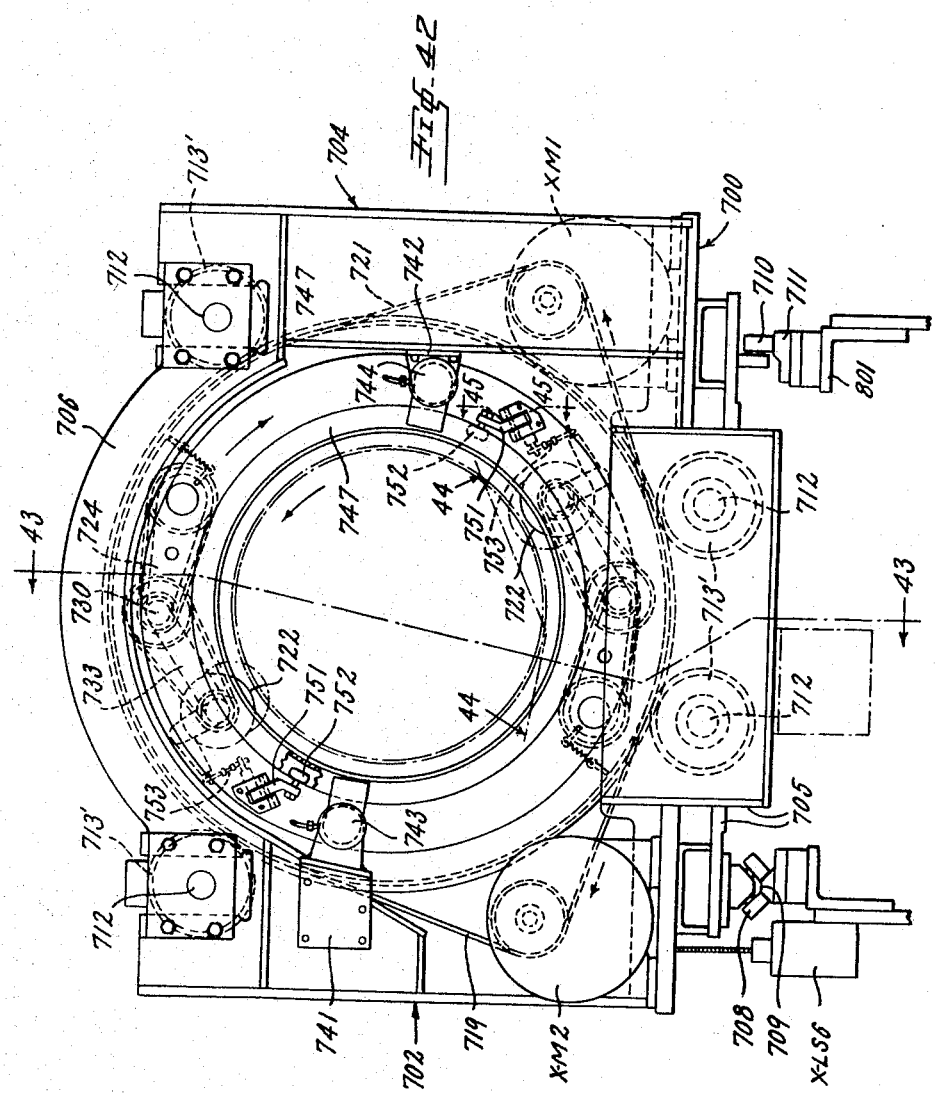
Figure 43:
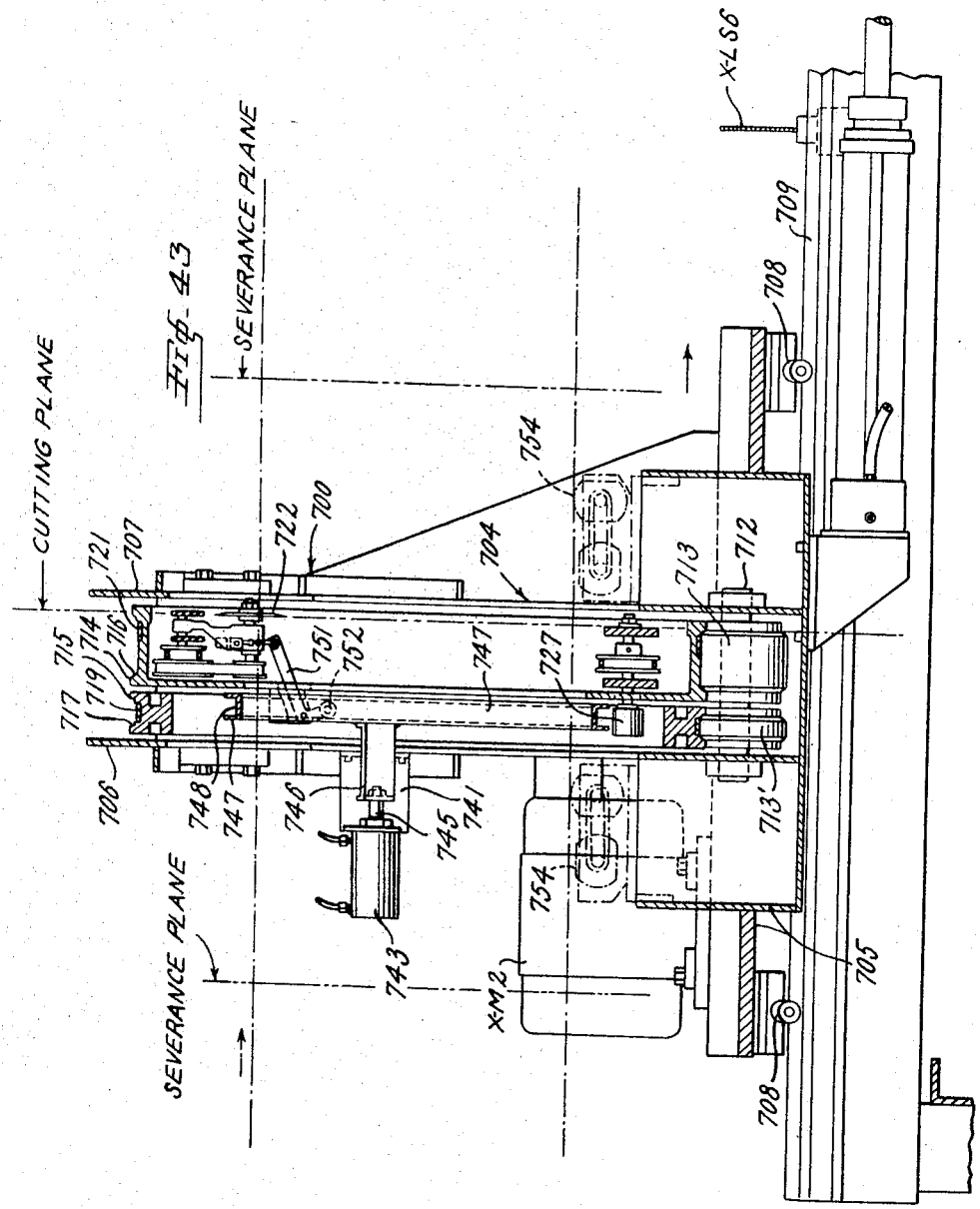
Figure 44:
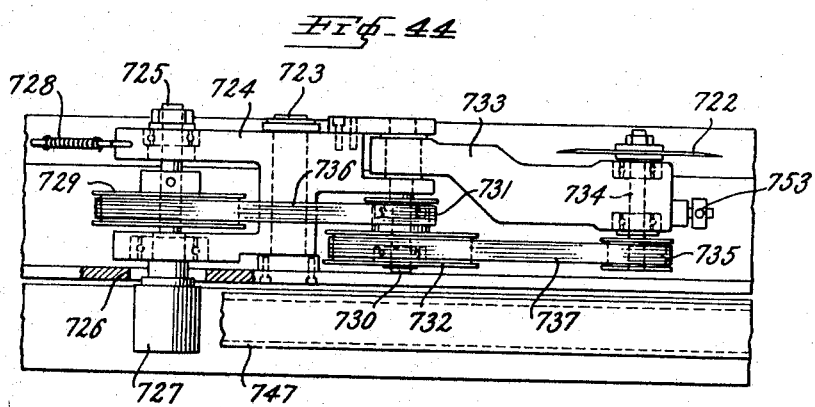
Figure 45:
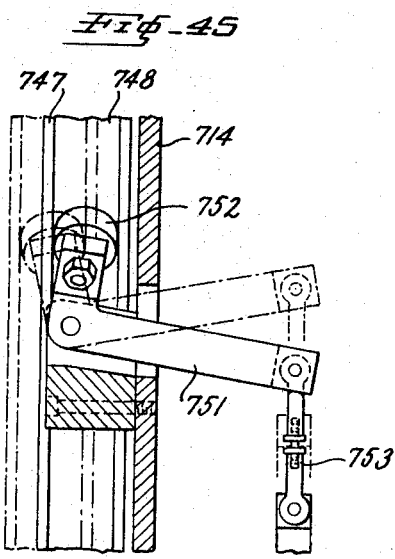
Figure 46:
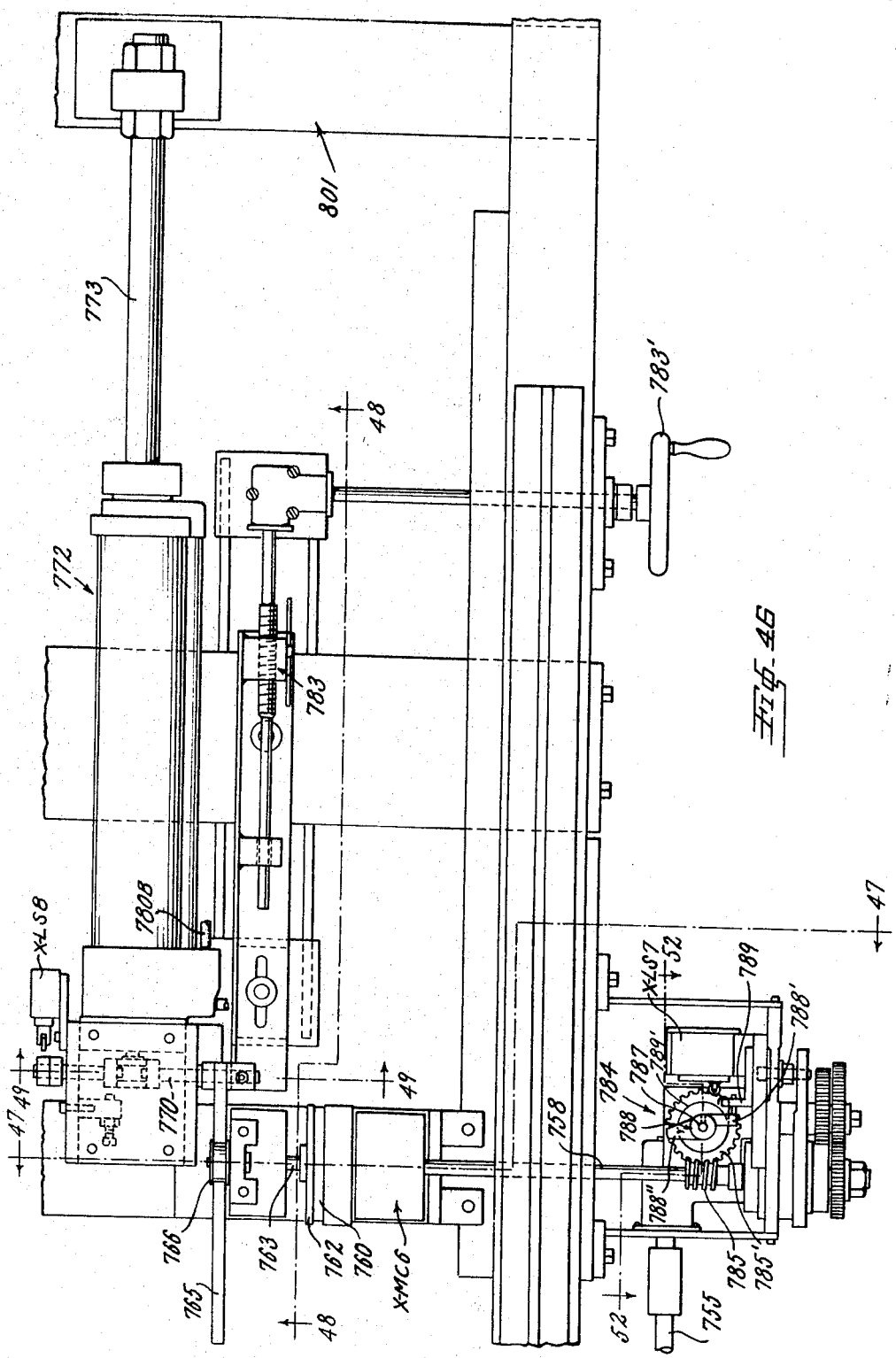
Figure 47:
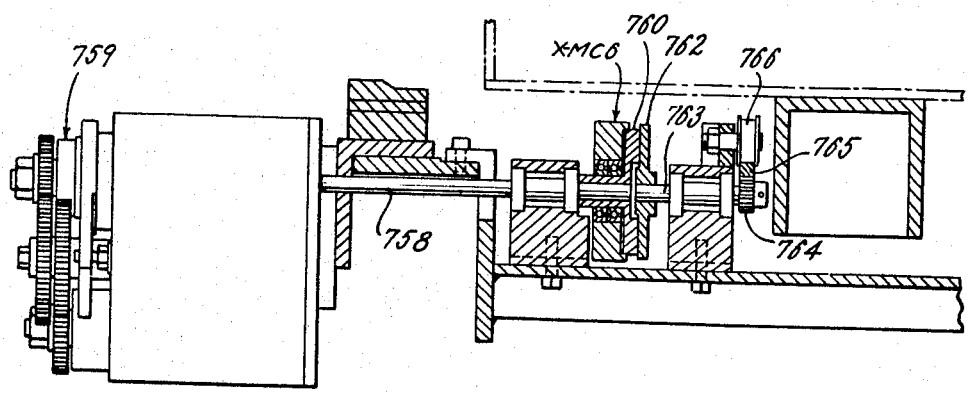
Figure 52:
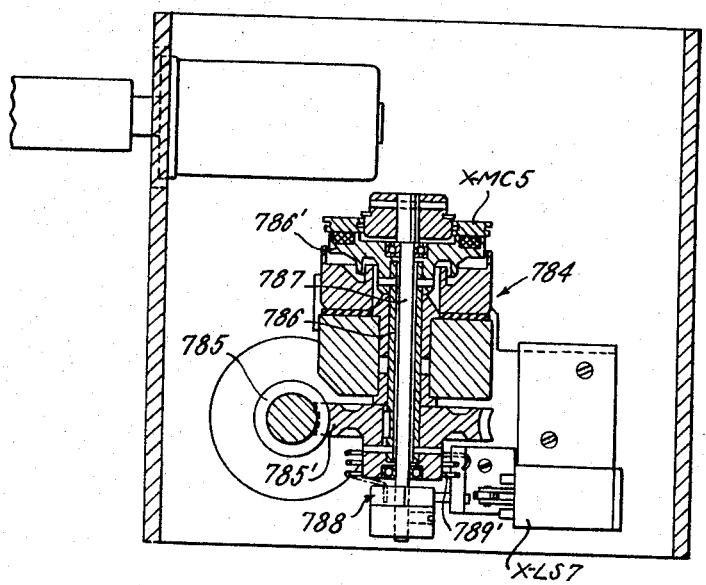
Figure 53:
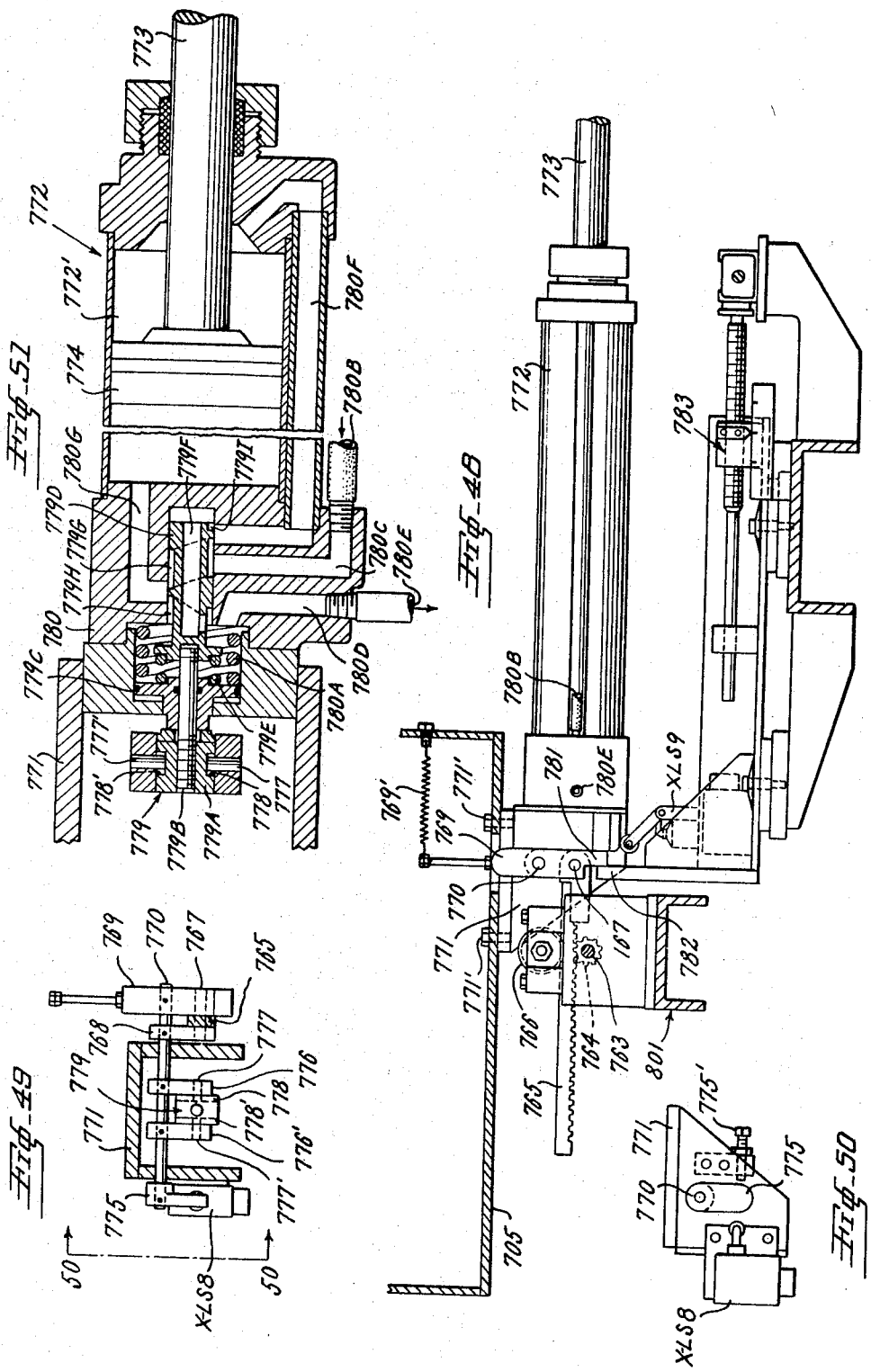
Figure 54:
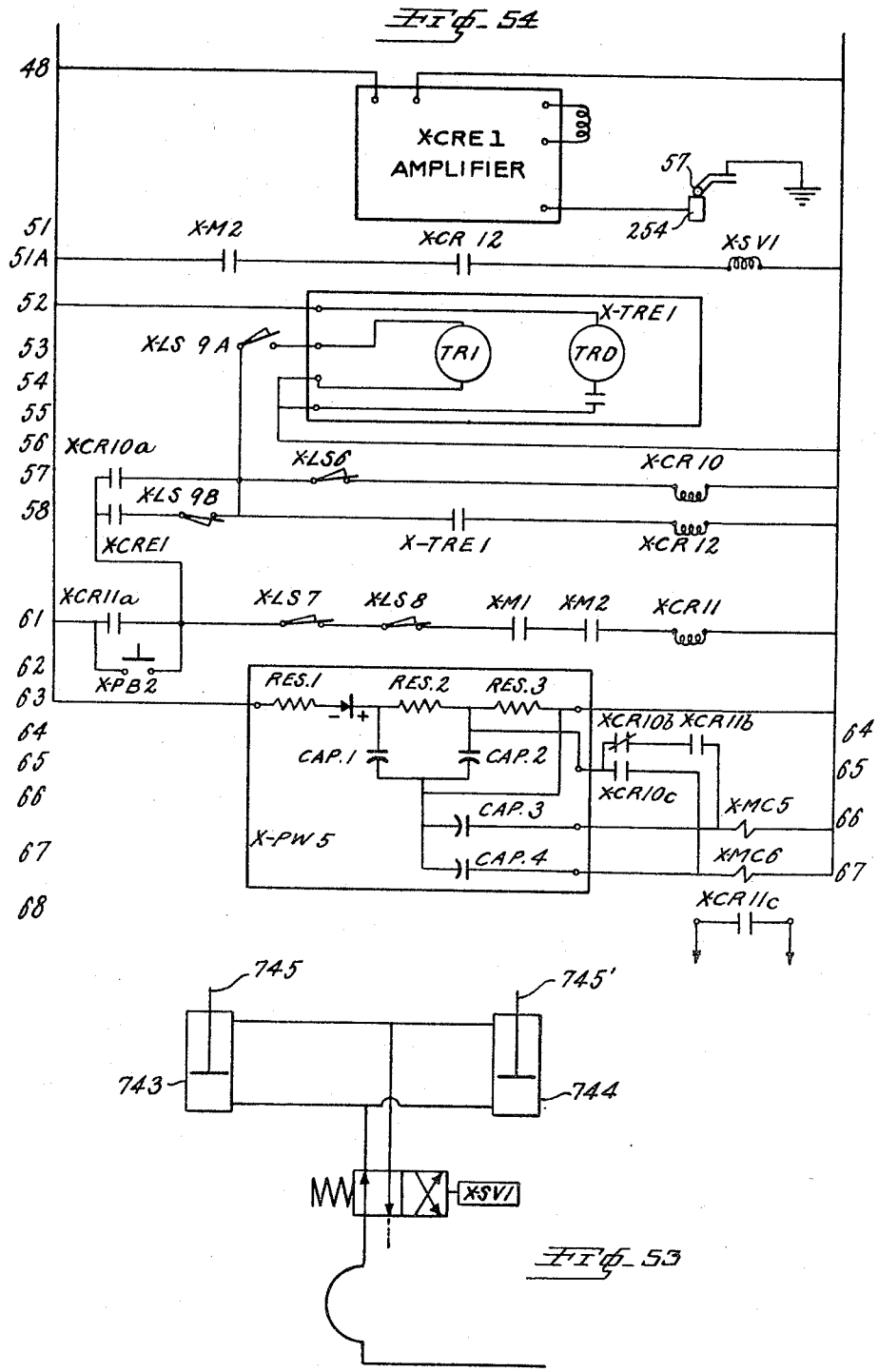
Figure 55:
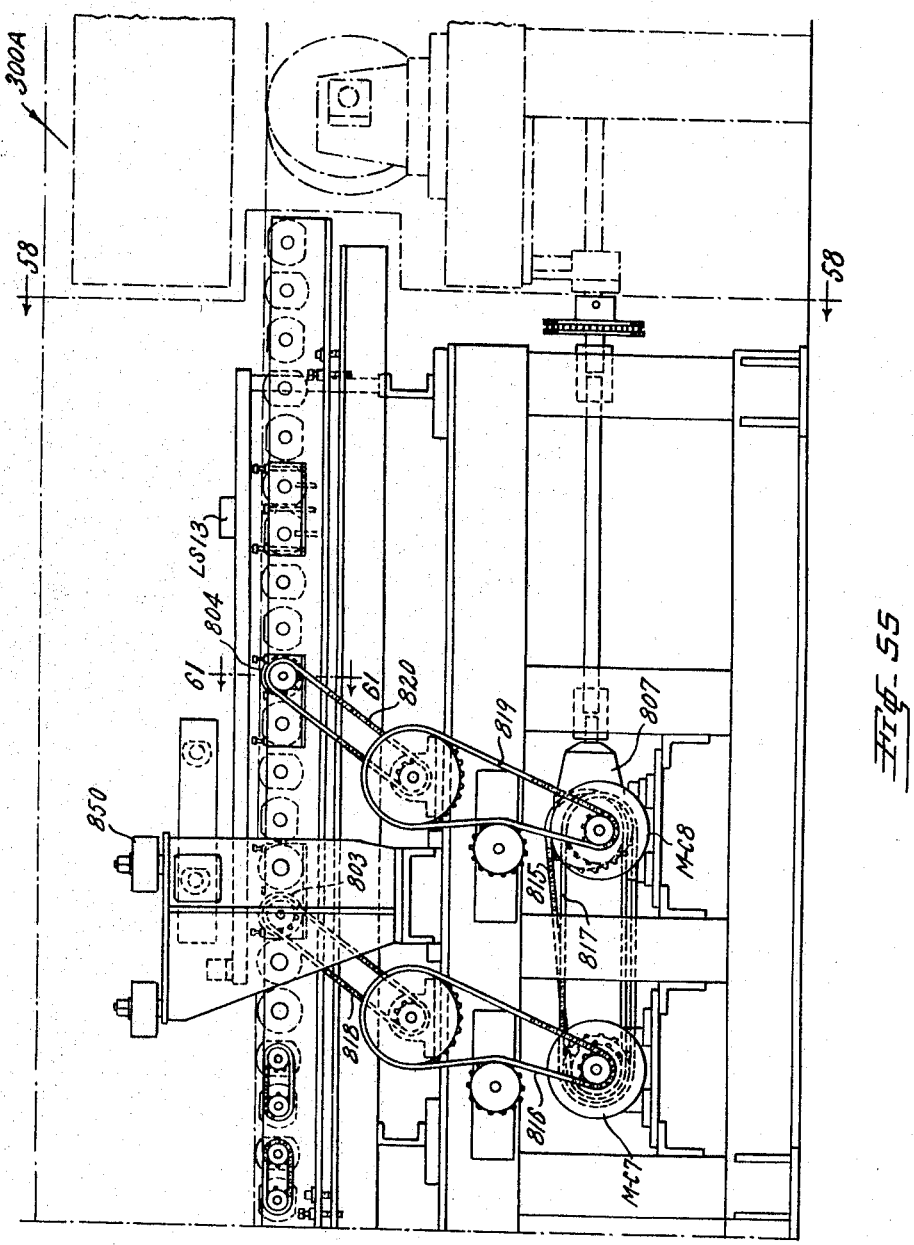
Figure 56:
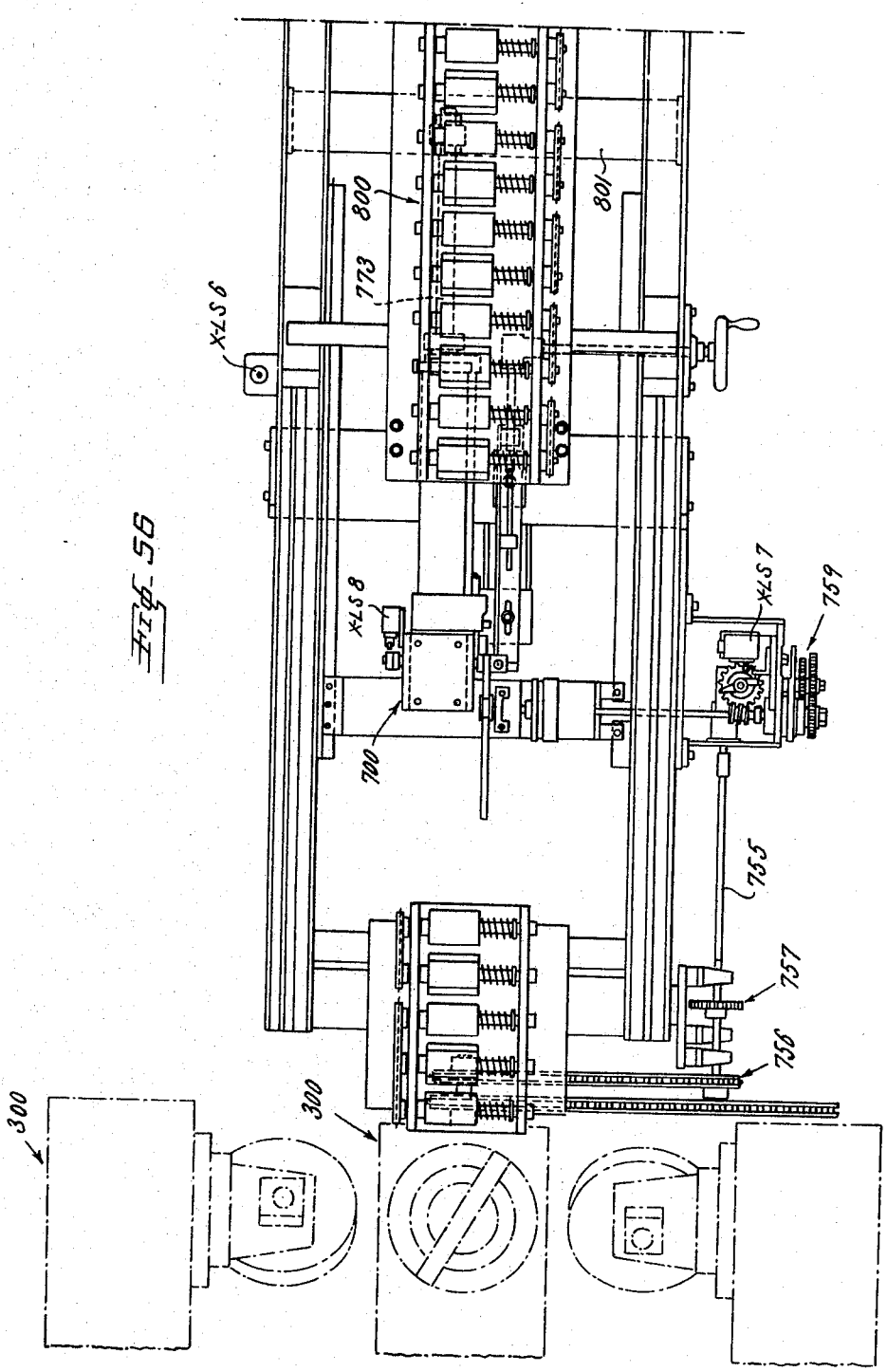
Figure 57:
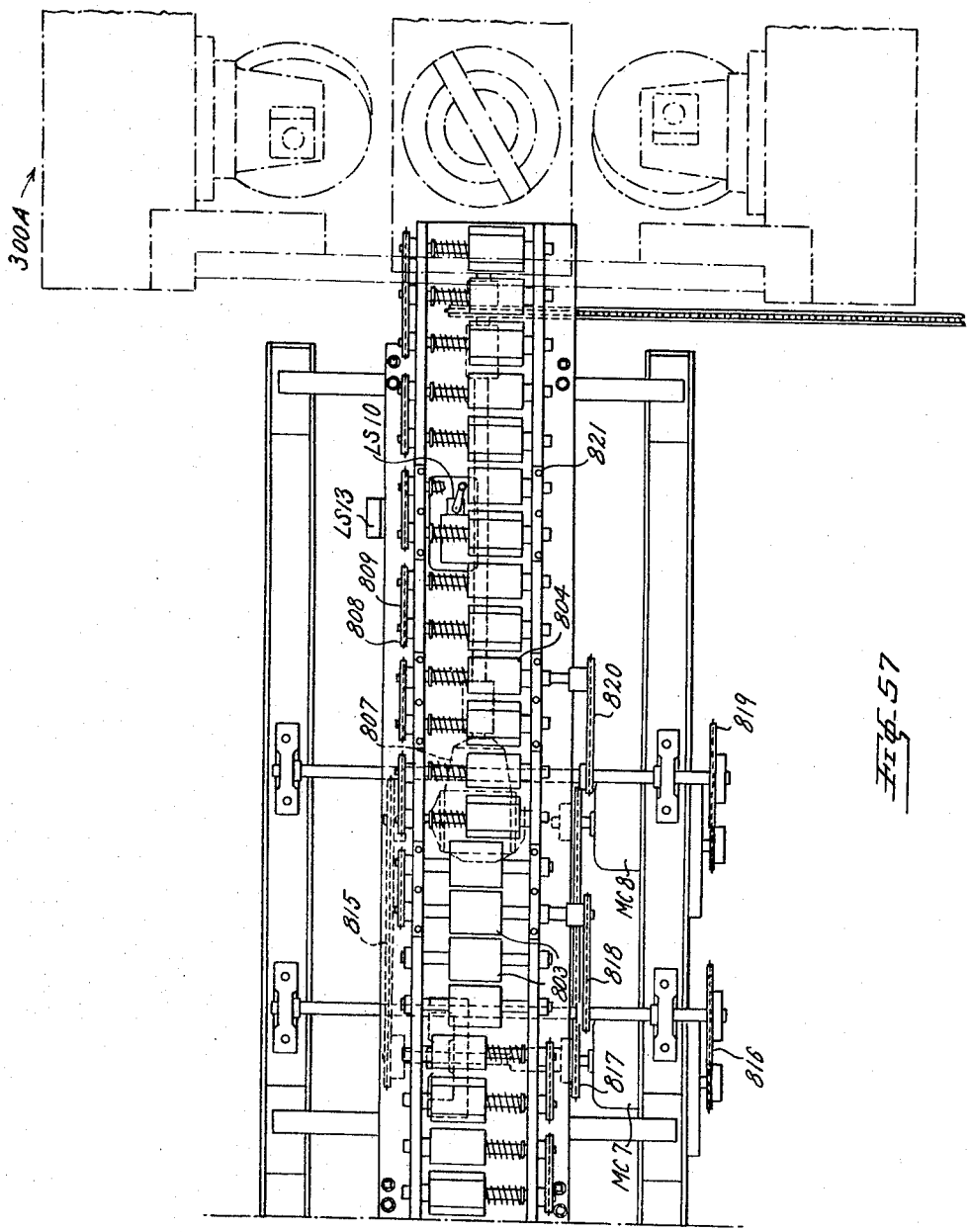
Figure 58:
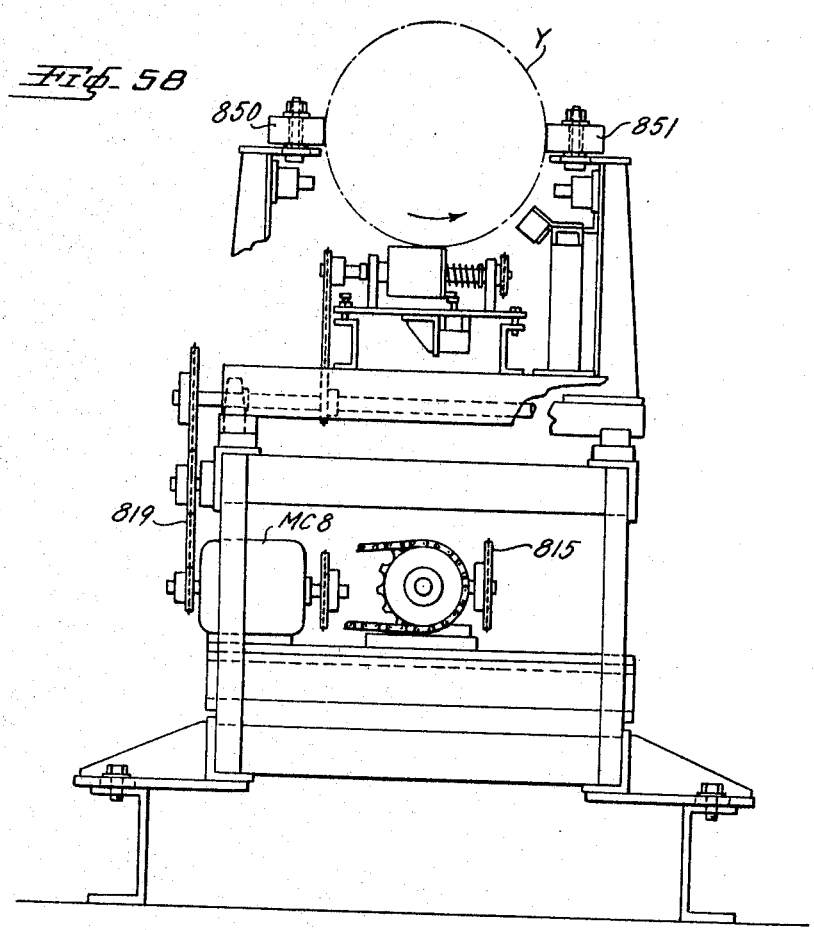
Figure 59:
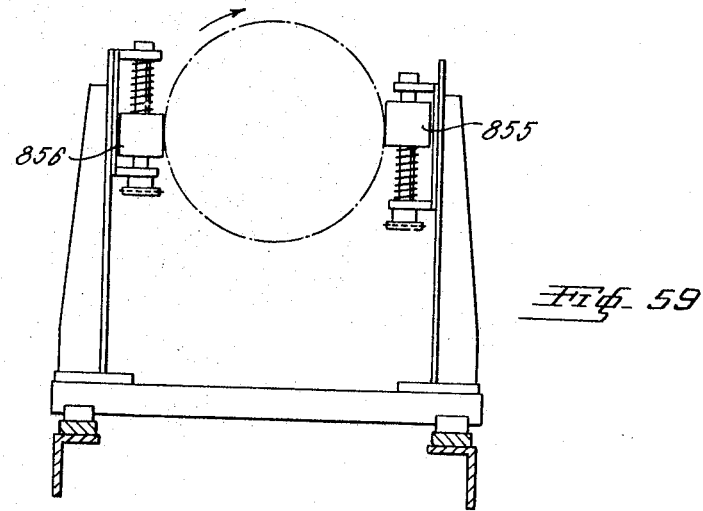
Figure 60:
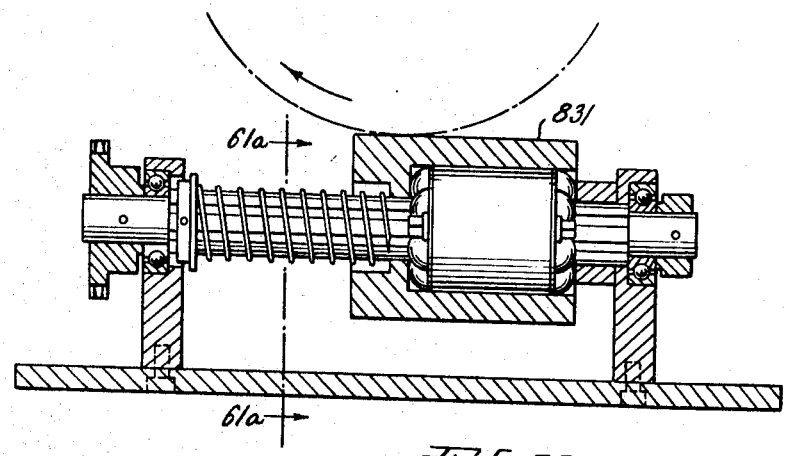
Figure 61:
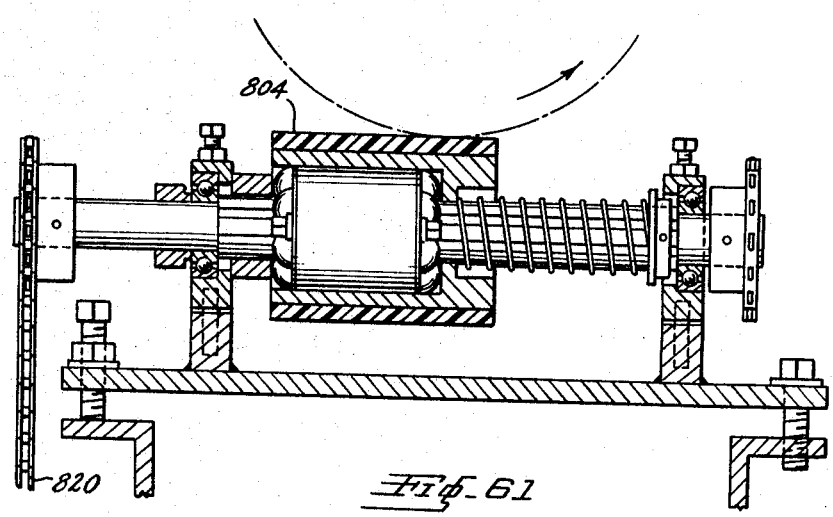
Figure 61A:
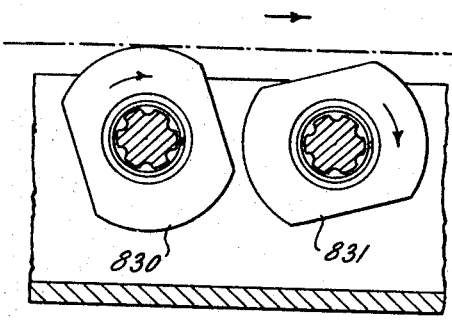
Figure 63A:
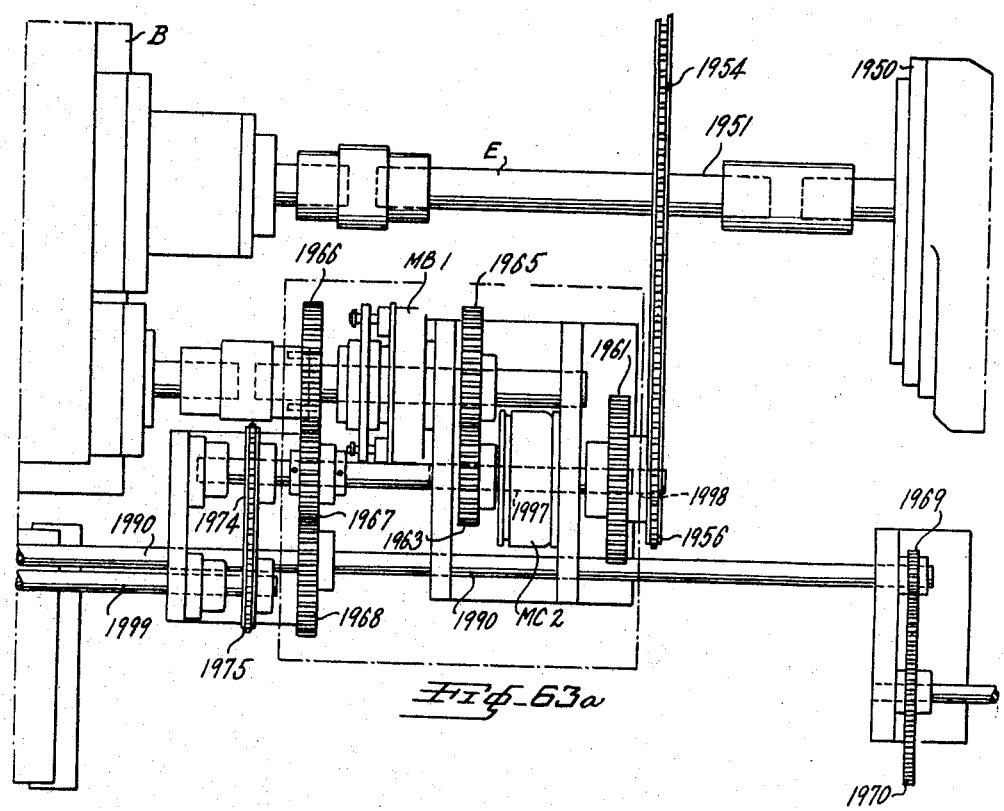
Figure 63B:
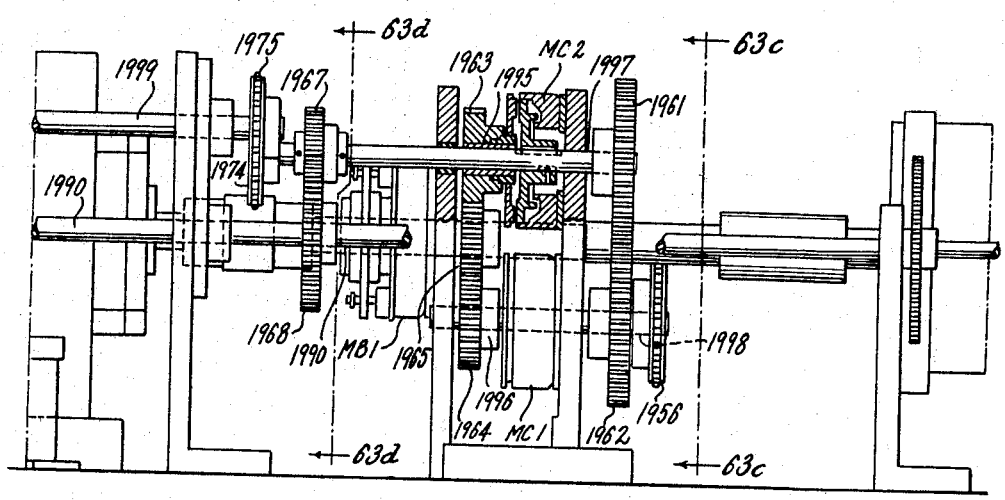
Figure 63C:
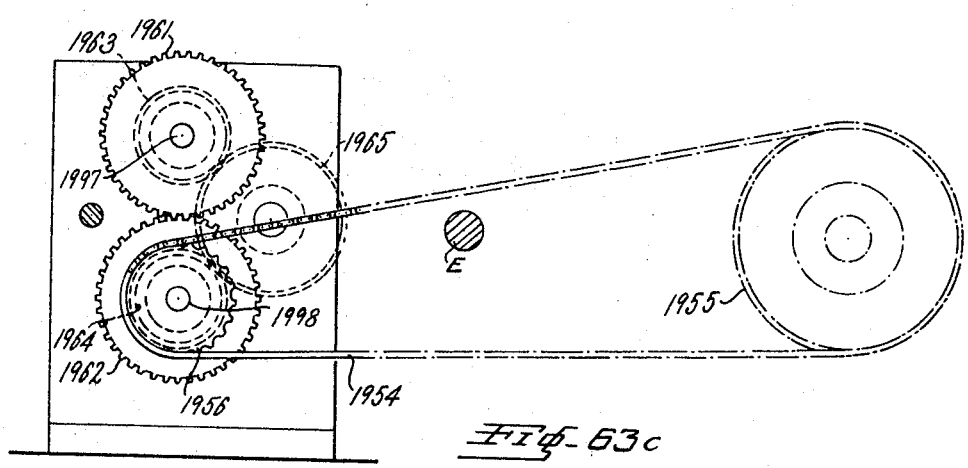
Figure 63D:
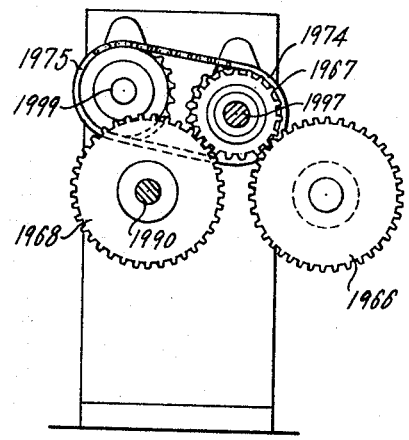
Figure 70:
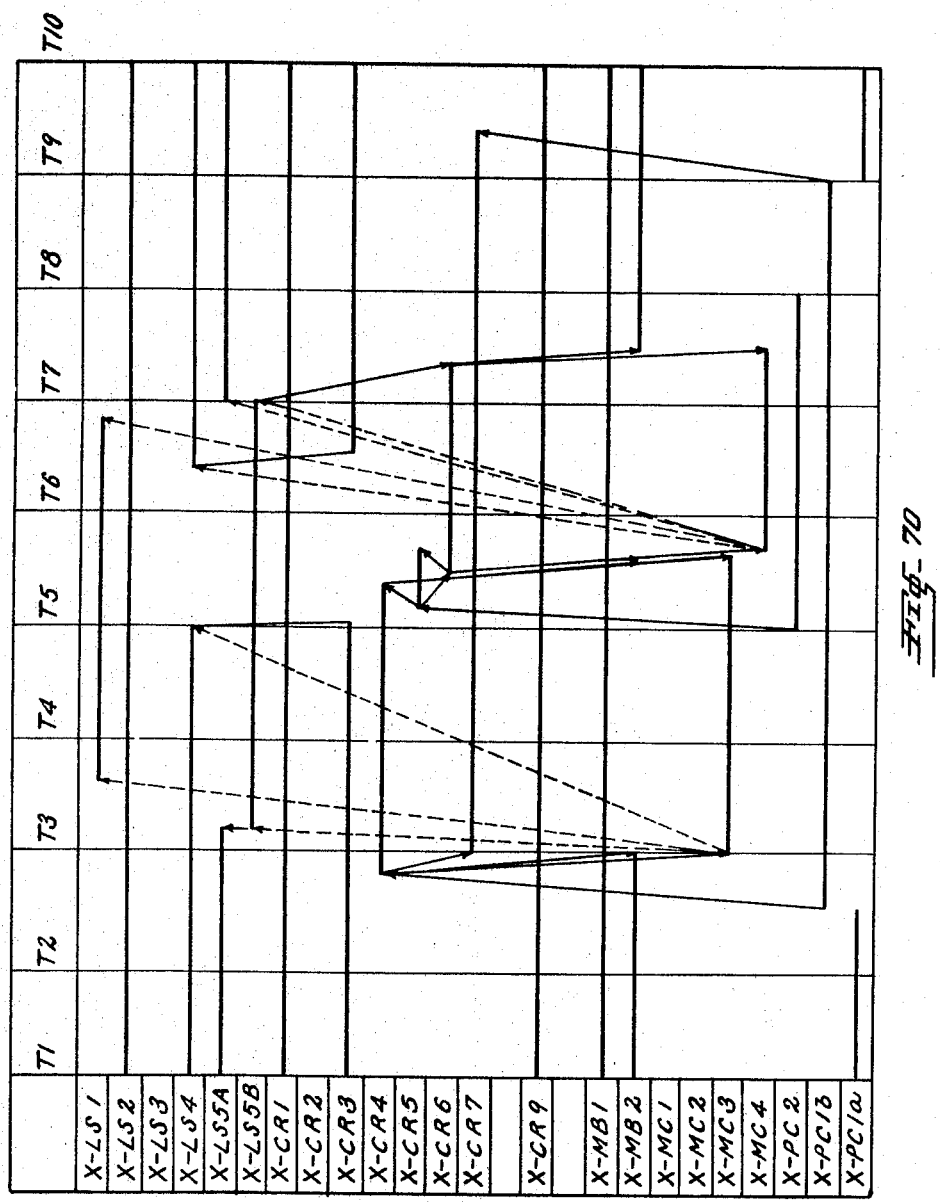
Figure 72:
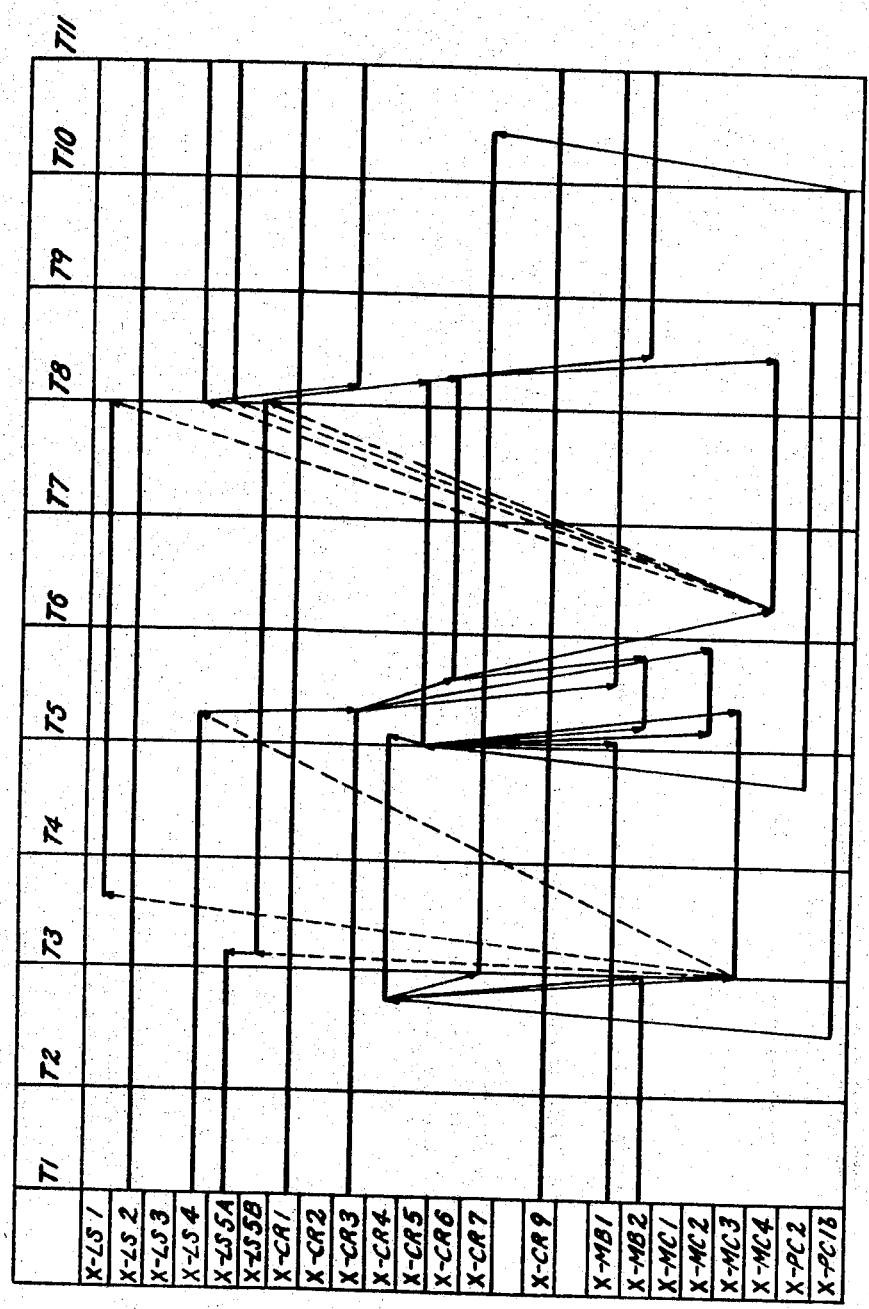
Figure 72:
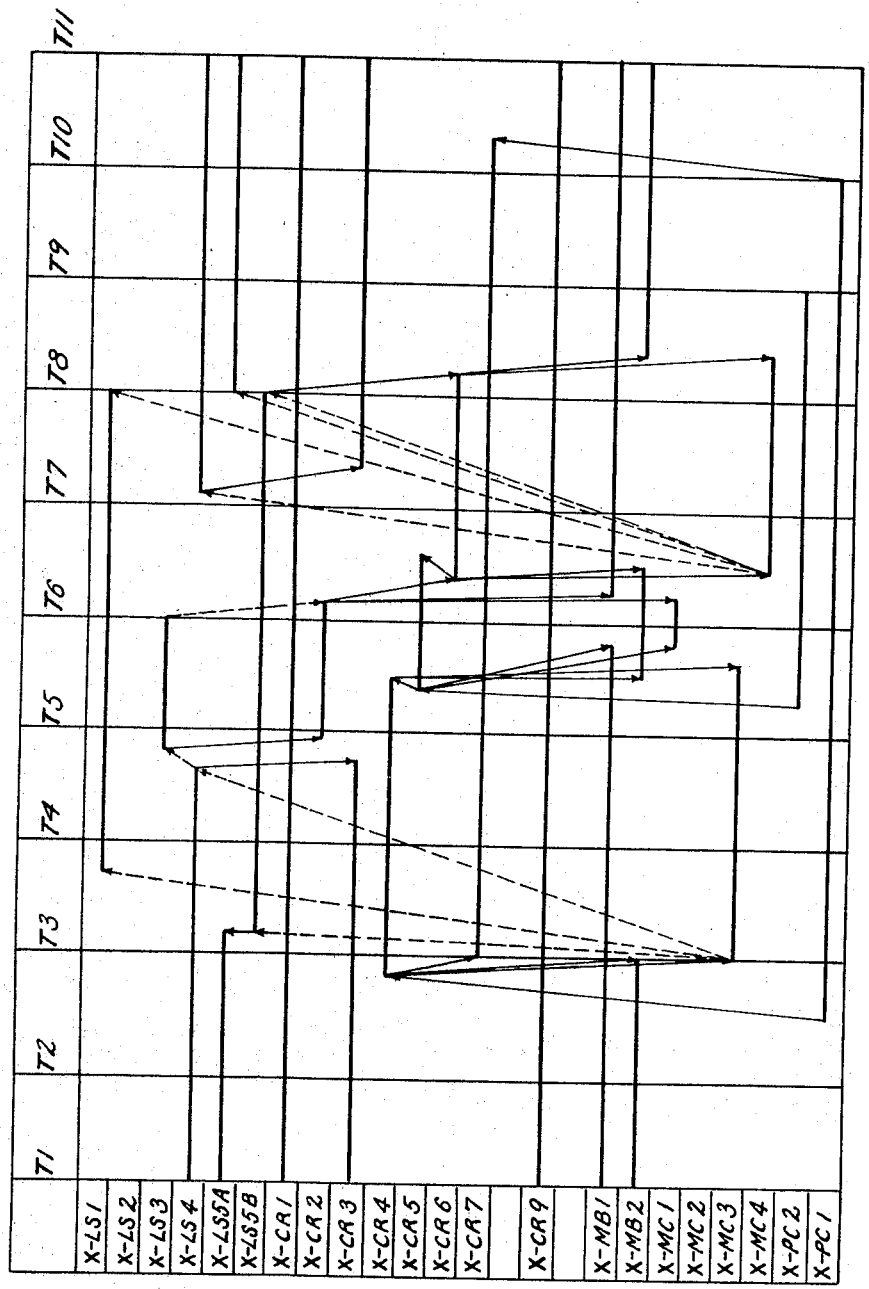
Figures 77, 77A:
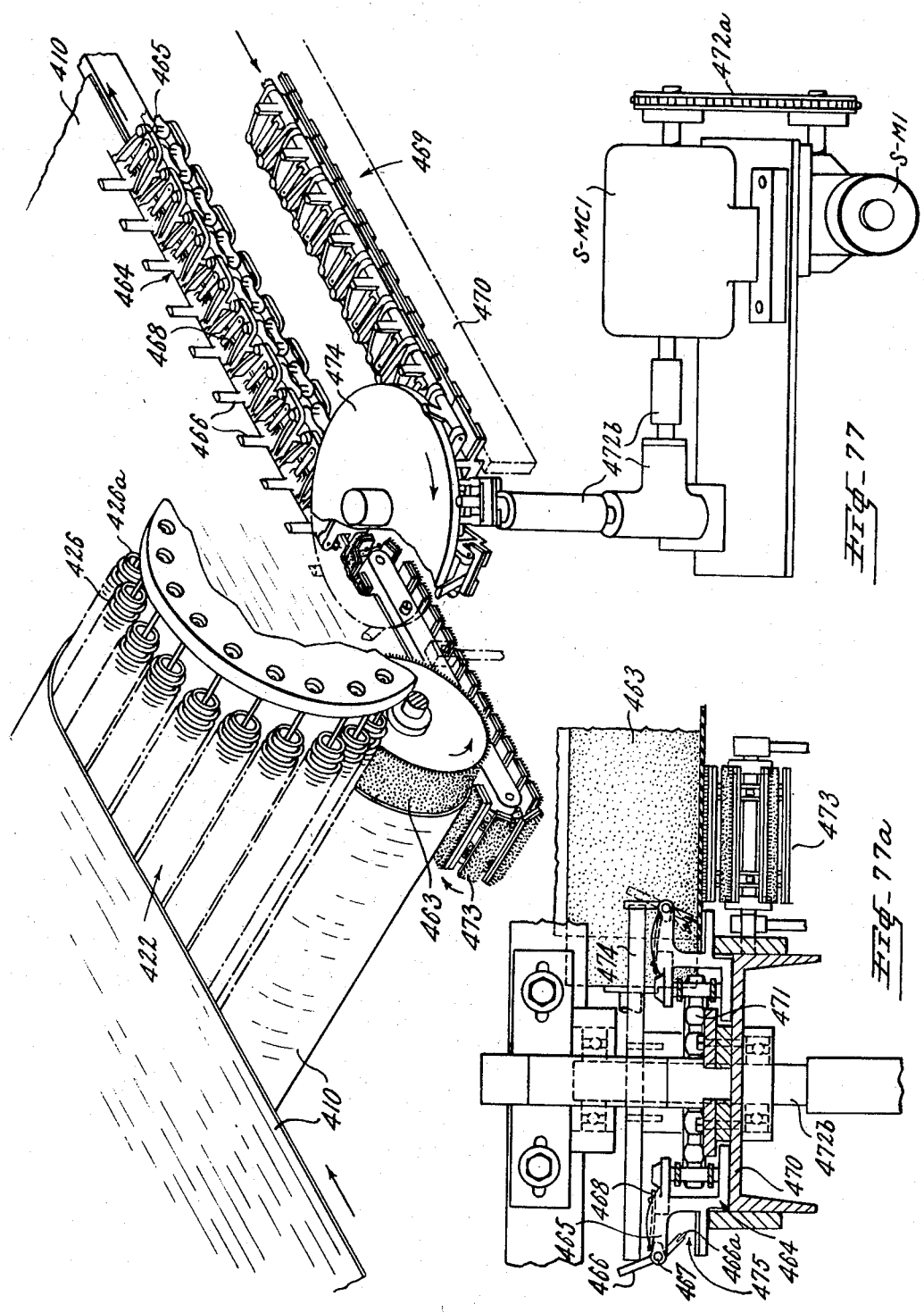

FIGS. 14a and 14b together constitute an electrical diagram of the control circuit, of the band-positioning apparatus, drum loader and rotational lock apparatus;

FIG. 15 is a sequence chart to aid in explaining the operation of the band-positioning apparatus;

FIG. 16 is a schematic diagram of the hydraulic system utilized in the band-positioning apparatus;

FIG. 17 is an elevational view of the input portion of the drum loader of the FIG. 1 apparatus;

FIG. 18 is an elevational view of the remaining portion of the drum loader;

FIG. 19 is a plan view of the drum loader representing the overhead drive rolls;

FIG. 20 is an output end view of the drum loader taken along line 20—20 of FIG. 18;

FIG. 21 is a plan view taken along line 21—21 of FIG. 17;

FIG. 22 is a plan view of the remaining portion of the drum loader taken along line 22—22 of FIG. 18;

FIG. 23 is an input end view of a portion of the drum loader taken along line 23—23 of FIG. 1;

FIG. 24 is an enlarged fragmentary view in section of a clamp of the drum loader;

FIG. 25 is an enlarged view in section of the cam of the FIG. 1 apparatus, taken along line 25—25 of FIG. 21;

FIGS. 26a and 26b are views, partly schematic, representing the relation of the cam to the various units of the apparatus;

FIGS. 27a–27d, inclusive, are enlarged fragmentary views of portions of the cam of FIG. 26;

FIG. 28 is a schematic diagram of the pneumatic control system of the drum loader;

FIG. 29 is a sequence chart to aid in explaining the operation of the drum loader;

FIGS. 30a–30k and 30m–30o are fragmentary sectional views (since a FIG. 30l is not included in the drawings) representing the intercoupling between drums along the cam;

FIG. 30p is an end view of drum 2, taken along line 30p—30p of FIG. 30o;

FIG. 30q is an enlarged fragmentary view, in section, of portion J of the cam to represent the actuation of the drum fingers;

FIGS. 30r–30u are plan views of drums along apparatus between the drum loader and the first turret to represent the intercoupling between drums;

FIG. 31a is a fragmentary plan view to show apparatus checking the first rotational lock between drums;

FIG. 31b is a view, in section, taken along line 31b—31b of FIG. 31a, of the first rotational lock apparatus;

FIG. 31c is a view in section of a roller, taken along line 31c—31c of FIG. 31b;

FIG. 32 is a sequence chart to aid in explaining the operation of the first rotational lock apparatus;

FIG. 33 is a plan view of the first winding frame;

FIG. 34 is a side elevational view of a portion of the first winding frame;

FIG. 35 is a side elevational view of the remainder of the first winding frame;

FIG. 36 is an elevational view of the input end of the first winding frame, taken along line 36—36 of FIG. 34;

FIG. 37 is an enlarged fragmentary view, in section, to represent a drive wheel mechanism of the first winding frame, corresponding to a portion of the FIG. 36 winding frame;

FIG. 38 is an enlarged plan view of another drive wheel of the FIG. 36 winding frame;

FIG. 39 is an enlarged fragmentary view, taken along line 39—39 of FIG. 36, of another drive wheel mechanism of the FIG. 36 winding frame;

FIG. 40 is an enlarged fragmentary plan view of another drive wheel mechanism of the first winding frame, taken along line 40—40 of FIG. 34;

FIG. 41 is a side elevational view of the first cutter assembly and a portion of the transfer apparatus;

FIG. 42 is a front elevational view of the upper portion of the cutter assembly;

FIG. 43 is a sectional view of the cutter assembly, taken along line 43—43 of FIG. 42;

FIG. 44 is a sectional view of the cutter assembly, taken along line 44—44 of FIG. 42;

FIG. 45 is a sectional view of the cutter assembly, taken along line 45—45 of FIG. 42;

FIG. 46 is a fragmentary plan view of the lower portion of the cutter assembly with the upper portion broken away;

FIG. 47 is a sectional view of the cutter assembly, taken along line 47—47 of FIG. 46;

FIG. 48 is a sectional view of the cutter assembly, taken along line 48—48 of FIG. 46;

FIG. 49 is a sectional view of the cutter assembly, taken along line 49—49 of FIG. 46;

FIG. 50 is a view of the FIG. 49 apparatus, taken along line 50—50 of FIG. 49;

FIG. 51 is a fragmentary sectional view, to an enlarged scale, of a cylinder of the FIG. 42 apparatus;

FIG. 52 is a sectional view of the cutter assembly, taken along line 52—52 of FIG. 46;

FIG. 53 is a diagram of the hydraulic system actuating the cutter assembly;

FIG. 54 is a diagram of the electrical circuit controlling the cutter assembly;

FIG. 55 is a side elevational view of a second portion of the transfer apparatus following the first portion of the transfer apparatus shown in FIG. 41;

FIG. 56 is a plan view of the first portion of the transfer apparatus;

FIG. 57 is a plan view of the second portion of the transfer apparatus;

FIG. 58 is an end elevational view of the transfer apparatus, taken along line 58—58 of FIG. 55;

FIG. 59 is a partial sectional view of the transfer apparatus, taken along line 59—59 of FIG. 41;

FIG. 60 is a sectional view of a roller of the transfer apparatus, taken along line 60—60 of FIG. 41;

FIG. 61 is a sectional view of a roller of the transfer apparatus, taken along line 61—61 of FIG. 55;

FIG. 61a is a sectional view of rollers of the transfer apparatus, taken along line 61a—61a of FIG. 60;

Figure 62:
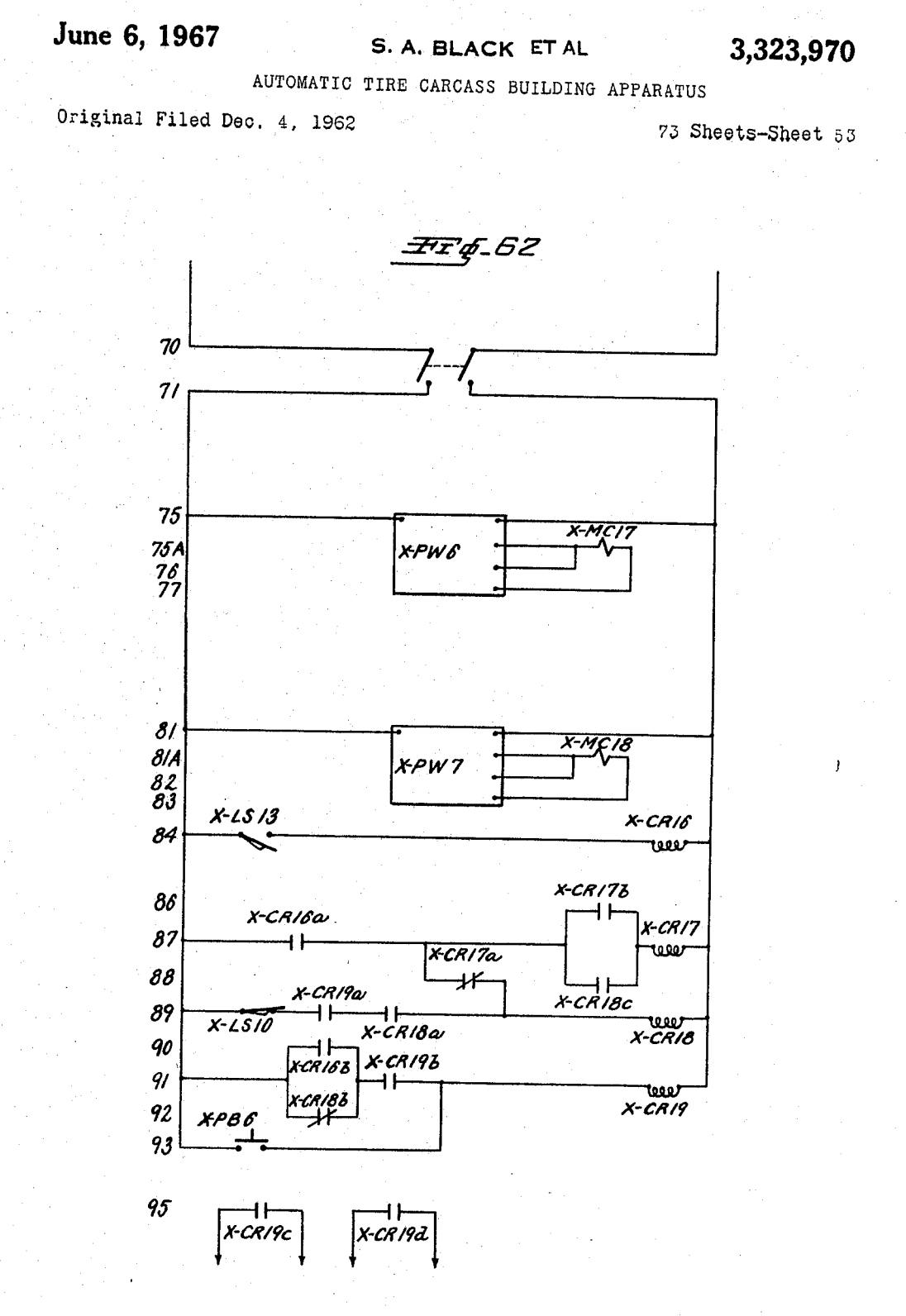

FIG. 62 is a diagram of the electrical control system of the transfer apparatus;

FIG. 63 is a plan view of the drive system for the winding frames, including gap control apparatus;

FIG. 63a is an enlarged fragmentary plan view of the drive system of FIG. 63;

FIG. 63b is an elevational view, partly in section of the FIG. 63a apparatus;

FIG. 63c is a sectional view of the FIG. 63b apparatus, taken along line 63c—63c of FIG. 63b;

FIG. 63d is a sectional view of the FIG. 63b apparatus, taken along line 63d—63d of FIG. 63b;

FIG. 64 is a plan view of the second winding frame and second fabric let-off apparatus and of another portion of the drive system;

FIG. 64a is an enlarged fragmentary view of a portion of the FIG. 64 drive system;

FIG. 64b is a sectional view of the FIG. 64a device, taken along line 64b—64b of FIG. 64a;

FIG. 65 is a plan view of the turret loader and of a portion of the drive system;

FIG. 66 is a diagram of the FIG. 63 drive system to aid in explaining the operation thereof;

FIGS. 66a–66d are diagrams representing positions of a control device of the FIG. 66 system;

FIG. 67 is a perspective view of the control device diagrammatically represented in FIGS. 66a–66d, together with other elements of FIG. 66;

FIG. 68 is a front elevational view of the FIG. 67 control device;

Figure 69:
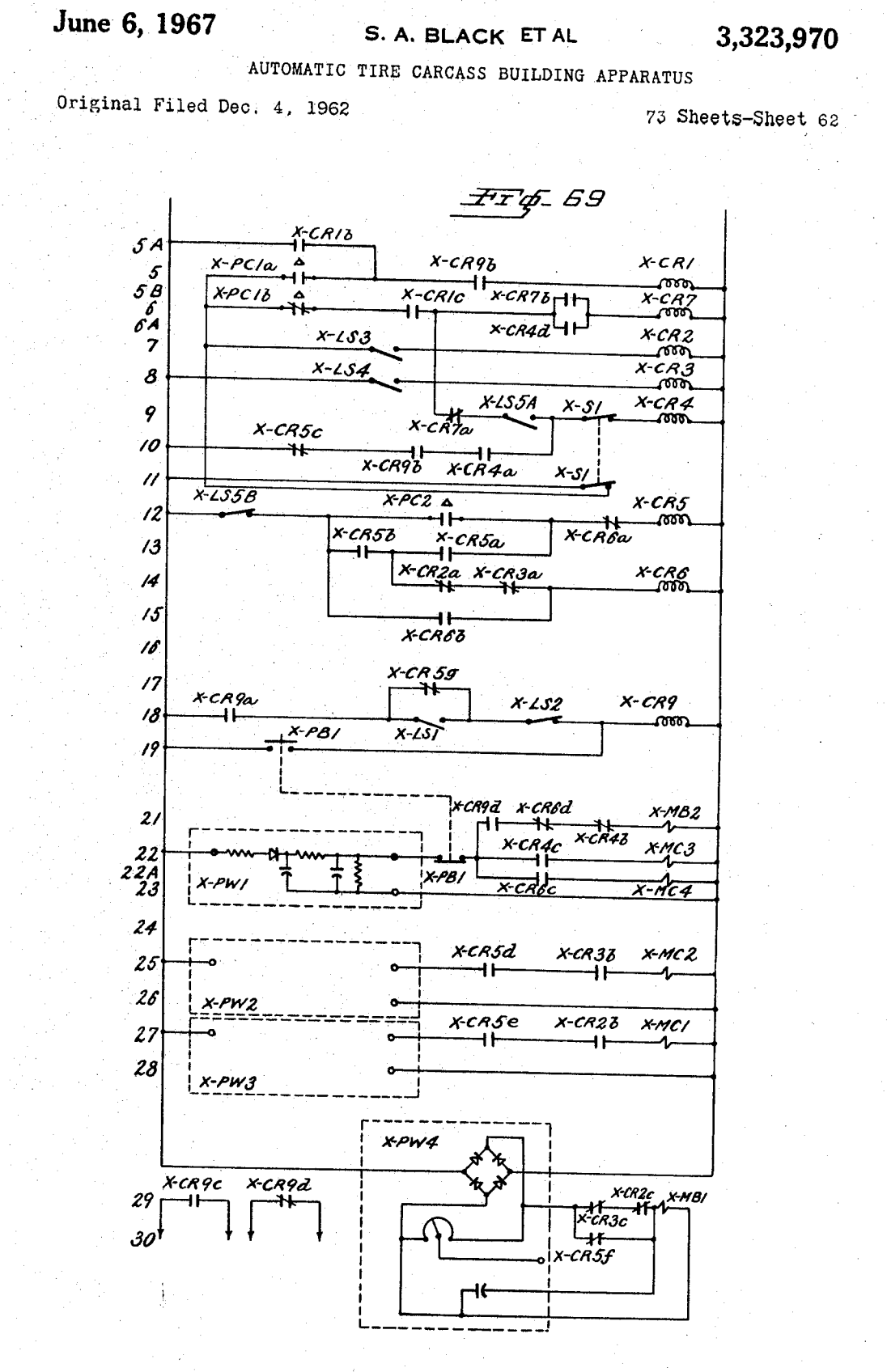

FIG. 69 is a diagram of the electrical control system for the FIG. 63 gap control apparatus;

FIGS. 70–72 are sequence charts to aid in explaining the operation of the FIG. 63 gap control apparatus;

FIG. 73 is a side elevational view of the first fabric let-off assembly;

FIG. 74 is an elevational view of the fabric let-off assembly, looking downstream, taken along line 74—74 of FIG. 73;

FIG. 74a is a detail of the fabric centering control assembly taken along line 74a—74a of FIG. 74;

FIG. 74b is a schematic representation of the relative positions of the points of light measurement of the photoelectric cells employed in the fabric centering control assembly;

FIG. 75 is a side elevational view of the fabric width control assembly taken along line 75—75 of FIG. 76;

FIG. 76 is a sectional view, looking downstream of the fabric width control assembly taken along line 76—76 of FIG. 75;

FIG. 77 is a partially schematic, partially broken away isometric view of the working components of the tentering assembly;

FIG. 77a is a partially sectioned view of the tentering assembly looking upstream taken along line 77a—77a of FIG. 73;

FIG. 78 is a plan view of one of the fabric edge control assemblies taken along line 155—155 of FIG. 75;

FIG. 79 is an elevational view of the fabric edge control unit of FIG. 78 taken along line 79—79 of FIG. 75;

FIG. 80 is a schematic diagram of a portion of the hydraulic system utilized in the fabric let-off assembly;

FIG. 81 is a schematic diagram of the hydraulic system utilized for controlling the width of the fabric leaving the fabric let-off assembly;

FIG. 82 is a partially schematic and partially broken away isometric representation of the hydraulic relay employed in each edge control unit;

FIG. 83 is an electrical diagram of the control circuit for the first fabric let-off assembly.

*General description and explanation of operation of FIG. 1 apparatus*

Referring now more particularly to FIG. 1 of the drawings, the apparatus continuously handles, for example, fifty drums, including drums 1–4. As will be described more fully subsequently, each drum preferably is a rigid metal cylinder with a hollow central region, having a grooved cone attached to one end of the drum and a cam-actuated set of locking fingers attached to the other end of the drum. A pair of annular bands are slidably mounted at the ends of each drum for supporting fabric between drums, as will be apparent subsequently.

The first unit of the apparatus is a band-positioning apparatus for extending the retractable bands of the drums. To this end, a pair of displaceable arms having fingers grip the bands while each drum is in the band-positioning apparatus.

The second unit is a drum loader 200 successively moving the drums into a line of interconnected drums. The drum loader moves the drums along an elongated cam 203 which extends through the machine. The drum loader 200 has an electrically interlocking set of two piston-operated clamps 201, 202 which holds the cam 203 rigidly, in cooperation with the drums, as will be more fully explained subsequently. The clamps 201, 202 open and close alternately so that each drum can be moved onto the cam in a series of three steps. When a drum is first introduced into the drum loader 200, the first set of clamps 201 automatically opens. The drum is then pushed between clamps 201 and 202, the clamps 201 close on the cam, and the clamps 202 open. The drum is then pushed forward so thta each drum locks with the drum ahead or downstream by means of the locking cone and fingers which select a groove of the cone. The locking of the drums is controlled by the position of the drums along the cam 203 which has a stepped diameter along its length to actuate the fingers.

The interlocked drums are then driven through a winding frame 300 having a series of driving wheels located in line at the bottom of the drums and on each side of the drums. These wheels are rotatable to drive the drum forward and are mounted in swivels so that they can be adjusted in angle to impart the correct rotating and longitudinally advancing motion to the drums. Fabric is applied to the interlocked set of drums from a let-off frame 400 mounted on one side of the unit 300 and adjusted to cause the fabric to wind onto the drums at a predetermined cord angle.

As the drums advance through the winding frame they move to a fabric cutting unit 700. The fabric cutting unit includes a high speed rotary knife so mounted on a frame as to permit it to be revolved circumferentially around the drums. The knife is mounted so that on signal its cuts the fabric circumferentially between the drums. The cutting unit is mounted on a carriage synchronized with the speed of the longitudinal advance of the drums, and a signal is supplied to the cutting unit by means of an electrical contact made by the drum moving over a contact ring on the cam to cause the fabric cut to be made exactly between two adjacent drums.

After the fabric is cut, the drum advances over a portion of the cam which opens the locking fingers and frees the drum from the following drum. A transfer unit 800 of rollers then advances the drum to lock it automatically on the preceding drum which is rotating and moving longitudinally into a second winding frame 300A. The transfer unit 800 permits the drum to rotate freely about its longitudinal axis. The cam 203 in this portion of the apparatus has a diameter causing the fingers of the preceding rotating drum to interconnect with a different groove on the cone of the drum on the transfer unit. Accordingly, the drum is automatically locked onto the preceding drum with a new and different distance between drums. The drums are then advanced through the second winding unit 300A which is similar to the winding unit 300 and is supplied with fabric from a let-off unit 400A similar to the unit 400. The units 300A and 400A preferably are of opposite hand to the units 300 and 400 to permit crossing fabric plies. Thereafter, the second ply is cut by a cutting unit 700A similar to the cutting unit 700.

The drums are then moved to a turret loader 900 for loading a swivel turret 1000 which grips each drum by means of a pneumatic chuck. The drum is then swung by the turret 1000 to a bead setter 1300 supplied with bead wires by a bead servicer 1500. The bead setter 1300 automatically positions a wire bead over the carcass plies. A set of cam-operated fingers simultaneously moves under the fabric and then grips the bead wire while a pneumatically inflated air bag located under a cage of the bead setter rolls the fabric over the top of the bead wire and makes a fabric turn-up.

The turret 1000 then rotates under the control of a Geneva Drive mechanism 1200 and transfers the drum to a second turret 1100 with a pneumatic chuck for gripping the drum. The turret 1100 then rotates and positions the drum with respect to a second bead setter 1300A similar to the bead setter 1300. The bead setter 1300A is supplied with bead wires by a bead servicer 1500A similar to the bead servicer 1500 and applies the bead wire to the other end of the drum.

The turret 1100 then rotates the drum to a carcass remover 1700 where the carcass is clamped by a suitable mechanism and air is introduced under the carcass to permit the carcass to be pulled off the drum.

The carcasses may then be removed from the apparatus and stored for further processing, such as the application of tread stock, shaping and curing. The turret 1100 then rotates the drum to a return conveyor 1800 which transfers the drum to the band-positioning apparatus where the drum is introduced again into the line.

*Description of drum*

Referring now more particularly to FIGS. 2 and 3, a hollow drum 1 is represented in elevational end view in FIG. 2 and in cross section in FIG. 3, taken along line 3—3 of FIG. 2. The drum includes means for interconnecting drums with predetermined spacings therebetween. More particularly, this means comprises a plurality of movable fingers 50, 51, 52 at one end of the drum and a tapered or conical device 53 having a plurality of axially spaced circumferentially grooves 54, 55 at the other end of the drum. The fingers of each drum are adapted to register with a selected circumferential groove in the cone of an adjacent drum for interconnecting the drums with predetermined spacings.

As represented in FIG. 3, the finger 50 is spring-loaded and pivoted on a pin 56 attached to a housing which in turn is attached to the drum wall and has a roller 57 which extends through a slot in a sleeve 58 for actuation by the stepped diameter of a cam 203 (FIG. 1) which extends longitudinally through sleeves of the drums as will be described more fully subsequently. One of the three fingers of each drum, for example, the finger 50 has a web 59 for interlocking with selected longitudinal ribs 53b and slots 53a to provide a rotational lock between drums at various stages of the operation.

Each drum also has a pair of displaceable bands 60, 61 mounted on rods 62, 63 at each end of the drum and slidable longitudinally of the drum. The bands are represented in FIG. 3 in an extended position in broken line construction and the band 60 is also represented in a retracted position in solid-line construction.

*Description and explanation of operation of band-positioning apparatus 100*

Figure 4:
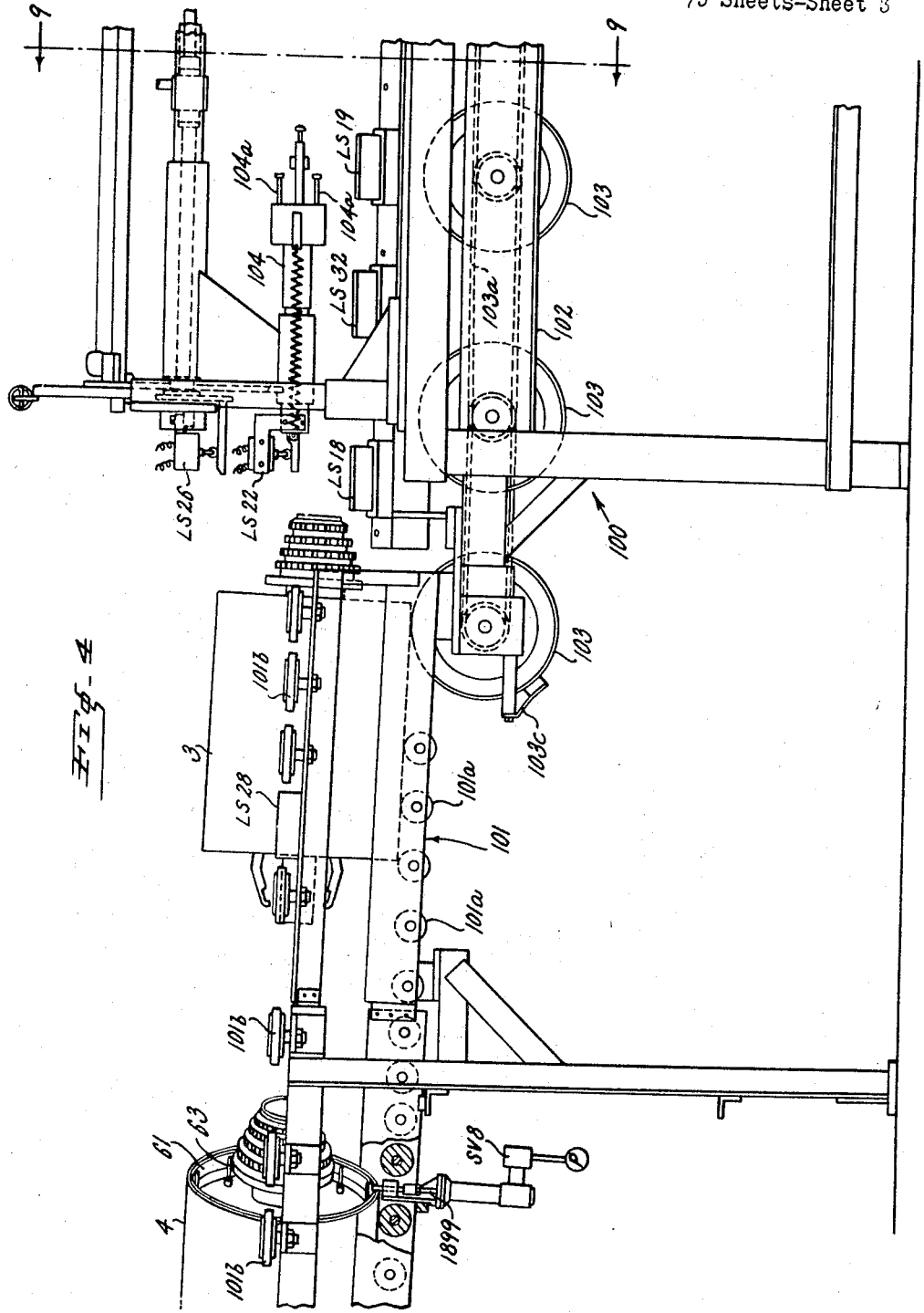
FIG. 4 is a side elevational view of a portion of a conveyor and of a portion of band-positioning apparatus utilized in the FIG. 1 apparatus.
Figure 9:
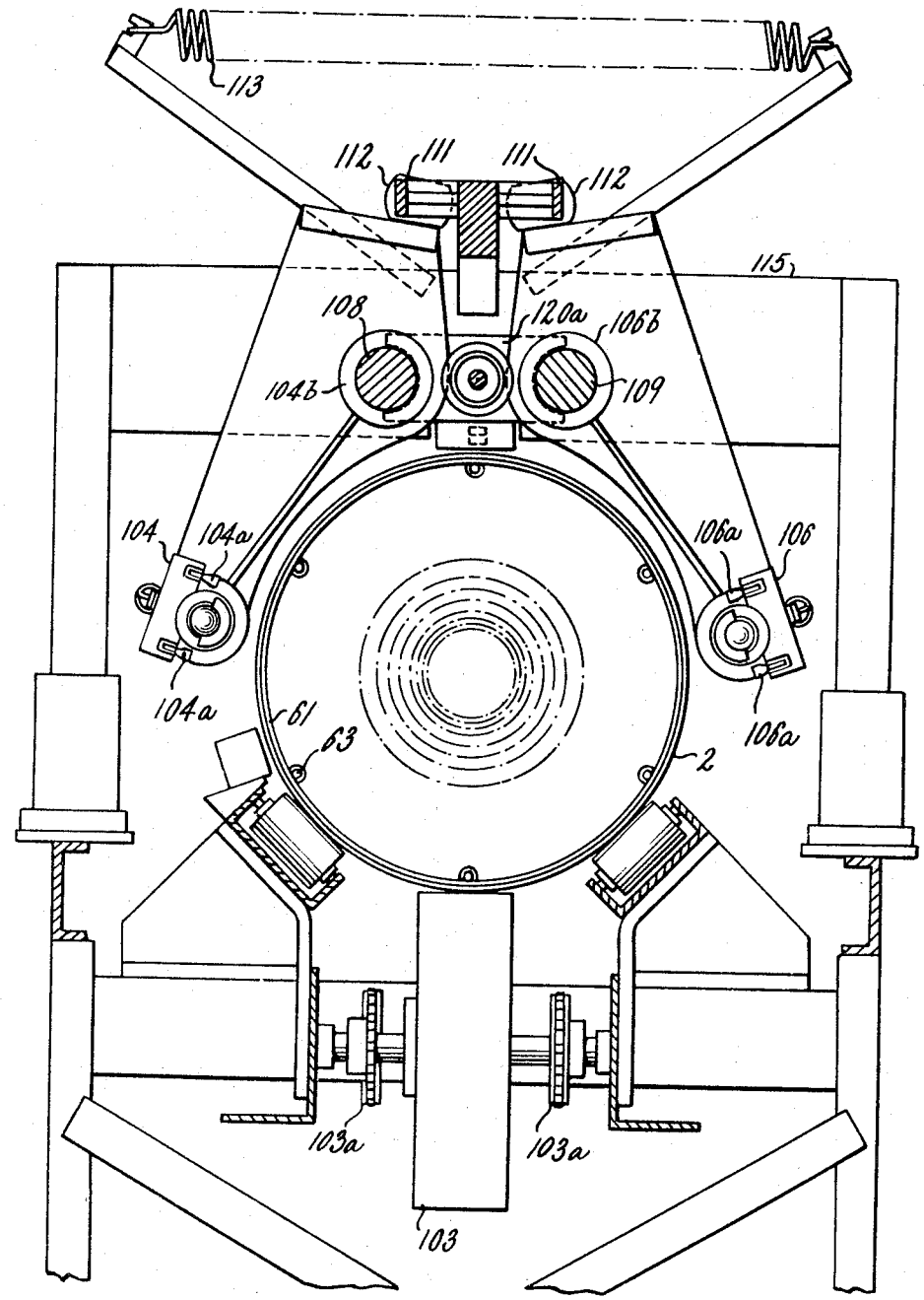
FIG. 9 is a sectional view of the band-positioning apparatus taken along line 9—9 of FIG. 4.

Referring now more particularly to FIGS. 4 and 5 of the drawings, band-positioning apparatus 100 is represented in fragmentary side elevational view. The band-positioning apparatus comprises a longitudinal support 102 having mounted thereon rollers 103, which are driven by the main drive motor and drive chain 103a through a unit including an electromagnetically actuated clutch CL1 and brake BR1 of conventional construction. A suitable brake 103c acts continuously against the first roller 103 of FIG. 4. Other non-driven support rollers 103b are represented in FIG. 6, which is a plan view of the apparatus.

The band-positioning apparatus comprises displaceable arms 104, 105, 106 and 107 represented in FIGS. 6, 7, 8, 9 having fingers for gripping the bands of the drum, as will be more fully described. The arms 104, 105, 106 and 107 comprise rods which are attached to frames 104b, 105b, 106b and 107b slidably mounted on bars 108, 109. Frames 105b and 107b are shown in section in FIG. 7, which is a plan view of the band-positioning apparatus with the arms 104–107 displaced to an intermediate position during their travel and with the tracks 111 broken away. As represented in FIGS. 7, 8, the frames 104b, 106b are rotatably held in a grooved collar 120a attached to piston rod 120 and frames 105b and 107b are rotatably held in a grooved collar 121a attached to piston rod 121 of hydraulic cylinders 122, 123 bolted to support bars 109, 108. Springs 104c, 105c, 106c, 107c (see FIGS. 5 and 6) maintain arms 104 and 106 and arms 105, 107 in a normally unextended condition. Springs 113, 113a (see FIGS. 6 and 9) maintain arms 104, 106 and 105, 107 in an outward position, forcing rollers 112 against tracks 111 attached to supporting frame 115 (see FIGS. 6, 9, and 11).

Figure 10:
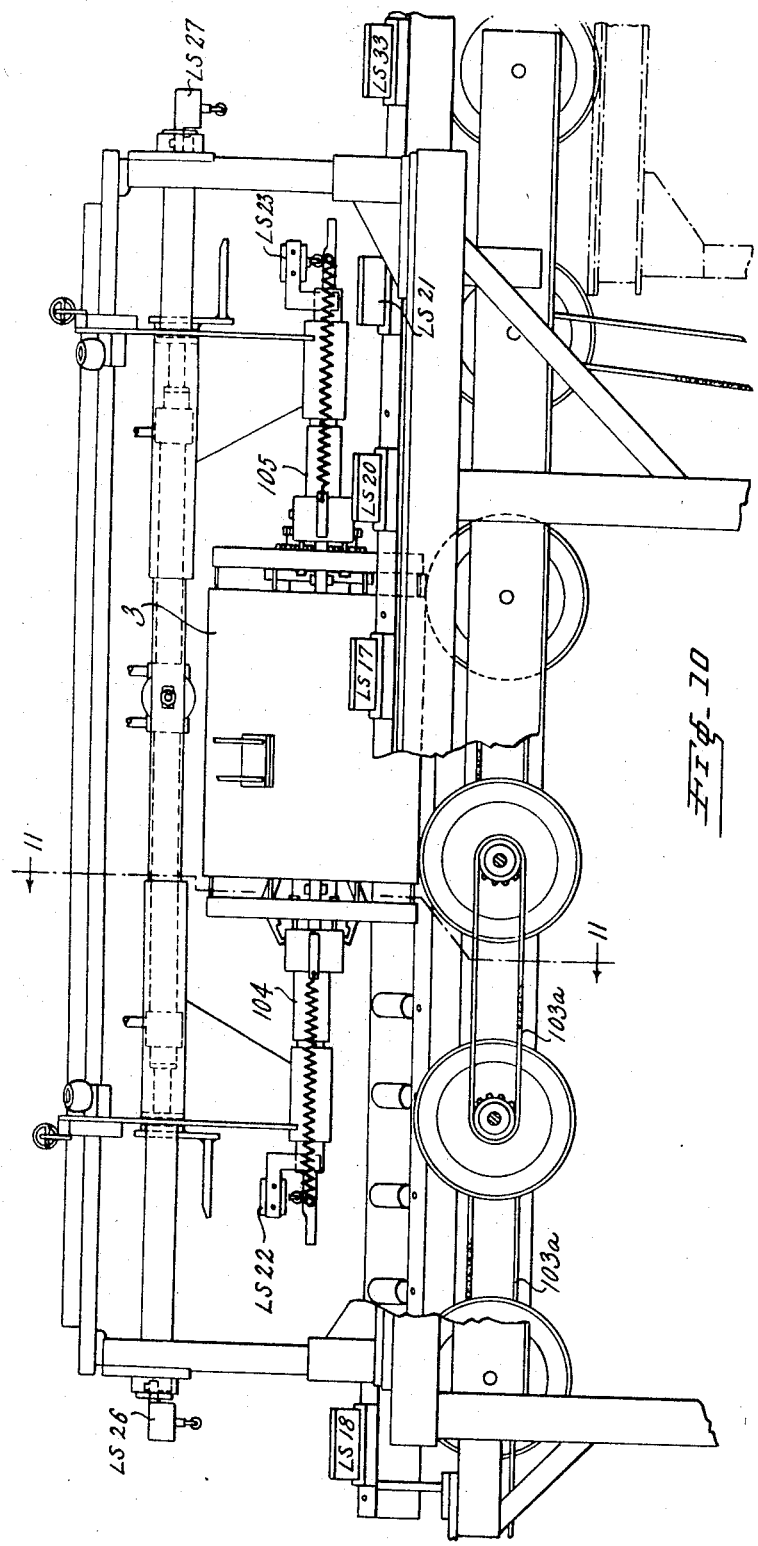
FIG. 10 is a fragmentary side elevational view of the band-positioning apparatus.

Referring now to FIGS. 10 and 11, when the arms 104–107 are displaced toward a drum as will be more fully explained, the arms are swung inwardly toward the drum as rollers 112 move along tracks 111. When the arms 104, 106 are in the position represented in FIG. 11, the fingers grip the band at the end of the drum. The sequence of operation is represented in FIGS. 12 and 13a–13e inclusive. Referring to FIG. 12, the arm 105 comprises a rod mounted in a sleeve 121 and maintained in position by a spring 105c. When the plunger or shaft strikes the end of a drum the rod 105 slides within sleeve 121. As will be seen with reference to arm 107, when the rod slides, the finger 107a is released when the pin 123b attached to the rod moves away from the finger 107a along slot 124 in the sleeve. Thus, referring to FIGS. 13a to 13e, inclusive, as the plunger 107d strikes the drum represented in FIG. 13b, the finger 107a moves away from the pin 123b supporting cam 123a. The finger 107a pivots at point 126 and slides beneath the band. The finger 107a is raised by spring 125 to position behind the band as represented in FIG. 13c when the arm assumes the position represented in FIG. 13c.

When the arm is retracted, as represented in FIG. 13d, the finger draws the band away from the drum surface and when the arm moves sufficiently away from the drum that the plunger 107d is in its initial extended condition the cam 123a of the finger 107a strikes the pin 123b, causing the finger to drop and release the band.

Referring now more particularly to FIGS. 5, 5a and 5b, the band-positioning apparatus includes a suitable clamp for holding the drum in position while the bands are being extended. The clamp comprises a pair of friction surfaces 141 mounted on arms 140 pivoted at points 142 and actuated by links 143 under the control of a cylinder 144. The arms are represented in engagement with the drum with the piston of cylinder 144 in its fully extended position. When the piston of the cylinder is withdrawn from its fully extended position, the clamps are released.

In connection with the sequence charts such as FIG. 15, various electrical components involved in the operation under consideration are listed in a vertical column along each edge of the drawing. Horizontal component lines of varying lengths, extending alongside a particular vertical listing, indicate the relative period of time, for example from T1 to T2 as shown at the top of the charts, during which the electrical component is energized or given switch contacts are closed, as the case may be. The time axis merely indicates sequence and is not to scale. The diagonal solid line arrows starting at one horizontal component line and ending at another horizontal component line indicate that the first component electrically controls the second component. Similarly, the diagonal dotted line arrows starting at one horizontal component line and ending at another horizontal component line indicate that the first component mechanically controls the second component. The operation of a time delay relay is indicated by a dotted horizontal component line. The start of the dotted horizontal line indicates that the relay has been energized but that its time-delay contacts have not yet followed he movement of the relay or, conversely, that the relay has been de-energized but that its time-delay contacts have not yet followed this action. Where the horizontal dotted line becomes solid, it indicates that the delay function is ended. The solid-line associated with limit switches indicates that the contacts of the switches are closed.

Considering now the operation of the band-positioning apparatus with respect to the circuit diagram of FIGS. 14a and 14b, the sequence chart of FIG. 15, and the hydraulic diagram of FIG. 16, it will be assumed initially that at time T1 drums are positioned along the apparatus as represented in FIGS. 4 and 5. Drum 2 has its bands extended and drums 3 and 4 have their bands retracted. Limit switch LS28 is actuated by drum 3 and contacts LS28a (FIG. 14b, line 42) are closed, thereby causing energization of relay CR11 (line 42) from 110-volt power supply lines G1, G2. Relay contacts CR11a (line 41) are open, causing de-energization of solenoid valve SV8 (line 41), allowing the conveyor stop 1899 to block drum 4 as represented in FIG. 4. Control relay CR11 is maintained energized through relay contacts CR7a and CR11b (line 43).

Limit switch LS17 is actuated by drum 2 and contacts LS17a (line 36) assume their position alternate to that represented in the drawing. Latching relay contacts LR2a (line 36) are open because latching relay LR1 was the last of relays LR1 and LR2 to be energized. The relays LR1 and LR2 are of conventional latching relay construction in which the two relay windings actuate the same contacts in opposite sense and the contacts remain in the condition of actuation by one relay winding until the next energization of the other relay winding. The latch relay contacts are represented in FIG. 14b in the condition they assume when latch relay LR2 is the last relay previously energized.

Limit switches LS26 and LS27 are actuated by the extractor arms in their rest position and contacts LS26a and LS27a (line 40) are closed, causing energization of relay CR9.

Control relay CR16 (line 35) is energized through contacts TR1a of a suitable timer or time-delay relay TR1 (line 35A). Solenoid valve SV6B (line 32) is energized through latch relay contacts LR1a.

As will be more fully explained subsequently, at time T2 when the drum loader (FIG. 21) is ready to receive another drum, relay CR2 (line 7) is energized. Relay contacts CR2c (line 33) then close, causing energization of relay CR10 through relay contacts CR7b and CR9a. Relay contacts CR10a (line 27a) close, causing energization of the solenoid controlling clutch CL1 from a suitable direct-current power supply PW1, which is similar to supply PW4 (line 59) more fully described hereinafter. When clutch CL1 is actuated, drive is applied to rollers 103, causing drums 2 and 3 (FIGS. 4 and 5) to move ahead.

When drum 3 approaches switch LS18 at time T3, it actuates that switch, opening contacts LS18a (line 39) in series with control relay CR8. At time T4 drum 2 actuates switch LS20, opening contacts LS20a (line 39). At time T5 drum 2 leaves the vicinity of switch LS28, returning that switch to its unactuated condition with contacts LS28a (line 42) open. This relay sequence is effective to indicate the presence of drum interference and prevent energization of relay CR8 (line 39) which would permit motion of the arms 104, 105, 106, 107 if energized.

At time T6 drum 2 leaves the vicinity of switch LS17, returning that switch to its unactuated condition with contacts LS17a (line 36) returned to the position represented in FIG. 14. At this time latching relay LR2 (line 37) is energized through contacts LR2b (line 37) which immediately open to de-energize the relay and thereafter remain open. This removes power from SV6B, but the valve does not move, as it has a balanced spool. Relay contacts LR2a (line 36) close and remain closed. Relay contacts LR1a (line 34) also close in response to energization of relay winding LR2, holding relay CR10 energized.

Drums 2 and 3 continue to move along the apparatus. At time T7 while drum 3 is in the vicinity of switch LS18, drum 3 approaches switch LS32, actuating switch LS32 and opening its corresponding contacts LS32a (line 39). At time T8 while drum 2 is in the vicinity of switch LS20, drum 2 approaches switch LS21, actuating that switch and opening its corresponding contacts LS21a (line 39). At time T9 drum 1 leaves the vicinity of switch LS20, causing that switch to return to its unactuated condition, closing contacts LS20a (line 39). At time T10 drum 3 leaves the vicinity of switch LS18, causing switch LS18 to return to its unactuated condition, closing contacts LS18a (line 39). At time T11 drum 2 approaches switch LS19, actuating switch LS19 and opening its corresponding contacts LS19a (line 39). At time T12 drum 2 approaches switch LS33, actuating that switch to open contacts LS33a (line 39). At time T13 drum 3 leaves the vicinity of switch LS32, causing that switch to return to its unactuated condition and closing its contacts LS32a (line 39). At time T14 drum 2 leaves the vicinity of switch LS21, causing it to return to its unactuated condition, closing contacts 21a (line 39). At time T15 drum 3 leaves the vicinity of switch LS19, causing it to return to its unactuated condition closing its contacts LS19a (line 39). At time T16 drum 2 leaves the vicinity of switch LS33, causing it to return to its unactuated condition and closing its contacts LS33a. This relay sequence is effective to indicate the presence of drum interference and prevent the energization of relay CR8 during the interval T3 to T16. Drum 2 then enters the drum loader to be described subsequently.

At time T17 drum 3 actuates limit switch LS17, causing the contacts LS17a (line 36) to shift to the position alternate to that represented in the drawing, causing energization of relay CR7 and time-delay relay TR1 through contacts LR2a. When relay CR7 is energized, the solenoid which controls drive brake BR1 (line 27B) is actuated through contacts CR7a and contacts CR16a connected to power supply PW1. When relay CR7 is energized, relay contacts CR7b (line 33) open, de-energizing relay CR10 (line 33) and contacts CR7a (line 43) open, de-energizing relay CR11 (line 42). When relay CR11 is de-energized as drum 3 moves off switch LS28, contacts CR11a (line 41) close, causing solenoid SV8 to be energized and withdraw the conveyor stop, allowing drum 4 to travel forward into the band-positioning apparatus. When relay CR10 is de-energized, relay contacts CR10a (line 27a) open, causing the band reset drive clutch CL1 to return to its unactuated condition. Accordingly, the band reset drive is disengaged at this time and drum 3 stops in the position represented in FIG. 10.

When timer TR1 is energized after a delay of approximately one second contacts TR1a (line 35) open, de-energizing relay CR16. When relay CR16 is de-energized, relay contacts CR16a (line 27b) open, de-energizing the brake BR1.

When relay CR7 is energized, relay contacts CR7d (line 57) open and CR7c (line 31) close, causing energization of solenoid valve SV6A through latching relay contacts LR1 and relay contacts CR8a. Control relay CR8 is energized only when limit switches LS32, LS18, LS19, LS20, LS21 and LS33 have all returned to their unactuated condition and thus signal that no drum remains in the vicinity of these switches. At this time contacts CR8b (line 56) also close.

When relay CR7 is energized and solenoid valve SV6A is energized, the band reset arms 104, 105, 106, 107 start to move toward drum 3 through the operation of the hydraulic cylinders 122, 123 represented in FIG. 16.

When solenoid SV6A is energized, the valve shifts position from that represented in FIG. 16 to apply hydraulic fluid to the outward sides of the pistons of the cylinders 122 and 123 and to release fluid displaced by the inward sides of the pistons through the restrictions of valves 131 and 132, thus shifting the arms toward the drum to make ready to extend the bands of the drum.

At time T18 when the reset arms leave the limit switches LS26 and LS27, the limit switch contacts LS26a, LS27a (line 40) open, de-energizing relay CR9. Contacts CR9a (line 33) close, contacts CR9c (line 27B) open, contacts CR9d (line 57) open, and contacts CR9b (line 31A) open.

At time T19 relay CR2 (line 7) in the drum loader is de-energized as will be explained more fully hereinafter. At time T20 when the reset arms contact the drum, the reset arm plungers 104d, 105d, 106d, 107d are depressed, actuating switches LS22 and LS23 (FIG. 7). At this time the fingers 104a, 105a, 106a, 107a grip the band as represented in FIGS. 13a–13e. Contacts LS22a (line 38) and LS23a close, energizing relay LR1 (line 38). Relay contacts LR2a (line 36) open in response to energization of relay LR1 (line 38), de-energizing relay CR7 (line 36) and time delay relay TR1 (line 35A). Relay contacts TR1a (line 35) close after a time delay of approximately one second, causing energization of relay CR16 at time T21, closing contacts 16a (line 57).

At time T20 when relay CR7 is de-energized, relay contacts CR7c (line 31) open, causing de-energization of solenoid valve SV6A (line 31). When relay LR1 is energized, contacts LR1a (line 32) close, energizing solenoid SV6B (line 32) and SV9 (line 31A). When solenoid SV6B is energized, the valve shifts to the position represented in FIG. 16 to start the reset arms back to their original condition, pulling the bands as represented in FIGS. 13a–13e. This occurs when the cylinders 122 and 123 of the band-positioning apparatus are returned to the condition represented in the drawing and hydraulic fluid is applied through check valves 131 and 132 to the inward sides of the pistons of cylinders 122 and 123. Fluid is released from the outward sides of the pistons through restrictions of valves 130 and 133.

Energization of solenoid SV9 shifts the valve to clamp the drum in position while the bands are being extended, by actuation of cylinder 144, FIG. 5a, as previously described.

When relay LR1 is energized, relay contacts LR2c (line 27B) close, causing energization of brake BR1 (line 27B) since relay CR9 is de-energized.

At time T22, when the reset arms have returned to their original condition, limit switches LS26 and LS27 are actuated, closing contacts LS26a (line 40) and LS27a. This causes energization of relay CR9, opening contacts CR9c (line 27B) and de-energizing brake BR1. Also relay contacts CR9b (line 31A) open, causing de-energization of solenoid valve SV9 to release the drum clamps.

As drum 4 approaches limit switch LS28 at time T23 contacts LS28a (line 42) close, energizing relay CR11. When relay CR11 is energized contacts CR11a (line 41) open, de-energizing the solenoid valve SV8 and extending the conveyor stop to hold drum 5 in position.

The following sequence of the apparatus then is similar to that just described to extend the bands on the next drum 4.

A two-position manual-automatic switch S5 (lines 28 and 29 and 32) is represented with its contacts in automatic position and a three-position manual-automatic switch S6 (lines 31A and 32) is represented with contacts in automatic or reference position. The two manual positions move the contacts schematically up and down from the reference position. In the manual position of S5, the automatic operation of the circuit is prevented by removal of power from a large part of the circuit as shown, and power is supplied to S6 to permit manual control of SV6A and SV6B, thus also of the motion of the arms 104, 105, 106, and 107. Pushbuttons, such as PB1–A (line 52) and PB1–B (line 56), also may be utilized during manual operation.

Manual-automatic switches S2, S3, S4 (lines 1, 8, 16) are also represented in their automatic positions.

Description and explanation of operation of drum loader 200

Referring now more particularly to FIGS. 17, 18, 19, and 20 of the drawings, the drum loader comprises a pair of clamps 201 and 202 for supporting a central cam or "torpedo" 203 which extends along the apparatus as more fully described subsequently. A series of overhead rolls 204 are driven from the main drive shaft through a gear box 205a, a suitable chain drive 205 and electromagnetic clutches CL2, CL3, and electromagnetic brakes BR2 and BR3, for moving or stopping the drums along the drum loader. Referring to FIGS. 21 and 22, which are sectional views taken along lines 21—21 and 22—22 of FIGS. 17 and 18, respectively, the drums rest on a suitable support 207 having rollers 208 along its length.

At the output end of the drum loader the drums rest on suitable ball bearings 208a on the support 207. As represented in FIGS. 17–20, inclusive, the drums at the output end of the drum loader are driven by a pair of rollers 230, 231 through a suitable chain drive 240 and electromagnetic clutches CL4 and CL5. The rollers 230 and 231, represented in FIGS. 20 and 22 are rubber-covered rollers keyed to and slidably mounted on rods 230a, 231a and positioned against collars 230b, 231b by springs 230c, 231d.

Referring to FIG. 23, the clamp 201 moves from the open position represented in solid-line to the closed position represented in broken-line to support the cam 203. The clamp 201 is hydraulically actuated by a pair of cylinders 220, 220b connected to the supporting base 221 of one-half the clamp which slides along guide rods 222. Clamp 202 is similarly mounted and actuated by cylinders 260a and 260b.

Considering now the construction of the cam 203 with reference to FIGS. 24, 25, 26a and 26b, the cam 203 comprises a tube of varying diameter for controlling the interconnection of the drums in accordance with the position of the drums along the cam. The cam is fixedly positioned with respect to the support 207 (FIG. 21) and extends longitudinally through the drums for actuating the connecting means of the drums, as represented in FIGS. 26a and 26b. As represented in FIGS. 24 and 25, the cam also carries internal electrical wiring 250 to clamps 201 and 202. The wires 250 are connected to suitable pins 251 in the cam and connections are made to the pins by spring-loaded fingers 252 in the clamps 201 and 202. The fingers 252 are slidably mounted in a suitable insulating support 253 attached to the clamp.

Referring now more particularly to FIGS. 26a and 26b and FIGS. 27a–27d, FIGS. 26a and 26b represent the cam 203 in relation to the various units of the apparatus. FIGS 27a–27d, in enlarged view, represent more clearly the stepped diameters of the cam 203. The cam 203 controls the position of the locking fingers 50, 51, 52 (FIG. 3) of the drums. Generally, portion I is the region where the drums are individually placed on the cam. Portion II is the region where the drums are locked together with the fingers in the recess or groove 55 (FIG. 3). Portion III is the region where the drums are unlocked, respaced and relocked with the fingers in the groove 54 (FIG. 3). Portion IV is the region where the drum is removed from the cam and placed on a turret.

The cam is held in axial position by the clamps 201, 202 at portion I but the cam weight is carried by the drums themselves. This is done at portions A, E, J and K by increasing the cam diameter to correspond with the inside bore of the drums. The main parts of the cam are made of thin wall aluminum tubing and the diameters C and G of the cam match the locked diameters of the rollers when the fingers are in the grooves, 55 and 54, respectively (FIG. 3). Therefore, the spring-loaded fingers support the cam through the winding frames.

Considering now in greater detail the diameters of the cam, portion A is a full diameter region, for example, 2.5 inches diameter, and maintains the cam in center position by the drums which in turn are centered at this point by the support rollers 208 and ball bearings 208a. The cam is preferably centered adjacent to any area where the fingers are shifted from one position to another. This re-centering insures accuracy of finger position.

Portion B is a region of reduced diameter, for example, 2.168 inches to allow the fingers on the trailing end of the drum to open to an "index" diameter corresponding to a diameter greater than the diameter of the front wall but less than the diameter of the rear wall of the groove 55. Portion C is a further reduced diameter, for example, 2.0 inches, to allow the fingers to drop into the groove 55. Portion D corresponds to an increased diameter of, for example, 2.168 inches corresponding to the index diameter to unlock the drums from the drums in the first winding frame but to continue to push the drum at line speed. Portions B and D are identical in diameter. Portion E is a region of full diameter to re-center the cam in the drum. Portion F is a region of reduced diameter, for example, 2.015 inches to allow the fingers to be set at a second index diameter for the other groove 54 preparatory to winding the second ply. The second index diameter is greater than the diameter of the front wall but less than the diameter of the rear wall of the groove 54. Portion G is of further reduced diameter, for example, 1.875 inches to allow the fingers to drop into the groove 54. Portion G contains a conductive annulus 254 mounted in a suitable insulator 255 and connected by wire 250 to one of the contacts 251 of FIG. 25, for a purpose explained hereinafter. Portion C of FIG. 27c contains a similar conductive annulus also connected to one of the contacts 251 of FIG. 25. Portion H is a region of increased diameter, for example, 2.015 inches corresponding to the second index diameter to allow the fingers to move out of the groove 54, disconnecting the drum from the line but pushing the drum at line speed. Portion K is a region of full diameter. Portion J is of full diameter but notched.

Considering now the operation of the drum loader, as previously mentioned, at time T16 in the cycle of operation of the band reset apparatus, while limit switch LS33 is actuated, drum 2 enters the drum loader. The operation of the drum loader will now be explained with reference to a time sequence represented in FIG. 29 and with reference to FIGS. 14a and 14b. In FIG. 17 drum 2 is represented as moving into the drum loader.

This occurs at time T12 of FIG. 29 which corresponds to time T16 of FIG. 15. The time axes of FIGS. 15 and 29 are referenced independently for clarity of explanation.

In considering the operation, it will be assumed initially that at time T1 (FIG. 29) clamp 201 is closed, clamp 202 is open and that drum X is in the vicinity of switch LS16. Drum 1 is in the vicinity of switch LS8. Drum 2 is in the vicinity of switch LS1 and drum 2 is in the position represented in FIG. 4. Drive mechanism CL2 and CL3 are not effective to drive the rollers 204 for reasons to be explained. When clamp 202 is open, switch LS11 (FIG. 22) is actuated by the clamp support and is closed, and switch LS14 (FIG. 22) is actuated by the clamp support and is closed. At time T2 when drum X driven by rollers 230, 231 moves ahead of switch LS16 (FIG. 14, line 13), switch LS16 closes, actuating relay CR4 (line 13). When relay CR4 is energized, contacts CR4a (line 26) close, energizing the solenoid of clutch CL3 (line 26) through power supply PW2, and contacts CR4B (line 27) open, de-energizing the solenoid of brake BR3 (line 27) to bring into operation the drive mechanism 3 rotating rollers 204a. Drum 1 then advances and actuates limit switch LS10 (line 15) opening the switch. At time T4 when limit switch LS10 opens, control relay CR6 is de-energized, opening contacts CR6a (line 22) and CR5b (line 23), de-energizing solenoid SV3B, and preventing any motion of clamp 202 which is open at time T4.

At time T5 drum 1 leaves the vicinity of switch LS8 (line 5), allowing that switch to close. At time T6 drum 1 leaves the vicinity of switch LS9 (line 11), causing the switch contacts 9A to open and contacts 9B to close. Control relay CR4 is now held in an energized condition through switch contacts LS9B (line 11) to cause drive CL3 to continue to operate rollers 204a. Relay CR3 is then de-energized closing contacts CR3a (line 21) and CR3b (line 22). At time T6 the drum 1 also actuates switch LS15 (line 15), opening that switch. Drum 1 then leaves the vicinity of switch LS10 (line 15), causing that switch to close at time T7. At time T8 drum 1 actuates switch LS16 (line 13), opening that switch.

At time T9 when drum 1 leaves limit switch LS15 (line 15), closing that switch, control relay CR6 is energized, closing contacts CR6b (line 23) and closing contacts CR6a (line 22) to energize solenoid valve SV3A and closing the clamp 202 to grip the cam 203.

Referring for the moment to FIG. 28, when solenoid valve SV3A is energized, the valve assumes the position represented in FIG. 28, actuating cylinders 260, 260b through valves 261, 264.

At time T10, when clamp 202 closes, limit switches LS11 (line 13) and LS14 (line 13) open and limit switches LS12 (line 5) and LS13 (line 5) close, energizing relay CR1 (line 5). Contacts CR1a (line 21) close, energizing solenoid SV2B (line 21) since contacts CR3a and CR5 are closed and opening clamp 201 by actuating cylinders 220, 220b, as represented in FIG. 28. Contacts CR1b (line 20) open, de-energizing solenoid SV2A, and contacts CR1c (line 23) open.

At time T11 when clamp 201 is opening, limit switches LS4 (line 11) and LS5 (line 11) return to their unactuated open condition.

At time T12 when clamp 201 is fully open, limit switches LS3 and LS6 (line 7) close, energizing relay CR2. At this time, as represented in FIG. 17, drum 2 is in the vicinity of switch LS1 (line 5) and the switch is actuated with contacts LS1A closed and the contacts LS1B open. At time T12 when control relay CR2 is energized, control relay contacts CR2a (line 25) open, de-energizing the solenoid of brake BR2 (line 25). Contacts CR2b (line 24) close, energizing the solenoid of clutch CL2 (line 24). The drive mechanism CL2 is then in an operating condition, rotating rollers 204, and drum 2 advances.

As the drum 2 advances, the drum actuates limit switch LS2 (line 14) at time T13, opening that switch and de-energizing relay CR5 (line 14). Contacts CR5a (line 20) and CR5b (line 21) open, preventing movement of clamp 201. Clutch CL1 is also actuated at time T13, as previously explained in connection with the cycle of the band-positioning apparatus at time T3. At time T14 the drum 2 leaves the vicinity of switch LS1 (line 5), which switches to its unactuated condition with contacts LS1A open and contacts LS1B closed. Relay CR1 is then de-energized, closing contacts CR1b (line 20) and CR1c (line 23). At time T14 the drum 2 actuates switch LS7 (line 14), opening the switch contacts. At time T15, switch LS2 closes.

At time T16 the drum 2 actuates switch LS8 (line 5), opening that switch. At time T17 the drum 2 leaves the vicinity of switch LS7 (line 14), closing the switch and energizing relay CR5 (line 14). Contacts CR5a (line 20) close, energizing solenoid SV2A (line 20) and closing clamp 201, opening switches LS3 and LS6, and closing limit switches LS4 (line 11) and LS5 (line 11) at time T18.

At time T18 the drum 2 actuates limit switch LS9 (line 11), closing contacts LS9A and opening contacts LS9B. Relay CR4 (line 13) is de-energized, closing contacts CR4b (line 27) and energizing the solenoid of brake BR3 (line 27). Contacts CR4a (line 26) open, de-energizing the solenoid of clutch CL3 (line 26) to stop drive of rollers 204a with the drum 2 in the vicinity of LS7 (line 14) and LS9 (line 11), and drum 1 in the vicinity of switch LS16 (line 13).

At time T18 when contacts LS9A (line 11) of switch LS9 close, relay CR4 is de-energized (line 13 and relay CR3 is energized (line 11). Relay contacts CR4a (line 26) open, de-energizing the clutch CL3 and relay contacts 4b (line 27) close energizing brake BR3 from power supply PW2. Relay contacts CR3a (line 23) close, energizing solenoid SV3B to open clamp 202, actuating switches LS11 and LS14 and returning switches LS12 and LS13 to their unactuated condition. Contacts 3b open, de-energizing solenoid SV3A.

Also at time T18 drum 3 from the band-positioning apparatus 100 arrives at the drum loader 200 and actuates switch LS1 (line 5), closing contacts LS1A and opening contacts LS1B to de-energize relay CR-2 (line 7). Relay contacts CR2b (line 24) open, de-energizing the solenoid of clutch CL2. Relay contacts CR2a (line 25) close, energizing the solenoid of brake BR2 from power supply PW3. The drive mechanism CL2, BR2 controlling rollers 204 is then stopped with the drum 3 in the drum loader 200. Clutch CL1 is de-energized at time T18 as previously explained in connection with the cycle of the band-positioning apparatus at time T18. The operating cycle then repeats.

FIGS. 30a to 30o, inclusive, represent sectional views of drums X and Y corresponding to views along lines 30a—30a of FIG. 2 to represent the coupling of the drums at various positions along the apparatus. The drum Y is in the drum loader but is connected to a line of drums in the winding frame 300 and is rotating with them. As represented in FIG. 30a, the fingers of drum Y are opened when actuated by portion A of the cam 203 in the drum loader. As represented by FIG. 30b, the fingers of drum Y close slightly when actuated by portion B of the cam which has a reduced diameter to set the fingers at first index position prior to interconnection with the second recess 55 of the drum. The drum X is then driven by the roller 231 (FIG. 22) at a speed which is slightly faster than the speed of the drum Y. As represented in FIG. 30c, when the following drum X approaches the fingers of drum Y, the rear wall of the recess 55 strikes the fingers. As represented in FIG. 30d, the finger 52 drops into the recess 55 while the cam diameter is reduced in portion C and the finger 50 may be temporarily maintained out of the recess by the web of the finger. While the drum Y rotates, the fingers of the drum Y rotate around the cone of the following drum X until the web of the finger 50 drops into a slot of the cone as represented in FIG. 30e. A rotational lock between drums X and Y is thereby provided and both drums then continue to rotate.

Referring now more particularly to FIGS. 18, 22, 31a, 31b, and 31c, apparatus is provided for checking that a rotational lock between drums X and Y has been accomplished. More particularly, this apparatus includes a pair of slidable rollers 260, 261 and a limit switch LS30 actuated by the roller 261. The roller 261 is represented partially in section in FIG. 31b and also in section in FIG. 31c. The roller is suitably covered with a soft high friction material such as rubber and is mounted on a shaft 262 having grooves therein for receiving balls 264 from races 265 of the roller. A suitable spring 266 maintains the roller normally in the position represented in the drawing so that switch LS30 is normally unactuated. When a rotating drum travels over the roller 261, the roller slides along the shaft 263 to actuate the switch LS30. The rollers 260 and 261 are coupled with a rounded surface on one roller in contact with a drum while a flattened surface of the other roller does not contact the drum, allowing the latter roller to return to its normal position.

Considering now the operation of the first rotational lock apparatus with reference to FIGS. 14a, 14b, 18 and 32, it will be assumed initially that switch LS29 (line 51) and switch LS31 (line 50) are actuated by drum X. The solenoid of clutch CL4 (line 60) and the solenoid of clutch CL5 (line 61) are energized through suitable direct-current power supplies PW4 and PW5 and through contacts CR14b (line 59). Power supplies PW1–PW5, inclusive, may all be of similar construction to that represented as power supply PW4, comprising a full-wave rectifier with suitable output circuits. At time T1 of this sequence, relays CR15 (line 50), CR12 (line 51) are energized. Contacts 12b (line 56) and 13b are closed, maintaining energization of relay CR14 (line 57). At least one of each of the following pairs of contacts of lines 56 and 57 must be closed to keep fail relay CR14 energized: 2d, 5c; 4c, 6c; 8b, 7d; 16a, 9d; 12b and 13b, 15a. The 2d, 5c pair of contacts indicates either clamp 201 is open or there is no drum interference to closing. The 4c, 6c pair of contacts indicates the same with respect to clamp 202. The 7d, 8b pair assures that if the band reset arms are moved from the rest position with a drum actuating any of the switches in line 39, FIG. 14B, there will be de-energization of relay 14. The 16a, 9d pair assures that if arms do not leave rest position before timer contacts TR1a (line 35) open, the relay CR14 will be de-energized. Pushbutton PB2 (line 57) is a manual control for de-energizing relay CR14.

Providing that a rotational lock between drums X and Y has been obtained, limit switch LS30 (line 53) is closed at time T2 for a brief interval, energizing relay CR13 (line 53). Relay contacts CR13a (line 54) close, holding relay CR13 energized through relay contacts CR–14e and CR–12a. Relay contacts CR13b (line 56) are also closed.

At time T3 drum X leaves switch LS31 (line 50), opening that switch and de-energizing relay CR15. However, since relays CR12 and CR13 are energized, relay CR14 remains energized.

Before drum X leaves the vicinity of switch LS29 at time T5, drum 1, driven by rollers 230 and 231, operates switch LS31 (line 50) at the time T4, thus closing switch LS31 and energizing the relay CR15 (line 50). Relay contacts CR15a (line 57) close to complete a holding circuit for relay CR14. Relay contacts CR15b (line 52) used during manual operation also close. With the line of drums still moving, the drum X leaves the vicinity of switch LS29 (line 51) at time T5, opening that switch and de-energizing relay CR12 (line 51). The relay contacts CR12a (line 54) open, de-energizing relay CR13.

If no rotational lock has been obtained due to some failure of the machine, then limit switch LS30 (line 53) remains open. Thus relay CR13 is not energized, and when the drum leaves the vicinity of switch LS31 (line 50) at time T4, relay CR15 is de-energized. Relay contacts CR15a (line 57) and relay contacts CR13b (line 56) are simultaneously both open, de-energizing relay CR14 (line 57) to disable the main drive through mainline contacts CR14c (line 60) and CR14d and cause the operation of the machine to cease. Contacts CR14b (line 59) open taking power off power supplies PW4 and PW5, permitting manual movement of drums.

If switches LS29 (line 51) and LS31 (line 50) are both open simultaneously, this indicates that the space between the drums is too great. At this time relay CR15 and relay CR12 (line 51) are simultaneously de-energized. Relay contacts CR12a (line 56) and relay contacts CR15a (line 57) are both open, de-energizing relay CR14 (line 47) and causing the operation of the machine to cease.

*Description of winding frame 300*

Referring now more particularly to FIG. 33 to the drawings, means comprising the winding frame 300, represented in plan view, are provided for driving the drums longitudinally and rotationally along the support to wind fabric helically around the drums to form a ply for tire carcasses. A fabric let-off unit 400 to be described subsequently supplies the fabric to the drums.

Referring also to FIGS 34 and 35, which represent the winding frame in fragmentary side elevational view, and to FIG. 36, the winding frame comprises three rows of wheels 301, 302, 303 mounted on supports 315b, 315a, and 315c for driving the drums therealong in the direction of the arrows. Referring to FIGS. 34, 35 and 36, a drive shaft 307 is coupled to the wheels 302, 301 and 303 through a suitable gear box 308 and connecting shaft portions 309a, 309b and 342b, 309c and 342c (not shown but corresponding to 342b of FIG. 34), respectively.

Referring more particularly to FIGS. 36, 37, 38 and 39, the wheels 301 are adjustable in position by means of a manually adjustable rod 305. The rod 305 rotates worm 310b which is meshed with worm gear 306b mounted on a shaft 311b having a worm gear 312b meshed with an arcuate segment 313b on frame 314b in which the wheel 301 is mounted. The frame 314b rotates on bearings 316b within support housing 315b to adjust the wheel to the proper angle. The wheels 302 and 303 are mounted in a similar manner indicated by corresponding reference numerals and are simultaneously adjustable with wheels 301.

Referring to FIG. 39, rod 311c is coupled to rod 305 through worm 310c and worm gear 306c. Rod 311c is in turn coupled to rod 311a through suitable bevel gears and a rotatable rod 340 (see also FIG. 40). Thus the first wheel of each row has its frame adjustable in angle in response to the rotation of rod 305. As represented in FIG. 38, each of the frames 314 is pivotally connected to a rod 341a which is connected to the first wheel frame of the row for adjustment therewith. The frames of wheels 301 and 303 are connected in a similar manner.

Referring to FIG. 37, the drive from shaft 342b to rotate the wheels 301 is supplied through suitable bevel gears 320b, 321b and intermeshed drive rods 322b, 323b to a gear 324b on the surface of the wheels. As will be seen in FIGS. 34 and 36, the remaing wheels are driven in a similar manner by rods 309a and 342c coupled through gears 343a (FIG. 34), 343c (FIG. 36), to portion 309a of drive rod 307 and to drive rods 309c and 307.

The wheels 301, 302, 303 are adjusted in angular position with their circumferences in planes parallel to the edges of the fabric as it wraps around the drums, that is, parallel to the direction of helical wrap of the fabric. This prevents wrinkling the fabric because the drive is effectively supplied longitudinally of the fabric.

Referring again to FIG. 30e and to FIG. 30s, after drums X and Y have been carried through the first winding frame, the cutter 700 severs the fabric between the drums, as will be more fully explained hereinafter. As represented in FIG. 30f, the fingers 50 and 52 of drum Y open to the first index position when actuated by the portion D of the cam. The drum Y is then driven by the transfer apparatus at a speed slightly greater than the speed of drum X and is separated from the drum X as represented in FIGS. 30g, 30h and 30t. As represented in FIG. 30h, the fingers of the drum Y are fully open when the fingers are actuated by the portion E of the cam.

Referring to FIG. 30t and to FIG 30i, when, for example, drum Z reaches the portion F of the cam, the fingers close to the second index diameter prior to interconnection with the following drum Y. The drum Z then has its fingers positioned to receive the following drum Y which is driven at a speed slightly greater than the speed of the drum Z which is rotating with the drums in the second winding frame. As represented in FIG. 30j, when the following drum Y approaches the fingers of the drum Z, the rear wall of the recess 54 strikes the fingers. As represented in FIG. 30k, when drum Z reaches portion G of the cam two fingers drop into the recess 54 while the third finger may be temporarily maintained out of the recess by the web of that finger. While the drum Z rotates, the fingers of the drum Z rotate around the cone of the following drum Y until the web of the third finger drops into a slot of the cone as represented in FIG. 30m. A second rotational lock between drums Y and Z is thereby provided and both drums then continue to rotate.

The operation of the first cutter, transfer apparatus and the second rotational lock apparatus will now be described in detail.

*Description and explanation of operation of the first cutter 700*

As may be seen in FIG. 1, there are two carcass ply cutters included in the machine. The first, designated generally as 700, is located immediately downstream of the first winding frame 300, while the second cutter, designated generally as 700A, is located immediately downstream of the second winding frame 300A. The function of the first cutter is to sever, into individual inner carcass ply cylinders surrounding each drum, the endless tube of coated weftless tire-cord fabric which has been wrapped around the joined drums passing through the first winding frame 300. It is necessary that the fabric tube be so severed at this point in the manufacturing process in order that successive drums may thereafter be unlocked, reversed in direction of rotation and relocked in the transfer unit 800. Similarly, the function of the second cutter 700A is to sever the second continuous helically wound cylinder of coated weftless tire-cord fabric wound in the second winding frame 300A over the joined drums bearing individual inner carcass ply cylinders into individual cylinders comprising the second or outer carcass ply on each drum. It is necessary that this cutting operation be performed at this point in the process of manufacture so that each successive drum may thereafter be unlocked and individually loaded onto the turret 1000 by the turret loader 900. While the cutters 700 and 700A may be of opposite hand in order to provide complete symmetry throughout the machine, this has not been found to be necessary. Consequently, the cutters 700 and 700A being identical in construction and operation, only the first cutter 700 will be described herein.

By way of supplementing FIG. 1 in showing the relative location of the first and second cutters 700 and 700A in the machine, reference is had to FIGS. 26a and 26b which show the location of the cutters with respect to the linear cam 203 and to FIGS. 30r, 30s, 30t and 30u which show the general location of the cutters 700 and 700A with relation to the other major machine assemblies and with relation to a series of drums passing in normal operating sequence through the entire winding, cutting and turret loading line of the machine. In FIGS. 41 and 56, respectively, the first cutter 700 and its carriage assembly 702 are shown in more detail in their physical locations and operational relationships (between cutting operations) with respect to the first winding frame 300 and the transfer unit 800.

As may be seen from the previously mentioned figures, the drums fed to the cutter 700 from the first winding frame 300 are still joined or locked together and are power fed to the cutter 700 by the winding frame 300. The drums remain in this joined or locked condition during the entire period of their passage through the cutter 700. As will be more fully described hereinafter, the longitudinal movement of the cutter carriage relative to the bed or frame of the machine is governed by the drive of first winding frame 300. Consequently, the longitudinal movement of both the drums and the cutter carriage can be accurately coordinated even though the drums be driven at variable speed through both the winding frame 300 and the cutter 700.

Referring now to FIG. 41, the mechanical structure of the cutter 700 is comprised of three major assemblies: the frame or bed 801, the cutter carriage assembly 702 and the governing or drum tracking assembly 703. The frame 801 must be of such design and material as to be strong enough to prevent any misalignment of the cutter carriage assembly 702 with respect to the line of drums passing through the machine, which misalignment might otherwise result from the various forces exerted on the frame 801 by the dead weight of the cutter carriage assembly 702 and the line of drums as well as by the various operational stresses resulting from the passage of the line of drums through the cutter 700, the tracking action of the cutter carriage assembly 702 and the miscellaneous mechanical functions of various devices and sub-assemblies mounted on the frame 801. Also, the frame 801 must be of such dimensions and must be provided with such suitably shaped and positioned members (some of which will be identified hereinafter) as to provide suitable operationally located mountings or working platforms for the various mechanical, hydraulic, pneumatic and electrical components of the cutter 700 described hereinafter. As shown in FIG. 41, the frame 801 is preferably constructed as an integral part of a common frame for other principal sub-assemblies of the machine including, for instance, the transfer unit 800.

While reference is made to the drawings, and particularly to FIGS. 42 and 43, for illustrative description of the shape and arrangement of the various structural members making up the carriage frame 704, it is to be noted here that the carriage frame 704 includes a fabricated bed member 705 of the general shape and construction illustrated in the drawings and two fabricated vertical end plates 706 and 707 which surround the line of fabric wrapped drums passing through the cutter. Under the left hand edge (looking downstream as in FIG. 42) of the carriage bed 705 are provided two pairs of rollers 708 having intersecting axes of rotation which ride upon an inverted V-shaped track 709 provided on the left hand edge (looking downstream of the frame 801. Opposite each pair of rollers 708 and under the opposite side of the carriage bed 705 (the right hand side looking downstream as in FIG. 42) is provided a roller 710 having a horizontal axis. Rollers 710 ride upon a flat track 711 provided on the right hand (looking downstream) side of the frame 801. By the foregoing means, the entire carriage assembly 702 may be rolled upstream and downstream (by means to be described hereinafter) with respect to the frame 801 and parallel to the direction of travel of the locked drums passing through the cutter 700.

Rotatably mounted on each of four shafts 712 attached to and extending between end plates 706 and 707 are a pair of guide rollers 713 and 713'. Mounted, in turn, rotatably between guide rollers 713 and 713' respectively, are cutter rotating drum 714 and cutter drive ring 715. The outer rim 716 of drum 714 is shaped to mate with guide rollers 713 while leaving a clearance space therebetween sufficient for the passage of a flat driving belt 721. Similarly, the outer rim 717 of the ring 715 is shaped to mate with guide rollers 713' while allowing sufficient clearance space therebetween for the passage of a flat driving belt 719. Viewed as in FIG. 42 (looking downstream) the cutter driving ring 715 is rotated clockwise by the motor X–M2 and the flat driving belt 719. The cutter rotating drum 714 is rotated (looking downstream as in FIG. 42) counter-clockwise by the motor X–M1 and the flat driving belt 721. Consequently, since the motors X–M1 and X–M2 impart, respectively, to the drum 714 and the ring 715 rotational speeds of 60 r.p.m., the rotational speed of the drum 714 and the ring 715 relative to each other is 120 r.p.m.

As shown in FIG. 42, the cutter 700 is provided with two opposed knife-edged cutting wheels 722. Referring now especially to FIG. 44 the means of mounting and driving each of the knife-edged cutting wheels 722 will be described. Mounted on the downstream face of the inner flat plate of the rotating drum 714 in diametrically opposite locations are shafts 723 extending downstream perpendicular to the downstream face of the rotating drum 714. Rotatably mounted on each of the shafts 723 is a pulley mounting member 724 having a yoke on each end thereof. Passing through both sides of the yoke at the end of the pulley mounting member 724 most remote from the cutting wheel 722 is a rotatably mounted shaft 725. Mounted on the upstream end of this shaft 725 and extending through an oversized hole 726 in the drum 714 is drive roller 727. A spring 728, attached to the pulley mounting member 724 and to the inside peripheral surface of the drum 714, exerts a force on the pulley mounting member 724 which causes the drive roller 727 to bear always against the inner peripheral surface of the cutter drive ring 715, whereby the relative rotation of the drum 714 and the ring 715 imparts a rotation to the drive pulley 727 and to the shaft 725. Also mounted on the shaft 725 between the sides of the yoke is toothed pulley 729.

Passing through both sides of the yoke at the end of pulley mounting member 724 nearest the cutting wheel 722 is a fixed shaft 730. Rotatably mounted on the upstream end of this shaft 730 and locked together rotationally by suitable means are two toothed pulleys 731 and 732. Rotatably mounted on the shaft 730 between the sides of the yoke is a cutter arm 733. Rotatably mounted, in turn, through the opposite end of the cutter arm 733 is a cutter shaft 734 to which are fixed, on the downstream end, the knife-edged cutting wheel 722 and, on the upstream end, a toothed pulley 735. The rotational drive imparted to the drive roller 727 is transmitted to the shaft 734 and the cutting wheel 722 and is multiplied in rotational speed by the pulleys 729, 731, 732 and 735 and the toothed belts 736 and 737. By this means, as well as by means of the rolling action of the roller 727 upon the driving surface of the driving ring 715, the relative rotational speed of the drum 714 and the ring 715 is multiplied to provide a rotational speed for the cutting wheel 722 of 7200 r.p.m.

Referring now again to FIGS. 42 and 43, mounted on suitable brackets 741 and 742 affixed to the upstream face of the end plate 706, are two pneumatic cylinders 743 and 744. The piston rods 745 and 745' (shown schematically in FIG. 53) of these respective pneumatic cylinders 743 and 744 are connected by suitable means 746 and 746' (identical though not shown) to the cutter depressor ring 747, whereby, when the pneumatic cylinders 743 and 744 are simultaneously actuated, the cutter depressor ring 747 is moved in an upstream or downstream direction. Around the outer periphery of the cutter depressor ring 747 is provided a track 748 having a channel-shaped cross section.

Pivotally mounted on the upstream face of the drum 714, their axes of pivot being parallel to said face, are a pair of cutter depressor arms 751. While the arms 751 are of irregular shape, as may be seen from FIGS. 42 and 45, the effective pivoting action takes places as shown in FIG. 45. Rotatably mounted in turn, on the upstream end of each arm 751 are the follower rollers 752 which travel in the track 748 of the cutter depressor ring 747. The outer, or downstream end of the arm 751 is connected by turnbuckle means 753 to the end of the cutter arm 733 on which the cutting wheel 722 is mounted. Referring again to FIG. 43, it may be seen that when the pneumatic cylinders 743 and 745 are actuated to pull the piston rods 745 and 745' to the left, or upstream, the pivot arm 751 will be pivoted by the movement of the cutter depressor ring 747 and the roller follower 752 in the upstream direction, whereby the cutter arms 733 will also be pivoted so as to bring the cutting wheels 722 inward toward the centerline of the locked drums passing through the cutter 700. In this manner, the cutting wheels 722 are brought into position to sever the tube of coated weftless tire-cord fabric wrapped on the drums into individual carcass ply cylinders.

Before leaving the cutter carriage assembly 702, FIG. 43, it should be noted that two pairs of chained, flat-sided rollers 754 are provided, respectively, upstream of the end plate 706 and downstream of the end plate 707 for the purpose of lending additional support to the locked drums passing through the cutter 700.

Since the operation of the cutter 700 in severing the endless tire-cord fabric tube wound upon the locked drums passing therethrough is not instantaneous, it is necessary, in order to provide a smooth cylindrical cut around the periphery of the fabric tube, for the cutter carriage assembly 702 to track or follow the advancing locked drums while the cut is being made. In this way a smooth circular severance of the fabric tube into individual carcass ply cylinders surrounding each drum may be made even though the locked drums are advancing during the period of time necessary for the cutting wheels 722 to be advanced into severing relationship with the fabric and, with drum 714, to complete at least a half circuit of the advancing drum line and, subsequently, to be withdrawn outwardly from the cutting position. This function is accomplished by the tracking assembly 703 which will now be described in detail.

Referring now to FIGS. 41 and 56, it may be seen that, when the machine is in operation, a continuous rotation is imparted to the shaft 755 from the winding frame 300 via a suitable chain and sprocket assembly 756 and the intermediate shaft and gear assembly 757. As may be seen in more detail in FIGS. 46 and 47, the shaft 755 consequently imparts a continuous rotation to shaft 758 through the gear box assembly 759. In addition to providing for a proper ratio of rotational speed of the shaft 758 relative to the shaft 755 and changing the direction of drive, the gear box assembly 759 is provided with means for changing gears so that the tracking speed of the cutter carriage assembly 701 may be adjusted to compensate for adjustments to the angle of wrap made in the winding frame 300 described hereinbefore and the associated fabric let-off assembly 400 described hereinafter.

The shaft 758, in turn, rotates, by suitable fixed mechanical linkage such as a key, a plate 760 in the magnetic clutch assembly X–MC6. The plate 760 is opposed to the plate 762 to which it may be magnetically locked when the magnetic clutch assembly X–MC6 is energized. The plate 762, in turn, is fixed by suitable means, such as a key, to the shaft 763 on the opposite end of which is mounted a spur gear 764. The spur gear 764, when rotated, drives the rack 765 which is held in engagement with the spur gear 764 by the guide roller 766.

Referring now to FIGS. 48 through 51, the rack 765 is connected by a pin 767 to the crank 768 and the stop lever 769. The crank 768 and the stop lever 769 are, in turn, fixedly connected to the shaft 770. Bolted to the bottom of the cutter carriage bed 705 is a channel-shaped mounting bracket 771 which, in turn, is welded or otherwise rigidly fixed to the hydraulic cylinder assembly 772 constructed with the arrangement of internal passages shown in FIG. 51. The piston rod 773 actuated by the piston 774 operating in the cylinder 772' is, as may best be seen in FIGS. 46 and 56, securely fastened to the frame 801, whereby, when hydraulic fluid admitted to the cylinder assembly 772 exerts an unbalanced force on either side of the piston 774, the piston 774 and the piston rod 773 will remain stationary and the cylinder assembly 772 will move upstream or downstream with respect to the machine, carrying the entire carriage assembly 702 with it.

Returning now to FIG. 49, the shaft 770 passes through both sides of the channel-shaped bracket 771 and is rotatably mounted therein. Fixedly mounted on the shaft 770 on the side of the bracket 771 opposite to that on which is located the crank 768 is the switch actuator 775 which, when the shaft 770 is rotated to its extreme clockwise (as viewed in FIG. 50) position, will actuate the limit switch X–LS8 and, when rotated to its extreme counter-clockwise position, will contact the stop 775'.

Between the sides of the channel-shaped bracket 771, the crank members 776 and 776', together comprising a yoke, are fixedly mounted on the shaft 770. The crank members 776 and 776' are provided with pins 777 and 777' near their lower ends, which pins 777 and 777' are free to slide vertically in slots 778 and 778' in the protruding end of the valve spool assembly 779.

Referring now to FIG. 51, the valve spool assembly 779 is comprised of the block 779A, the stud 779B, the collar 779C slidably mounted on the stud 779B, the valve spool 779D threaded onto the end of the stud 779B opposite to the block 779A and the spacer spring 779E interposed between the collars 779C and the spool 779D. The spool 779D is provided with a central bore 779F and the various passages 779G, 779H and 779I machined into its outer surface as shown in FIG. 51. The entire valve spool assembly 779 is mounted in the cylinder head 780 of the hydraulic cylinder assembly 772 which functions as a valve body. Mounted within the cylinder head 780 and bearing against the collar 779C is the valve spring 780A.

As shown in FIG. 51, the valve spool 779D is in its neutral or rest position. A continuous supply of hydraulic fluid is fed, under pressure, into the valve inlet 780B. In the neutral position, this fluid passes freely, in alternate paths (through passages 780C, 779G, 779H and 780D or, alternatively, through passages 780C, 779I, 779F and 780D) to the valve outlet 780E. Under these conditions no flow of hydraulic fluid occurs into either of the passages 780F or 780G feeding the cylinder 772' and the pressure on each side of the piston 774 remains balanced. It will be noted that, when the valve spool 779D is moved to the right (as viewed in FIG. 51), the hydraulic fluid entering the valve body 780 through the passage 780C will be directed into the passage 780F, and the flow through the passages 779G and 779I will be shut off. Simultaneously, an outflow of fluid from the passage 780G will be permitted through the passages 779H and 780D. On the other hand, should the spool 779D be moved to the left (as viewed in FIG. 51), the fluid entering through the passage 780C will be directed into the passage 780G through the passage 779G, and an outflow of fluid from passage 780F will be permitted through passages 779I, 779F and 780D.

As previously noted, when the valve spool assembly 779 is (as viewed in FIGS. 48 and 51) moved to the right by the movement to the right of the rack 765, as will occur when the clutch X–MC6 is actuated, hydraulic fluid entering inlet 780B is directed into the hydraulic cylinder 772' on the right hand or downstream side of the fixed piston 774. Because the piston 774 and piston rod 773 are fixed to the frame or bed 801, the entire cylinder assembly 772 will be moved to the right or downstream. Because the bracket 771 is fastened to the carriage bed 705 by suitable machine screws 771' the entire cutter carriage assembly 702 also moves downstream following the line of drums passing through the cutter. After the cylinder assembly 772 has traveled approximately ½" to the right or downstream, limit switch X–LS9 is de-actuated by losing contact with the cylinder assembly 772 starting the cutting cycle. After the cylinder assembly 772 has traveled sufficiently far downstream to permit completion of the cutting cycle, as hereinafter described in more complete detail, electrical timing means, which will be described hereinafter, cause the magnetic clutch X–MC6 to become de-energized whereby the pinion 764 no longer drives the rack 765 to the right or downstream. When this occurs, the stop lever 769 is rotated (as shown in FIG. 48) clockwise by the pull of the spring 769' the ends of which are attached, respectively, to the top end of the stop lever 769 and to the carriage bed 705. The rotation of the stop lever 769 causes the shaft 770 to rotate until the switch actuator 775 comes to rest against the stop 775' this rotation of the shaft 767, in turn, rotates the cranks 766 and 766' moving the valve spool assembly 779 to the left (as viewed in FIG. 51). The movement of valve spool assembly 779 to the left is assisted by the action of the spring 780A. When the valve spool assembly 779 has moved all the way to the left as determined by the stop 775', hydraulic fluid admitted to the cylinder assembly 772 through the inlet 780B is channeled into the cylinder 772' on the left hand (as shown in FIG. 51) side of the piston 774. This has the effect of moving the entire cylinder assembly 772 together with the cutter carriage assembly 702 to the left or upstream. This movement continues until the heel 781 of the stop lever 769 bears against the adjustable stop 782, limit switch X–LS9 having meanwhile been again actuated by coming into contact with the cylinder assembly 772. As the stop 782 is contacted by the heel 781 of the stop lever 769, the stop lever 769 is rotated in a counter-clockwise (as viewed in FIG. 48) direction; thereby bringing the valve spool again into the neutral position (as shown in FIG. 51), whereby all movement of the cylinder assembly 772 ceases. The stop 782 is slidably mounted on the frame 801 whereby it may be accurately adjusted as to longitudinal position by means of the screw and nut assembly 783 which is actuated by the hand wheel 783' (see FIG. 46).

It will be seen from the above description that the power for moving the carriage assembly 702 is obtained from the hydraulic fluid acting in the cylinder 772 in response to the displacement of the valve spool 779D. During downstream motion the rack 765, and hence the speed of the first winding frame 300, governs the fluid flow to the cylinder in such a manner that the carriage assembly speed synchronizes with the rack speed. During upstream motion, the carriage assembly speed is determined by the displacement of the valve spool under the influence of the combined action of springs 780A and 769'. An advantage of this system is the confinement of the starting, stopping, and reversing loads to a hydraulic supply system. Were these variable loads supplied by the main drive system, the reactions of the drive to the changing load could introduce speed variations which could detract from the smooth performance of the fabric winding operation.

It will be useful at this point to consider the entire mechanical sequence of operation of the cutter. Referring now to FIGS. 3, 26a and 27c, as the line of locked drums bearing the endless coated, weftless tire-cord fabric tube passes through the first cutter 700 at least one (and generally all) of the rollers 57 on each drum in sequence make contact with the insulated sleeve contact 254 on the linear cam 203. This contact, the drums being grounded through their contacts with each other and with the uninsulated portions of the linear cam 203, causes an electrical signal to be fed to the electrical controls (to be described hereinafter) for the cutter through the wire 250 and the clamps 201 and 202 of the drum loader 200. This signal results in the energization of the magnetic tracking clutch X–MC6 and the cutter begins to track the continuously moving line of locked drums. The insulated sleeve contact 254 is so positioned on the linear cam 203 that tracking is initiated at the precise moment when the cutting wheels 722 are longitudinally aligned with the longitudinal plane intersecting the endless fabric tube between a pair of locked drums where it is desired to sever the fabric tube. After the carriage has tracked the advancing drum line for approximately ½" so that the inertia of the system has been overcome and the hydraulic system controlling the tracking has come into balance, limit switch X–LS9 is de-actuated by losing contact with the hydraulic cylinder assembly 772. This results in the energization of the solenoid valve X–SV1 (FIG. 53) which, in turn, actuates cylinders 743 and 744 and causes the cutting wheels 722 to be advanced radially inward into cutting relationship with the fabric tube. At the end of approximately two seconds during which the rotating drum 714 (on which the cutting wheels 722 are mounted as previously described) has made approximately two complete revolutions around the fabric tube thereby insuring that the tube will be completely severed at the desired location between the pair of locked advancing drums, a timing device de-energizes the solenoid valve X–SV1, and the cutting wheels 722 are withdrawn from cutting relationship with the advancing drum line. The cutter carriage assembly 702, driven by the tracking clutch X–MC6 through the hydraulic system previously described, continues to track the line of advancing drums until the carriage frame 704 contacts and opens limit switch X–LS6 mounted on the frame 801 as shown in FIGS. 42 and 43. This de-energizes the tracking clutch X–MC6 which causes the carriage assembly 702 to be returned to start or rest position by the action of the hydraulic system as previously described. The carriage assembly 702 remains in the start or rest position until the cutter 700 receives a signal from the next sequentially advancing drum.

A means has been provided in connection with the cutter 700 for shutting down the machine in the event that no cut is made by reason of the tracking clutch X–MC6 not being energized by a signal from an advancing drum. This means is the signal checking assembly 784 best shown in FIGS. 46 and 52. Describing now the mechanical arrangement and functioning of the signal checking assembly 784, the worm 785 mounted on the shaft 758 continuously drives the worm gear 785'. The worm gear 785' is, in turn, mounted on and continuously turns a hollow shaft 786 to the opposite end of which is affixed the clutch plate 786' of a magnetic clutch X–MC5. By electrical means, which will be described hereinafter, the magnetic clutch X–MC5 is energized automatically at the same time that the tracking clutch X–MC6 is de-energized and remains energized until such time as the tracking clutch X–MC6 is again energized as the result of a signal caused by the passage of a drum roller 57 over the sleeve contact 254 on the linear cam 203. When magnetic clutch X–MC5 is energized it locks the clutch plate 786' to the central shaft 787, thereby slowly rotating the shaft 787 in a clockwise direction (as viewed in FIG. 46). Fixedly mounted near the end of the shaft 787 opposite the magnetic clutch X–MC5 is the rotor 788 shaped as shown in FIG. 46. When the clutch X–MC5 is not energized, the heel 788' of rotor 788 rests against the stop 789 as shown in FIG. 46 and is held in this position by the torsion spring 789' (shown in FIG. 52). As the clutch X–MC5 is energized the switch actuator portion 788" of the rotor 788 begins to slowly advance clockwise towards limit switch X–LS7. Provided that each successive drum passing through the cutter 700 makes a satisfactory contact with the sleeve contact 254 and further provided that tracking clutch X–MC6 is consequently energized by the passage of each drum, the actuator 788" will never reach limit switch X–LS7 between the time that the clutch X–MC5 is energized and the time that it is de-energized and the rotor 788 returned by the spring 789' to starting position as the result of the next successive drum contact with the sleeve contact 254. However, should any drum pass the sleeve contact 254 without making effective contact therewith and thereby fail to actuate the tracking clutch X–MC6, the actuator 788" will continue around in a clockwise direction and will contact limit switch X–LS7 prior to the time when the next successive drum can make contact with the sleeve contact 254. Actuation of limit switch X–LS7 will cause the entire machine to stop.

In FIG. 54 the electrical controls for the cutter 700 are repesented schematically. With the cutter carriage 702 at start or rest position and no drum roller 57 in contact with sleeve contact 254 the starting conditions for the control system are as follows:

(1) There is no contact between a drum roller 57 and sleeve contact 254; so relay X–CRE1 is de-energized (lines 48–51).

(2) Motors X–M1 and X–M2 (not shown in FIG. 54) are running and relay contacts X–M1 and X–M2 (lines 51A and 61) are closed.

(3) Limit switch X–LS9 is depressed by the hydraulic cylinder assembly 772. Switch contact X–LS9A (line 53) is open and switch contact X–LS9B (line 58) is closed. Time delay relay X–TRE1 (lines 52–56) is de-energized.

(4) In line 57 limit switch X–LS6 is closed and unactuated, but control relay X–CR10 is not energized.

(5) In line 58 control relay X–CR12 is not energized because both contacts, X–CRE1 and X–TRE1 are open.

(6) In line 61, control relay X–CR11 (the fail relay) is energized, both limit switches X–LS7 and X–LS8 being closed and unactuated. Reset button X–PB2 (line 62) is open.

(7) In lines 64 and 66 signal checking clutch X–MC5 is actuated and running, contacts X–CR10b and X–CR11b both being closed.

(8) In lines 65 and 67, tracking clutch X–MC6 is unenergized, relay contact X–CR10c being open.

(9) In line 68 and the fail relay contact for the entire machine X–CR11c is closed and the machine is running.

As the locked drums pass through the cutter 700 at least one roller 57 on one of the drums makes contact (line 51) with the sleeve contact 254 on the linear cam 203 thereby signaling that the advancing drum line is in proper position for tracking to commence. This contact energizes relay X–CRE1 (line 48) which closes contact X–CRE1 (line 58) energizing relay X–CR10 (line 57) through switch contacts X–LS9B (line 58) and X–LS6 (line 57). As the result of the energization of relay X–CR10, (line 57) this circuit is locked in by the closing of contact X–CR10a (line 57), the signal checking clutch X–MC5 (line 66) is dropped out by the opening of contact X–CR10b (line 64), tracking clutch X–MC6 (line 67) is energized by the closing of contact X–CR10c (line 65) and the cutter carriage assembly 702 begins to track the advancing drum line.

When the carriage has advanced approximately ½", limit switch X–LS9 is actuated by losing contact with the hydraulic cylinder assembly 772, switch contact X–LS9B (line 58) opens, but drops out no circuits because the circuit remains complete through contact X–CR10a (line 57), switch contact X–LS9A (line 53) closes energizing time delay relay X–TRE1 (lines 52–56), contact X–TRE1 (line 58) is immediately closed energizing control relay X–CR12 (line 58). Contact X–CR12 (line 51A) is closed actuating solenoid valve X–SV1 (line 51A), whereby the cutting wheels 722 are advanced radially inward and the cut begins. Approximately two seconds after being energized, control relay X–TRE1 (lines 52–56) automatically becomes de-energized and contact X–TRE1 (line 58) opens dropping out control relay X–CR12 (line 58), which, in turn, drops out solenoid valve X–SV1 (line 51A) causing the cutting wheels 722 to be withdrawn from the cutting position.

After the cutter carriage assembly 702 has tracked the advancing drum line for approximately 6", limit switch X–LS6 is actuated opening switch contact X–LS6 (line 57) which drops out control relay X–CR10 (line 57). This, in turn, opens lock contact X–CR10a (line 57), closes contact X–CR10b (line 64) re-energizing signal checking clutch X–MC5 (line 66), and opens contact X–CR10c (line 65) dropping out tracking clutch X–MC6 (line 67). The cutter carriage assembly 702 is then returned to starting position both mechanically and electrically by the action of the springs 780A and 769' and the hydraulic system as previously described.

With respect to the fail relay, X–CR11 (line 61) it should be noted that the following conditions will cause this relay to become de-energized thereby shutting down the entire machine: failure of the rollers 57 on any drum to make effective contact with the sleeve contact 254 will cause the signal checking clutch X–MC5 to remain energized during the passage of an additional drum whereby limit switch X–LS7 will be actuated opening switch contact X–LS7 (line 61); pressure of hydraulic fluid in the hydraulic system insufficient to keep the speed of carriage 702 in synchronism with the rack 765 will cause the rack 765 to override, whereby switch actuator 775 (FIG. 50) will actuate limit switch X–LSF openings switch contact X–LS8 (line 61); and, finally, failure of either of the cutter motors X–M1 or X–M2 will cause the respective contacts (line 61) to open de-energizing relay X–CR11 (line 61).

*Description and explanation of operation of transfer apparatus 800*

Referring now more particularly to FIGS. 41 and 55–62, inclusive, there is represented in detail the drum transfer apparatus 800 of FIG. 1 The cutter 700 is also represented to show its relationship to the transfer apparatus. The drum transfer apparatus 800 comprises a table of rollers, mounted on a suitable frame 801, for carrying the drum between winding frames. As represented in FIGS. 55 and 57, rollers 803 and 804 are driven from the main drive through gear box 807 and sprocket and chain drives 815–820, inclusive, and through a pair of magnetic clutches X–MC7 and X–MC8.

A second rotational lock switch X–LS10 is positioned for actuation by roller 821 when that roller is transporting a rotating drum, as will be more fully described subsequently. The rollers are slidable along their own axes in a manner similar to that previously described in connection with the rollers utilized to actuate the first rotational lock apparatus.

Referring now to FIG. 30e, the coupling between the cone of drum X and the fingers of drum Y is there represented at the time the cutter is cutting the fabric supported by the drums X and Y. After the cut has been made and while the drum Y is supported by the rollers of the transfer apparatus, the fingers of drum Y are caused to open by portion D of the cam to the first index position so that drum Y is pushed by drum X but is no longer rotationally locked thereto. When drum Y reaches roller 803 of the transfer apparatus (FIG. 44), drum Y begins to move away from drum X as represented in FIG. 30g.

Referring to FIG. 30h, as the fingers of drum Y pass over section E of the cam, the fingers are positioned at their fully open position prior to later readjustment. At this time, drum Z which precedes drum Y has its fingers adjusted to the second index position by a portion F of the cam, as represented in FIG. 30i. Further travel of drum Y brings it to the position shown in FIG. 30j; where the fingers of drum Z strike the rear wall of recess 54 and slow the travel of drum Y to that of drum Z. This is made possible by the slippage of magnetic clutches X–MC7 and X–MC8 shown in FIG. 55. When the drum Y is driven by rollers 803 and 804 to the position represented in FIG. 30k, the fingers of drum Z have passed to portion G of the cam so that two of the fingers drop into the first groove 54 of the cone of drum Y. Drum Z is coupled to the train of preceding drums passing through the second winding frame 300A and is rotating in the direction opposite to the rotation of the drums through the first winding frame 300. Thus the fingers of drum Z rotate around the cone of drum Y until the finger having the web thereon drops into one of the slots of the cone, as represented in FIG. 30m, to cause the rotation of drum Y.

Referring now to FIG. 58, which is a sectional view taken along line 58—58 of FIG. 55, the reverse rotation of the drum Y is indicated in phantom. Lateral support for the drum is provided by rollers 850, 851. Referring to FIG. 59, which is a sectional view taken along line 59—59 of FIG. 41, lateral support for a drum entering the transfer apparatus is provided by means of vertical rollers 855, 856 similar in operation to the rollers of the table 801.

Referring to FIG. 60, which is a sectional view taken along line 60—60 of FIG. 41, and to FIG. 61a which is a sectional view taken along line 61a—61a of FIG. 60, each pair of rollers, such as rollers 830, 831 are flat-sided on two opposite sides and are rotated 90° with respect to each other so that the drum is always supported by one roller while the other roller returns to its rest position. The rubber-covered driving roller 804 is represented in section in FIG. 61.

*Operation of second rotational lock apparatus*

Referring now more particularly to FIG. 62, there are represented control circuits of an electrical panel X for controlling the transfer apparatus.

The magnetic clutches X–MC7 and X–MC8 of FIG. 57 are energized through direct-current power supplies X–PW6 and X–PW7 and are engaged at all times to supply drive to the rollers 803, 804 of the transfer apparatus. When reset button X–PB6 (line 93) is pushed, control relay X–CR19 is energized, closing contacts X–CR19a (line 89) and X–CR19b (line 91). Under normal operating conditions, CR19 is held energized through contacts CR19b and one or the other of contacts CR16b and CR18b. When a drum approaches switch X–LS13 (line 84), the switch closes, causing energization of relay X–CR16. Relay contacts X–CR16a (line 87) and X–CR16b (line 90) then close, causing energization of relay X–CR18. Relay contacts X–CR18a (line 89) close, relay contacts X–CR18b (line 92) open and relay contacts X–CR18c (line 88) close, energizing relay X–CR17. Relay contacts X–CR17a (line 88) then open and contacts X–CR17b (line 86) then close.

If a rotational lock occurs between the drum on the transfer apparatus and the train of drums in the second winding frame, limit switch X–LS10 is actuated by the roller displaced by the rotating drum. The switch X–LS10 then opens, de-energizing relay X–CR18. Contacts X–CR18b close, causing relay X–CR19 to remain energized after the drum leaves the vicinity of switch X–LS13, de-energizing relay X–CR16. If due to some operational failure of the apparatus, no rotational lock occurs, limit switch X–LS10 remains closed and relay X–CR18 remains energized. When the drum leaves the vicinity of switch X–LS13, relay X–CR16 is de-energized, opening contacts X–CR16b and de-energizing relay X–CR19. Contacts X–CR19c and X–CR19d (line 95) in the main power supply then open to stop the machine.

*Description of second winding frame 300A*

The operation of the second winding frame is similar to the first winding frame except that the drums travel at a slightly greater speed as will be more fully explained hereinafter and rotate in the direction opposite to their rotation in the first winding frame. Accordingly, the second winding frame will not be described in detail.

*Description of second cutter 700A*

Referring again to FIG. 30m, after the drums leave the second winding frame the cutter blade severs the fabric between drums in a manner similar to that described in connection with the first cutter. Accordingly, the second cutter will not be described in detail.

Referring to FIG. 30n and to FIG. 30u, when the drum Z arrives at portion H of the cam, the fingers open to the second index diameter H. When they arrive at the notched raised portion J of the cam, thereby supporting the cam, the fingers open further with at least one finger remaining at the second index diameter H to prevent the telescoping of the drum Z with the following drum Y which pushes the drum Z toward the end of the cam prior to the operation of the turret loader which will be described subsequently. The photocell M–PC1, subsequently described, is actuated by the leading edge of the drum Z after the fingers of the drum Z have been actuated by the raised portion J of the cam. Actuation of the photocell M–PC1 initiates operation of the turret loader, as will be explained hereinafter.

FIG. 30p is an end view of a drum taken along the line 30p—30p of FIG. 30n. FIG. 30q is an enlarged fragmentary view of the portion of the cam represented in FIG. 30p to represent the manner in which two fingers are operated by the body diameter of the cam while a third finger is operated by the raised portion of the cam. FIG. 30o represents the drum at the end of the cam and supporting the cam as the drum travels over the full diameter portion K of the cam.

*Description and explanation of operation of line-to-turret synchronizer*

Referring now more particularly to FIGS. 63 to 65, inclusive, the drive mechanism 1900 comprises a main drive 1903 (FIG. 65), a line-to-turret synchronizer 1901 (FIG. 64) and a gap control system 1902 (FIG. 63) which latter will be individually described in detail. Referring to FIG. 65 the drive mechanism 1900 includes a suitable main drive motor 1903 connected through a chain drive 1904, a clutch-brake mechanism 1907, through a main shaft P, a gear box 1905, and a turret clutch-brake mechanism M–MC2, M–MB2 to the turret to control the operation thereof. The line-to-turret synchronizer synchronizes the speed of the first and second winding frames with the turret cycle to allow the machines indexed by the turret, as more fully described hereinafter, a uniform time interval in which to perform their functions regardless of the exact lengths of the drums being used. This is accomplished by maintaining a constant percentage of dwell or lock time in the turret cycle after the turret indexes and before a new drum is presented to the turret by the turret loader. If this percentage of dwell time changes, the winding frame is driving the drums at too fast or too slow a speed and a correction is made.

During normal operation the Geneva drive of the turret is locked in position after the turret indexes, as will be described subsequently. When a drum arrives at the turret loader, it operates a photocell M–PC1 (FIG. 65) and the turret loader then loads the drum onto the turret and then returns to its rest position. The photocell M–PC1 on actuation also signals the Geneva drive crank which is then unlocked and starts to turn at the rate of one turn in 6 seconds, driven by the aforementioned clutch-brake assembly M–MC2, M–MB2. After rotating 270°, a check is made to determine whether the turret loader has returned to a rest position and all other operations at the turrets have been completed. If all operations have been completed, the Geneva drive crank continues to rotate to 360° at which position it stops. During the last 90° of travel the turrets are indexed. The Geneva drive crank stays locked until the next drum operates the photocell M–PC1. This lock period is ideally 1½ seconds when the Geneva drive crank turns one turn every six seconds. This amounts to a 7½ second cycle during which the idle time of the Geneva drive crank is 20% of the total time.

Main shaft P, coupled to motor 1903 through clutch-brake mechanism 1907, also serves to drive the second winding frame and the first winding frame through a synchronizing mechanism to be described.

Power is fed from the main shaft P to shafts A and C of differential 1910 (FIG. 64). Shaft C is driven continuously while shaft A is driven through a clutch M–MC3 or held by a brake M–MB3. As explained in our above-mentioned copending application Serial No. 242,197, the clutch-brake combination M–MC3, M–MB3 is operated at the same time as the turret clutch-brake combination M–MC2, M–MB2. Under normal operation conditions, the clutches are engaged for approximately 80% of the time and the brakes are engaged for approximately 20% of the time. While the brakes are engaged and shaft A is locked, shaft C turns shaft B in a given direction 180° through the differential 1910. When the clutches are engaged and brakes disengaged, shaft A is driven at ⅝ the speed of shaft C. Shafts A and C react in the differential 1910 to drive shaft B at ¼ the speed in the reverse direction. As long as the lock period is 20% of the total cycle or ¼ of the drive period, shaft B oscillates in the same approximate 180° arc. If a drum arrives early or late, the lock period changes and occupies a different percentage of the total cycle, causing shaft B to rotate further in one direction than the other.

Referring now to FIGS. 64a and 64b, shaft B carries clutch half 1B which has a pin 3G projecting from its face. Clutch half 1C carries two pins spaced about 180° apart. So long as shaft B rotates within a 180° arc, there is no output on shaft of clutch 1C. If the lock period changes, however, then shaft B turns further in one direction, driving the shaft on which clutch half 1C is mounted. This shifts the position of the 180° arc of shaft B and rotates clutch half 1C. Clutch half 1C is coupled through chain 1911 to the speed control shaft of an adjustable speed drive mechanism, 1919, for example, a Reeves drive of conventional construction, and increases or decreases the speed of the drive in accordance with the change in the lock period.

Power from main drive shaft P is fed to the input shaft 1918 of a differential 1920 while the output shaft 1921 of the adjustable speed drive mechanism 1919, which is also driven by shaft P, is fed to the cage shaft 1922 of the differential 1920. The input and cage shafts react to yield an output speed of shaft D that is less than the speed of the input shaft by an amount equal to the speed of cage shaft divided by the differential gear ratio of, for example 2.5 to 1. The output shaft D of the differential 1920 drives the first and second winding frames. Therefore, changing the speed of the adjustable speed drive mechanism 1919 changes the speed of the entire line of drums which shifts the arrival time of the drums at the turret to re-establish the desired lock period of 20%. Thus, if the lock period has increased beyond 20% of the total cycle, the speed of the drums is increased as a correction, while if the lock period has decreased to less than 20% of the total cycle, the speed of the drums is decreased to accomplish the correction.

*Description and explanation of operation of gap control mechanism*

Referring now to FIGS. 63–63d and 66–72, a gap control mechanism is there represented which maintains a predetermined gap or space between drums, as they pass a chosen measurement point on the machine, within a predetermined tolerance. If the gap between drums on the transfer apparatus 800 exceeds the predetermined tolerance, correction is made by adjusting the speed of the first winding frame 300 relative to the speed of the second winding frame 300A. The speed adjustment is accomplished in a dual manner. The speed is effectively momentarily increased or decreased to provide an immediate correction in spacing between drums by adding or subtracting turns of the drive 1942 of the first winding frame. Further, each time a correction is made, a small change is also made in the average difference in speeds of the two winding frames so that the speed of the first winding frame is gradually altered toward the speed which would produce the desired gap without any correction.

Referring now more particularly to FIGS. 63–63d and 66, assuming that no correction is being made, power is supplied through shaft E which rotates at a speed representing the speed of the second winding frame. Power is fed from shaft E through differential A and chain and sprocket drive 1940, 1941, 1942 to the first winding frame and also from shaft E to the adjustable speed drive unit 1950 through chain and sprocket drive 1943, 1944, 1945. The output of the adjustable speed drive unit 1950 is fed by shaft 1951 through differential B to the cage of differential A.

As represented in FIGS. 63a–63d, power from main shaft E is also fed through chain and sprocket drive 1954, 1955, 1956 and through shaft 1998 to gears 1961 and 1962, rotating shaft 1997. Clutches MC2 and MC1, having slidable plates keyed on shafts 1997 and 1998 and plates mounted on bushings 1995 and 1996 are disengaged. Gears 1964 and 1963 are mounted on bushings 1996 and 1995 and are meshed with gear 1965 mounted on shaft Q connected to brake MB1 and the cage of differential B. Gear 1966 is mounted on shaft Q and is coupled through an idler gear 1967 to gear 1968 on shaft 1990.

Brake MB1 is engaged and the cage of differential B is locked. This causes power from shaft E to be translated through the adjustable speed drive 1950, shaft 1951 and differential B and gears 1952 and 1953 to the cage of differential A where it reacts with the input from shaft E to differential A to yield an output speed that is less than the input speed of shaft E by an amount equal to the output speed of the adjustable speed drive mechanism divided by the differential gear ratio of, for example, 2.5 to 1.

Two photocells are used to indicate the gap between drums on the transfer apparatus 800. The first signal B indicates the front edge of a drum arriving at the transfer unit. The second signal A represents the departing edge of the preceding drum. When the first signal B is received, instrument brake X–MB2 (FIG. 66), is disengaged and clutch X–MC3 is engaged to drive one side of an instrument differential C by rotation of gears 1992, shaft 1993, and gears 1994. The other side of the differential C is locked by brake X–MB1 through gears 1966, 1967, 1968, shaft 1990, gear box 1978, gears 1979 and 1980, shaft 1981, see FIG. 67 and gears 1982, 1983. The cage output of the differential C drives a rack 1989 with linear camming surfaces through gears 1986, 1987, 1988 at a speed proportional to the speed of the first winding frame. The rack 1989 travels, actuating limit switches X–LS1–X–LS5 in a given order until a signal A is received. Signal A causes clutch X–MC3 to disengage and brake X–MB2 to engage, stopping the rack. The position at which the rack stops determines the switches which are actuated to indicate the gap between drums, as will be more fully explained subsequently.

When the rack 1989 stops, if the rack 1989 is in the correct position as indicated by the limit switches, this indicates that the gap is within predetermined tolerance limits and no correction of the speed of the winding frame need be made. Brake X–MB2 is then disengaged and clutch X–MC4 is engaged to return the rack to its initial or start position by drive supplied from shaft E by way of chain and sprockets 1954, 1955, 1956, shaft 1998, gears 1962 and 1961, shaft 1997, chain and sprocket drive 1974, 1975, 1976, shaft 1999, and gear box 1977.

If the gap is too large or too small for correction by adjustment of relative speeds of the winding frames, then the apparatus is stopped by removal of the power through relay circuits.

Referring now to FIG. 69 and to FIG. 70, assuming that at time T1 drum 1 is positioned to maintain photocell X–PC2 at point A in a darkened condition and that while drum 2 is approaching point B, light strikes photocell X–PC1, the sequence of operation is as follows. The reset button X–PB1 (line 19) has previously been pushed to energize relay X–CR9 (line 18), closing contacts X–CR9a (line 18) to hold the relay energized and closing contacts X–CR9b (line 5A) to energize relay X–CR1 (line 5) through contacts X–CR9b, photocell contacts X–PC1a and switch X–S1 (line 11).

Referring to FIGS. 66a and 70, at time T1, the rack 1989 is in its start position so that switch X–LS5 is actuated with contacts X–LS5A (line 9) closed and contacts X–LS5B (line 12) open, switch X–LS4 (line 8) is actuated with its contacts closed, switch X–LS1 (line 18) is unactuated with its contacts open, switch X–LS3 (line 7) is unactuated with its contacts open, switch X–LS2 (line 18) is unactuated with its contacts closed.

Shortly after time T2 drum 2 reaches point B, causing photocell X–PC1 to be darkened, opening contacts X–PC1a (line 5) and closing contacts X–PC1b (line 6). When contacts X–PC1b close, control relay X–CR4 (line 9) is energized through switch X–S1 (line 9), limit switch X–LS5A (line 9), contacts X–CR7a (line 9), contacts X–CR1c (line 6), contacts X–PC1b (line 6) and switch X–S1 (line 11). Contacts X–CR4a (line 10) close, holding the relay X–CR4 energized through contacts X–CR9b (line 10) and contacts X–CR5c (line 10). At time T3 relay X–CR7 is energized through contacts X–CR4d, X–CR1c and photocell contacts X–PC1b, opening contacts X–CR7a (line 9) and closing holding contacts X–CR7b (line 5B). When relay X–CR4 is energized, contacts X–CR4b (line 21) open, deenergizing brake X–MB2 (line 21), and contacts X–CR4c (line 22) close, energizing clutch X–MC3 to drive the rack 1989 upward. Suitable similar half-wave rectifier direct-current power supplies X–PW1, X–PW2 and X–PW3 are utilized as indicated in addition to full-wave rectifier power supply X–PW4.

The rack moves upward until time T5, when it reaches the position represented in FIG. 66b with switch X–LS5 unactuated, and with contacts X–LS5A (line 9) open and contacts X–LS5B (line 12) closed, with switch LS4 (line 8) unactuated with contacts X–LS4 open, with switch X–LS1 (line 18) actuated and contacts X–LS1 closed, with switch X–LS3 (line 7) unactuated and open, and with switch X–LS2 (line 18) unactuated and closed. When switch X–LS4 (line 8) open, relay X–CR3 is de-energized, closing contacts X–CR3a (line 14).

At time T5, assuming that the gap between drums is correct, indicating that the relative speeds of the winding frames are correctly adjusted, drum 1 leaves position A, allowing light to strike photocell X–PC2 (line 12), closing its contacts and energizing relay X–CR5 (line 12) through contacts X–CR6a (line 12) and limit switch contacts X–LS5B (line 12).

When relay X–CR5 is energized, relay contacts X–CR5a (line 13) and X–CR5b (line 13) close, providing a holding circuit for relay X–CR5 through switch X–LS5B and energizing relay X–CR6 through contacts X–CR3a (line 14) and X–CR2a, X–CR5b and limit switch X–LS5B. When relay X–CR5 is energized, contacts X–CR5c (line 10) open, de-energizing relay X–CR4, opening contacts X–CR4c (line 22) and de-energizing clutch X–MC3. Contacts X–CR4b (line 21) close, applying brake X–MB2. Contacts X—CR6a (line 12) open, de-energizing relay X–CR5. This has no effect on X–CR9, as X–CR5g contacts have already closed. Contacts X–CR6b (line 15) close, providing a holding circuit for relay X–CR6. Relay contacts X–CR6d (line 21) open, releasing brake X–MB2, and contacts X–CR6c (line 22a) close, causing energization of clutch X–MC4, returning the rack to its initial position represented in FIG. 54a. On its way back, the rack deactuates switch X–LS1 (line 18).

When the rack has returned to its initial position at approximately time T7, contacts X–LS5A close without effect, and contacts X–LS5B open, causing de-energization of relay X–CR6, de-energizing clutch X–MC4 through opening of contacts X–CR6c and energizing brake MB2 through closing of contacts X–CR6d. Limit switch X–LS4 closes, energizing relay X–CR3.

At time T8 drum 2 obstructs light at point A darkening photocell X–PC2 causing photocell X–PC2 to open its contacts.

At time T9 drum 2 has passed point B permitting light to fall on photocell X–PC1, causing X–PC1b to open. This removes the current from line 6, de-energizing control relay X–CR7. At this time drum 2 continues to obstruct light at photocell X–PC2. The circuit then is in a condition at time T10 corresponding to its condition at time T1.

Referring now more particularly to FIG. 71, assuming that the gap between drums 2 and 1 is larger than the correct gap, indicating that the speed of the first winding frame is too low relative to the speed of the second winding frame, the operating conditions prior to time T5 are the same as previously described except that the rack moves a little more slowly.

Thus before time T5, the drum 1 departs from position A, causing contacts of photocell X–PC2 (line 12) to close. At time T5 the rack 1989 is in the position represented in FIG. 66c. In this condition, limit switch X–LS5 is unactuated, with contacts X–LS5A open and contacts X–LS5B closed, limit switch X–LS4 is actuated with its contacts closed, limit switch L–LS1 is actuated with its contacts closed, limit switch X–LS3 is unactuated with its contacts open, and limit switch X–LS2 is unactuated with its contacts closed. Relay X–CR3 remains energized at time T5 and contacts X–CR3a remain open, preventing energization of relay X–CR6. By the above-mentioned closing of X–PC2, relay X–CR5 is energized, causing contacts X–CR5 (line 30) to open and de-energizing brake X–MB1. With relays X–CR5 and X–CR3 energized, contacts X–CR5d and X–CR3b are closed, energizing clutch X–MC2. At time T5 when contacts X–CR5c open, relay X–CR4 is de-energized, opening contacts X–CR4c and closing contacts X–CR4b to de-energize clutch X–MC3 and energize brake X–MB2 to disconnect the drive for the rack from the first winding frame.

Referring to FIG. 66 for the moment, when clutch X–MC2 is energized, drive is supplied from shaft E, through chain and sprockets 1654, 1655, 1916 and shaft 1998 through gears 1962, 1961, magnetic clutch X–MC2, gears 1963, 1965 to the cage of differential B, through gears 1952, 1953 and through differential A to add shaft turns into the first winding frame, immediately to effect a decrease of the gap between drums 2 and 1. Also, drive is supplied through gears 1966, 1967, 1968 through shaft 1990 and gears 1969, 1970, and through chain and sprocket drive 1971, 1972, 1973 to the adjustable speed drive 1950 to decrease the average output speed of the drive to increase the speed of the first winding frame. Also, drive is supplied through shaft 1990 and gear box 1978 and differential C to continue to drive the rack upward to the position represented in FIG. 66b, causing X–LS4 to become unactuated shortly after time T5.

The gearing is such that when the rack reaches the correct position represented in FIG. 66b, the speed of the first winding frame has been partially corrected and the gap between drums has been completely corrected.

Referring to FIG. 71, shortly after time T5 switch X–LS4 becomes unactuated, opening its contacts and de-energizing relay X–CR3. When relay X–CR3 de-energizes, closing of contacts X–CR3c engages brake X–MB1 and contacts X–CR3b open, de-energizing clutch X–MC2. Closing of contacts X–CR3a energizes relay X–CR6 which, through contacts X–CR6c energize clutch X–MC4 to return the rack to its initial position represented in FIG. 66a, causing the limit switches X–LS1, X–LS4, X–LS5 and the relays they control to return to their initial conditions. As before when the second drum has traveled far enough to expose light from X–PC1, relay X–CR7 is de-energized.

Referring to FIGS. 66d and 72, assuming the gap between drums 2 and 1 is smaller than the correct gap, indicating that the speed of the first winding frame is too high relative to the speed of the second winding frame, the operating conditions prior to time T4 are the same as previously described in connection with the operation when the gap is correct and when the gap is larger than the desired value. Referring to FIGS. 66d and 72 shortly before time T5 switch X–LS4 becomes unactuated, de-energizing relay X–CR3. Switch X–LS3 becomes actuated shortly thereafter, energizing relay X–CR2. These events occur before actuation of X–PC2 since the gap is smaller this time, and a longer than normal time is required between darkening of X–PC1 and illumination of X–PC2.

After time T5 when the drum 1 departs from position A, the contacts of photocell X–PC2 (line 12) close, energizing relay X–CR5, opening contacts X–CR5c (line 10) and de-energizing relay X–CR4. When relay X–CR4 is de-energized, contacts X–CR4b (line 21) close, energizing brake X–MB2 and contacts X–CR4c (line 22) open de-energizing clutch X–MC3 to disconnect the drive for the rack from the first winding frame. When relay X–CR5 is energized, contacts X–CR5f (line 29) open, de-energizing brake X–MB1, and contacts X–CR5c actuate magnetic clutch X–MC1 through the already closed contacts X–CR2.

Referring to FIG. 66, power is fed from shaft E through chain and sprockets 1954, 1955, 1956, clutch X–MC1, gears 1964, 1965 to turn the cage of differential B, increasing the output speed of differential B, the cage speed of differential A and reducing the output speed of differential A. This reduces the speed of the first winding frame, which has the effect of subtracting turns from the first winding frame and increasing the gap. Also, drive is supplied through gears 1966, 1967, 1968 through shaft 1990 and gears 1969, 1970 and through chain and sprocket drive 1971, 1972, 1973 to the adjustable speed drive 1950 to increase the average output speed of the drive to decrease the speed of the winding frame. At the same time that the turns are subtracted, the rack is driven back to the correct gap position through shaft 1990, gear box 1978, gears 1979, 1980, shaft 1981, gears 1982, 1983 and differential C.

At time T6 when the rack is in the correct position, indicating that the full correction has been made, limit switch X–LS3 opens, de-energizing relay CR2. Contacts X–CR2b (line 27) open, de-energizing clutch X–MC1. Contacts X–CR2c (line 29) close, energizing brake X–MB1. Contacts X–CR2a (line 14) close, energizing relay X–CR6, which opens contacts X–CR6a (line 12) to de-energize relay X–CR5. Contacts X–CR6d (line 21) open, to de-energize brake X–MB2 and contacts X–CR6c (line 22A) close to energize clutch X–MC4 to return the rack to its initial or start position. The remaining action at times T7 and T8, FIG. 72, are as previously described.

Limit switch LS1 controls a sequence of operation when the gap is too large to correct and limit switch LS2 controls a sequence of operation when the gap is too small to correct. These sequences do not occur during normal operation of the machine and are, therefore, not described in detail herein. These sequences result in de-energization of relay X–CR9 (line 18) and shifting of its contacts X–CR9c (line 29) and X–CR9d which are connected in the main power source to the apparatus to stop the operation of the apparatus.

Description and explanation of operation of the first fabric let-off assembly As shown schematically in FIG. 1 and in more detail in FIGS. 33 and 64, there are two fabric let-off assemblies designated generally as 400 and 400A, in the machine. It is the function of the fabric let-off assemblies 400 and 400A to supply, upon demand, continuous sheets of coated weftless tire cord fabric (called, simply, "fabric" hereinafter), respectively, to the first and second winding frames 300 and 300A, the fabric supplied to the first or upstream winding frame 300 being helically wound at a predetermined pitch on the succession of axially interconnected drums driven axially and rotationally by the first winding frame 300 to form a continuous fabric tube comprising the first or inner carcass ply, and the fabric supplied to the second or downstream winding frame 300A being helically wound over the first ply at a predetermined pitch of opposite hand to form the second or outer carcass ply. The fabric supplied to the winding frames 300 and 300A by the fabric let-off assemblies 400 and 400A respectively must be and is supplied at precisely the desired pitch or angle with respect to the centerline of the advancing interconnected drums. Further, the fabric must be uniformly spread, and its edges must be reasonably precisely displaced transversely with respect to the path of travel of said fabric through said assembly into alignments, respectively, with two closely spaced helices on the lateral surfaces of the interconnected drums. This is necessary to ensure a closely controlled overlap of the edges of adjacent windings on the advancing drums. While a precise butting of the edges of adjacent windings would be ideal, a closely controlled overlap has been found more practical as avoiding the possibility of gaps. Except for being of opposite hand (because the first and second plies are wrapped in different directions), the two fabric let-off assemblies 400 and 400A are identical; so only the upstream fabric let-off assembly 400 supplying the first winding frame 300 will be described in detail herein.

Referring now particularly to FIG. 73, the fabric let-off assembly 400 is comprised of the following major subassemblies: the support frame 401, the fabric supply truck assembly 402, the fabric tensioning assembly 403, the fabric centering control assembly 404, the fabric width control assembly 405 and the tentering assembly 406. The frame 401 is comprised simply of a rigid structure 407 mounted on directionally fixed casters 408 (FIG. 74), 408′ and 408″. To or on frame 401, all of the other subassemblies of the let-off assembly 400 are fixedly or movably attached or mounted so that their relative positions and functions may be maintained while the entire let-off assembly 400 is moved relative to the winding frame 300 to adjust the angle of delivery of fabric to the winding frame 300 as will hereinafter be described.

The fabric supply truck assembly 402 is comprised of the wheeled truck 409 provided with an upstanding frame 409a, the wheels 409b on the truck being so oriented that the truck 409 may roll in a direction perpendicular to the direction of travel of the fabric 410 through the let-off assembly 400. Mounted in suitable bearings 409c is the fabric let-off roll or supply roll 411 from which the fabric 410 is released to the let-off assembly 400. The fabric 410 supplied on the drum 411 is wound with a liner 410a of plastic, uncoated fabric or other suitable material to prevent the successive windings of the tacky coated fabric 410 from sticking together. Means, not forming a part of this invention and not shown, are provided for replacing the roll 411 with a fresh roll of fabric when the fabric 410 on the roll 411 is exhausted. Alternatively, the supply roll 411 may be moved with the truck 409 to a separate station for rewinding while another truck and supply roll are substituted at the fabric let-off assembly 400. In such an event, the supply roll-liner roll drive S–M2 will be mounted on a separate truck and quick engagement means will be provided for engaging successive liner rolls with the drive and for disengaging them therefrom when the associated supply rolls are empty. The fabric 410 leaving the roll 411 is led over the polished metal light reflecting roller 412 mounted in suitable bearings 409d on the frame 409a and from thence is fed to the tensioning assembly 403. The liner 410a is led over the roll 412′ rotatably mounted on the frame 409a and, from thence, is wound upon the liner roll 409e (also rotatably mounted on the frame 409a). The liner roll 409e is driven, through suitable mechanical linkages 409f by the motor S–M2, the pull of the liner 410a providing the drive to rotate the fabric let-off roll 411.

Referring now to FIGS. 73 and 74, the fabric 410 passing over the roller 412 is next fed to the tensioning assembly 403. The tensioning assembly 403 comprises the dancer roll 413, rotatably mounted on shaft 413b which is, in turn, rotatably mounted in bearings 413a and 413a′ suspended from the piston rods 414a and 414a′ of pneumatic cylinder assemblies 414 and 414′. By this means, the dancer roll 413 is capable of upward and downward motion as well as rotation. The dancer roll shaft 413b is additionally provided at each end with pinions 413c and 413c′ which ride on the racks 413d and 413d′ mounted on the frame 407. It is the function of pinions 413d and 413d′ to keep the dancer roll 413 horizontal during its upward and downward motion. The fabric 410 passing over the roller 412 is next led downward and under the floating dancer roll 413 and then upward and over the idler roller 415 mounted in suitable bearings 415a and 415a′ on the top of the frame 407. It is the function of the pneumatic cylinder assemblies 414 and 414′, which are suspended from the frame 407 and are fed with air from a constant pressure regulated system, not shown, to maintain the proper tension in the fabric 410 passing through the let-off assembly 400.

The floating action of the dancer roll 413 has the additional function of maintaining a variable inventory of fabric 410 at this point in its passage from the let-off roll 411 to the winding frame 300. By this means the motor S–M2 driving the let-off roll 411 is permitted to operate intermittently to replenish this inventory whenever it is depleted, while there is always an inventory of the fabric 410 on hand to be drawn the balance of the way through the fabric let-off assembly 400 by the demand pull of the winding frame 300. When the inventory is so depleted that the dancer roll 413 has risen to a point where limit switch S–LS10 will be actuated by the switch-actuator 414b mounted on the piston rod 414a′, then the motor S–M2 (by electrical means hereinafter described) will be started to supply more fabric 410 to the inventory thereby lowering the dancer roll 413. When sufficient fabric 410 has been supplied, the dancer roll 413 will reach a low position where the switch actuator 414b will actuate limit switch S–LS9 shutting off the motor S–M2 until more fabric 410 is demanded. In the event that the motor S–M2 fails to start in response to the signal from limit switch S–LS10, then limit switch S–LS5 will be actuated by the dancer roll 413, thereby failing the entire machine. Similarly, in the event that actuation of limit switch S–LS9 fails to shut off motor S–M2, then limit switch S–LS6 will be actuated by the switch actuator 414b, thereby failing the entire machine.

Referring now particularly to FIGS. 73, 74, 74a and 74b, the means by which the fabric 410 unwinding from the roll 411 is substantially centered before passing to the width control assembly 405 will be described. As the dark, coated fabric 410 passes over the light reflecting roller 412 it will be readily apparent to one skilled in the art that the presence or absence of fabric 410 at any point on the surface of the roller 412 can be readily determined by directing a light source at said point on the surface of the roller 412 and providing a properly oriented photoelectric cell to receive the reflection therefrom. There will be relatively low intensity reflection from the dark fabric 410 and relatively high intensity reflection from the polished roller 412. Accordingly, four separate photoelectric cells (complete with associated light sources) S–PC1, S–PC2, S–PC3 and S–PC4 are provided on the machine adjacent to the roller 412 as shown in the figures. In FIG. 74b the relative locations (transverse to the path of travel of the fabric 410) of the reflection points or sensing points on the surface of roller 412 at which the presence or absence of fabric 410 is determined by the four photoelectric cell units S–PC1, S–PC2, S–PC3 and S–PC4 are shown schematically by the four so identified impingement and reflection paths when the fabric 410 is centered on the roller 412. It has been found that ⅛ inch is a satisfactory transverse distance between the sensing points for each pair of photoelectric cells, that is, between S–PC1 and S–PC2 straddling one edge of the fabric 410 and between S–PC3 and S–PC4 straddling the other edge.

The photoelectric cell units S–PC1 and S–PC2 are mounted (in accordance with the requirements set forth above) on a support plate 416 while the photoelectric cell units S–PC3 and S–PS4 are similarly mounted on a similar support plate 416′. Both support plates 416 and 416′ are, in turn, slidably mounted on elongated support means oriented parallel to the roller 412 comprising two parallel horizontal guide rods 417 and 417′, each said rod being affixed, at either end, to support brackets 418 and 418′ which are, in turn, each rigidly attached to the frame 407. Additionally, each support plate 416 and 416′ is provided with a threaded hole or bushing to mate with a power screw 419 rotatably mounted, at either end, in brackets 418 and 418′ and provided with threads of opposite hand at either end. The screw 419 is linked to and capable of being rotated (in either direction) by the motor S–M3 mounted on the support bracket 418. Affixed to the support plate 416′ is a rod 418a which passes slidably through a hole in the support bracket 418′ and is provided, at its end most remote from plate 416′, with a switch actuator 418b so arranged as to actuate limit switches S–LS7 or S–LS8 when the plate 416′ and rod 418a have traveled beyond predetermined limits in either direction under the drive of the screw 419.

Referring now particularly to FIGS. 73, 74 and 80, the balance of the fabric centering assembly 404 will be described. The truck 409 is provided with a depending plate 409g having a hole 409h therethrough. Mating with this hole 409h is a horizontal pin 420 mounted on the slider plate 420a which, in turn, is slidably mounted on the frame 407 so as to slide horizontally in the tracks 420b in a direction transverse to the path of travel of the fabric 410 through the let-off assembly 400. The slider plate 420a is, in turn, attached to the piston rod 421a of the hydraulic cylinder assembly 421. As is shown schematically in FIG. 157, hydraulic fluid may be admitted to either side of the hydraulic cylinder assembly 421 through a 3 position valve S–SV1 under the action of either solenoid S–S1A or solenoid S–S1B. In this manner the truck 409 can be moved transversely relative to the frame 407 either to the right or to the left (or may be held stationary) thereby shifting the fabric 410 to the right or to the left as it is released to the let-off assembly 400 from the supply roll 411.

While a complete discussion of the functioning of the fabric centering assembly 404 will be deferred until the associated electrical system has been described hereinafter, the major mechanical aspects thereof will be discussed briefly at this point in the description. The two plates 416 and 416′ are so mounted as to be, at all times, disposed equidistant from the longitudinal centerline of the fabric let-off assembly 400 and, consequently, from the longitudinal midpoint of the roller 412. Therefore, when photocell unit S–PC1 "sees" reflected light, photocell unit S–PC2 "sees dark," unit S–PC3 sees dark and unit S–PC4 sees light, the fabric 410 passing over the roller 412 is substantially centered in the fabric let-off assembly 400 within acceptable tolerance limits, and the respective edges of the fabric 410 are passing through the sensing zones defined respectively by the sensing points for photocell units S–PC1 and S–PC2 and the sensing points for photocell units S–PC3 and S–PC4. When either unit S–PC1 or unit S–PC4 sees dark while the other sees light or when either unit S–PC2 or unit S–PS3 sees light while the other sees dark a signal is transmitted causing the hydraulic cylinder assembly 421 to shift the truck 409 to the right or to the left to correct this off-center condition. When, due to variations in fabric width, all units see dark or all units see light, then it is impossible to determine the centered or off-center condition of the fabric; so a signal is first transmitted causing the motor S–M3 to drive the screw 419 until (as required) plates 416 and 416′ have either been spread far enough so that at least one unit (either S–PC1 or S–PC4) sees light again or until plates 416 and 416′ have been brought close enough together so that at least one unit (either S–PC2 or S–PC3) again sees dark. Then the fabric 410 is again centered, if necessary, as previously described.

After passing through their tensioning assembly, the centered fabric 410 is next drawn by the pull of the winding frame 300 up over the idler rollers 497a and 407b mounted on the top of the support frame 407 to the fabric width control assembly 405 which will now be described.

Referring now particularly to FIGS. 75 and 76, the principal working component of the fabric width control assembly 405 is the fabric spreading roll 422 which is rotatably mounted, by means of bearings 423 and 423′ on a fixed axle 424. Both the axle 424 and the spreading roll assembly 422, the composite lateral surface of which is substantially cylindrical, possess a common horizontal axis disposed in a direction perpendicular to the path of travel of the fabric 410 through the let-off assembly 400. The respective ends of the axle 424 are fixedly mounted, by means of the keys 424a and 424a′, in the support structure 425 attached to the frame 407.

The cylindrical lateral surface of the spreading roll assembly 422 is comprised of a plurality of steel helical coil springs 426 disposed external to the surface of the spreading roll drum 422′ so that adjacent springs 426 almost touch each other, the respective axes of all of said springs 426 being parallel to the rotational axis of the spreading roll assembly 422. Each extremity of each spring 426 is connected by means of an interference fit with an end plug 426a which, in turn, is connected by a tension rod 427 to one of a pair of circular end plates 428 and 428′, the connections between the tension rods 427 and the end plugs 426a and between the tension rods 427 and the end plates 428 and 428′ being universal connections 429. The end plates 428 and 428′ are mounted so as to rotate on bearings 430 and 430′ about hubs 430a and 430a′. It should be noted that the end plates 428 and 428′ are not necessarily parallel to each other or perpendicular to the axle 424.

It should also be especially noted that the end plates 428 and 428′ are capable of pivoting or tilting as described below about axes which are substantially coplanar with the axis of whichever spring 426 is successively in the uppermost position with respect to the spreading roll assembly 422, that is, the spring 426 which is so positioned that it is then establishing contact with the fabric 410 to be spread. As a result of this location of the axes of pivoting of the end plates 428 and 428′, it may be said that these axes of pivoting lie substantially in the plane of the fabric 410 as it establishes contact with the spreading means 422. The pivoting of the end plates 428 and 428′ about axes so located is advantageous by comparison to pivoting the end plates 428 and 428′ about axes located in any other plane, as, for instance the plane passing through the centerline axis, as viewed in FIG. 76, of the shaft 424 and the spreading roll assembly 422, since pivoting about any such other axes would result in the introduction of error into the corrective action of the spreading roll assembly 422 responsive to the respective transverse edge locations of the fabric 410 leaving said assembly 422. This corrective or compensatory action of the spreading roll assembly 422 is more fully discussed hereinafter.

The hubs 430a and 430a' which do not, in any operative position, touch the axle 424, are, in turn, fixedly mounted on a pair of lever plates 431 and 431' which have, as their respective fulcrums the trunnion mountings 432 and 432' on the support structure 425. The ends of the lever plates 431 and 431' on the other side of the trunnions 432 and 432' from the hubs 430a and 430a' are connected, respectively, by linkages 433 and 433' to the piston rods 434a and 434a' of the hydraulic cylinder assemblies 434 and 434', the cylinders 434b and 434b' of which are, in turn, fixedly mounted on the support structure 425. It will be noted that, as hydraulic fluid is admitted to either side of hydraulic cylinder assemblies 434 and 434', the resultant movements of the piston rods 434a and 434a' will, through the linkages 433 and 433' cause the lever plates 431 and 431' to increase or decrease the "angle of tilt" from the horizontal of hubs 430a and 430a'. Also, when hubs 430a and 430a' are tilted as shown in FIG. 76, the rotation of the drum 422', springs 426 and end plates 428 and 428' about the axle 424 will have the effect of causing each spring 426 to increase in length during its semicircumferential travel from its uppermost position to its lowermost position and to return to its original length during the completion of its rotation about the axle 424. Since, as shown in FIG. 75, the centered fabric 410 is held, by tension exerted by the winding frame 300 and the dancer roll 413, in non-slip contact with the springs 426 only as they are lengthening during their semicircumferential downward travel, the springs 426 apply a uniform stretch to the entire width of the fabric 410. It should be noted that the springs are made quite stiff to prevent the smaller force needed to stretch the fabric and the frictional forces on the springs from adversely affecting the uniformity of fabric stretch. The amount of this stretch is, of course dependent upon the angle of tilt from the vertical of end plates 428 and 428', although, in practice, some stretch is always applied.

Mounted, on brackets 425a attached to support structure 425, on either side of the path of travel of the fabric 410 as it loses contact with the fabric spreading roll 422 are identical (except for being of opposite hand) fabric edge control units 435 and 435a. Referring now particularly to FIGS. 75 and 78 one of these edge control units 435, which control the action of the fabric spreading roll 422 to insure that the fabric supplied to the winding frame 300 is not only centered but is always of constant predetermined width, will be described. A ⁹⁄₁₆ inch clearance is maintained between the fabric spreading roll 422 and the card cloth roll 463 around which the fabric 410 next proceeds after leaving the fabric spreading roll 422. This clearance permits the feeler 436 of the edge control unit 435 to contact and sense the location of the moving edge of the fabric 410. This feeler 436 pivots about and is free to rotate on the upstanding pin 437 which is fixed to the plate 438. Also freely and separately rotatably mounted on the pin 437 is the lever 439. This lever 439 is contacted, on its edge nearest the fabric 410, by a stop plate 440 fixedly fastened in a depending position to the underside of the feeler 436. This lever 439 is also attached to the feeler 436 by means of the tensioned coil spring 441, the pull of which keeps the lever 439 against the stop plate 440 when the feeler 436 is following the fabric 410 under "in-tolerance width conditions" so that, when the edge of the fabric 410 issuing from the spreading roll 422 is at or close to its proper location or alignment or is the fabric centerline than its proper location, the feeler 436 and the lever 439 will pivot about the pin 437 as a unit.

The arcuate surface 439' at the end of lever 439 most remote from the pin 437 contacts an arcuate surface 442' on the crank 442. The surfaces 439' and 442' are held in contact by the pull of the tensioned coil spring 443 which is attached to the crank 442 and the plate 438 so that, at or near desired fabric edge location conditions, any motion of the feeler 436 is translated, through the sliding rolling action of surfaces 439' and 442', into a rotation of crank 442 about the rotational axis of the shaft 444 of the "hydraulic relay" 445, the shaft 444 rotating with the crank 442 to which it is locked.

Referring now particularly to FIGS. 81 and 82 the structure and functioning of the identical "hydraulic relays" 445 and 445a will be described. It should be noted that there are commercially available hydraulic servo valves using the jet pipe principle described here. As the shaft 444 is rotated by the crank 442, the spool 446 is also rotated in the housing 447. Affixed to the spool 446 is the nozzle 448 through which is fed a constantly flowing stream of hydraulic fluid by way of the inlet passage 449 in the housing 447 and the port 446' through the spool 446 to the entrance of the nozzle 448. The stream of hydraulic fluid issuing from the nozzle 448 is directed at the port 450 or at the port 451 or at any point in between the ports 450 and 451 depending upon the degree of rotation of the shaft 444, spool 446 and nozzle 448, the distance between the ports 450 and 451 being small enough that when the nozzle 448 is rotated clockwise (as shown in FIG. 81) so that the fluid issuing therefrom no longer impinges on port 450 it will begin to impinge on port 451, there being no "dead" area of impingement between the ports 450 and 451. The nozzle guide 452 prevents the nozzle 448 from being directed to the right or to the left of both ports 450 and 451. Since the ports 450 and 451 are connected, by conduits 453 and 454, to opposite sides of the hydraulic cylinder assembly 434' a flow of hydraulic fluid will occur in the conduits 453 and 454 whenever the nozzle 448 is directed in any direction other than midway between the ports 450 and 451. When, for instance, the nozzle 448 is directed full at port 450 or more nearly at port 450 than at port 451, fluid will flow to the cylinder housing 434b' through conduit 453 and from the cylinder housing 434b' through the conduit 454, whereby the piston 434c', and piston rod 434a' will be moved to the right (as shown in FIG. 81). This causes the lever plate 431' (as shown in FIG. 76) to be moved to a more nearly vertical position which results in less spreading action being applied to the fabric 410 passing around the spreading roll 422. The opposite action occurs throughout the system when the nozzle 448 is directed full at or more nearly towards the port 451. Since this hydraulic system is a closed system, the same amount of fluid is constantly passed out of the housing 447 through the outlet port 455 (FIG. 82) as is admitted through the inlet port 449.

The action of the edge control unit 435a and its associated hydraulic system and "hydraulic relay" 445a with respect to the hydraulic cylinder assembly 434 is identical and, therefore, will not be described in detail herein. It should be noted that since the action of the fabric spreading roll 422 results in the application of a substantially uniform and equal stretch to each longitudinal half of the centered fabric 410, the feelers 436 and 436a following the opposite edges of the fabric 410 will normally move substantially in unison and in opposite directions, of course, and the distances by which the piston rods 434a and 434a' are extended from the cylinder housing 434b and 434b' will be substantially equal. In any event, since the springs 426 will be uniformly stretched throughout, the fabric will be uniformly spread, while any slight misalignments of the fabric edges relative to the desired alignments of the fabric edges will be corrected by transverse displacement of the fabric edges to the end that the edges of adjacent windings of the fabric 410 on the drums passing through the winding frame 300 will be applied to the drums with a substantially constant controlled overlap.

As previously noted, no useful purpose would be served by directing the nozzle 448 either to the right or to the left of both ports 450 and 451, and such an eventuality is prevented by the nozzle guide 452. However, in order to prevent the possibility of damage to the nozzle resulting from too great a torque being applied to the crank 442, the stops 456 and 457 are provided on the plate 438 (FIG. 78). These stops 456 and 457 may be adjusted so that the crank 442 may not be rotated so far in either direction as to cause the nozzle 448 to bear against the guide 452 and so that the stream of hydraulic fluid issuing from the nozzle 448 will always be directed either fully at port 450, fully at port 451 or in some intermediate direction.

In view of the action of the stops 456 and 457, it will be noted that, when the fabric 410 issuing from the spreading roll 422 becomes unusually narrow, the feeler 436 will lose contact with the fabric 410 after the lever 439 has contacted the stop 457. Under this condition the crank 442 will be held against the lever 439 by the spring 443 and the nozzle 448 will be directed fully at the port 451 causing a flow of fluid to the cylinder 434b' (FIG. 76) through the conduit 454 and causing a maximum rate of increase in the spreading action of the roll 422 until contact between the feeler 436 and the fabric 410 is again established. In the event that such contact is not established when the piston rod 434a' is fully retracted into the cylinder assembly 434', the switch actuator 434d' mounted on the rod 434a' will actuate limit switch S–LS3 shutting down the machine. Similar action in the opposite edge control unit 435a will ultimately result in the actuation of limit switch S–LS2, also shutting down the machine.

On the other hand, should the fabric 410 issuing from the spreading roll 422 become unusually wide, the crank 442 will rotate only until it contacts the stop 456, lever 439 coming to rest against the crank 442. However, the feeler 436 will continue to follow the edge of the fabric 410 by rotating about the pin 437 and the spring 441 will stretch to accommodate this relative rotation of the feeler 436 and the lever 439. Since, when the crank 442 is at rest against the stop 456, the nozzle 448 will be directed fully at the port 450 and the flow of fluid to the cylinder 434b' through conduit 453 will be at the maximum rate. The piston rod 434a' will extend from the cylinder assembly 434' at the maximum rate until the resultant action on the spreading roll 422 has caused the crank 442 to lose contact with the stop 456. If this has not occurred before the piston rod 434a' is fully extended, limit switch S–LS4 will be actuated by switch actuator 434d' thereby shutting down the machine. Similar action at the opposite edge control unit 435a will result in the actuation of limit switch S–LS1 thereby also shutting down the machine.

Referring now particularly to FIGS. 75 and 79, it may be seen that the plate 438 is attached to the hydraulic relay 445 and that attached to this assembly are a nut 458 and two guide bushings 459. By means of these guide bushings 459 the entire edge control unit 435 is slidably mounted on the transverse guide rod 460 which, in turn, is fixed to the bracket 425a so that the edge control unit 435 may slide horizontally thereon in a direction perpendicular to the path of travel of the fabric 410. By means of the hand wheel 462 and the screw 461, which mates with the nut 458, the location of the entire edge control unit 435 may be adjusted in a direction perpendicular to the path of travel of the fabric 410 in order to preset the desired width to which the fabric 410 is to be spread by the spreading roll 422.

As the fabric 410 leaves the spreading roll 422 it has previously been centered and spread to its desired width. In other words, the respective edges of the fabric 410 have been aligned with two closely spaced parallel helices on the lateral surfaces of the drums passing through the winding frame 300. It is now necessary to substantially maintain both edges in their respective desired alignments until the fabric 410 can be wound around the line of axially interconnected drums being driven through the winding frame 300. To accomplish this objective, the fabric 410 is first passed semicircumferentially around the card cloth covered roller 463 which is rotatably mounted in the position shown in FIG. 75 in the support frame 425. By this means, the direction of travel of the fabric 410 is again directed toward the winding frame 300 while the card cloth surface on the roller 463 prevents the fabric 410 from shifting transversely or shrinking in width. As may best be seen in FIG. 33, at this point in its travel, the edge of the fabric 410 nearest the winding frame 300 or, as it is hereafter called, the "inboard edge" will be very close to the point at which it will contact the advancing drums in the process of being wound thereon by the action of the winding frame 300. The edge of the fabric 410 most remote from the winding frame 300 or the "outboard edge" will, however, due to the angular orientation of the fabric let-off assembly 400 with respect to the winding frame 300, still be quite remote from its point of contact with the advancing drums. In view of this fact, if both edges of the fabric 410 were simply released upon leaving the card cloth roll 463, the inboard edge of the fabric 410 would be deposited almost without change in alignment upon the advancing drums, while the outboard edge would, because of the tendency of the fabric 410 to resume its condition before being spread by the roll 422, shift appreciably toward the inboard edge before contacting the drums. The net results would be a shifting (by varying distances) of all points on the fabric 410 toward the inboard edge, an uneven spread in the fabric as ultimately wound on the drums and a loss of control of the overlap of adjacent windings on the drums. To prevent these results, then, a mechanism has been provided to tenter the outboard edge so that it will be released from its alignment as fixed by the card cloth roll 463 only when said edge has reached a point at which its distance from the drums is as small as permitted by machine interferences.

Referring now particularly to FIGS. 77 and 77a, the tentering unit basically comprises a standard commercially available fabric edge tentering conveyor well known in the textile art. A series of spring-loaded tentering clips 464, each comprising a frame or body 465, a clamping lever 466 pivotally mounted with respect to the frame 465 by means of a fulcrum pin 467, and a leaf spring 468 affixed to the frame 465 and bearing against the lever 466, thereby tending to depress the clamping edge 466a of the lever 466 into clamping contact with the frame 465, are joined together to form an endless flexible chain 469. The chain 469 is mounted on the track 470 (see also FIG. 33) and travels in an endless path thereon passing around the driven sprocket 471 at the end of the track 470 nearest the card cloth roller 463 and around the idler sprocket 471' at the end of the track 470 nearest the winding frame 300. The length of the track 470 is adjustable in steps to keep the idler sprockets 471' as near the drums as possible for different angular positions of the track 470 with respect to the winding frame 300. A low torque drive is imparted to the driven sprocket 471 and the tentering clip chain 469 by the motor S–M1 through the drive chain 472a, magnetic slip clutch S–MC1 and rotating shaft system 472b. The clutch S–MC1 is so designed and adjusted as to transmit to the tentering clip chain 469 just sufficient driving force so as to substantially overcome the frictional drag of the chain 469 when tentering the fabric 410. Therefore, the winding frame 300, which actually provides the drive to move the fabric 410 through the entire fabric let-off assembly 400 exerts a substantially equal tensile force on both the inboard and outboard edges of the fabric 410.

As the outboard edge of the fabric 410 leaves the card cloth covered roller 463, the fabric 410 is picked up and intermediately tentered by the card cloth covered belt 473 which is not driven and is, therefore, dragged in an endless path by the fabric 410. This belt 473 engages the fabric 410 so as to leave the outboard edge thereof projecting. As each tentering clip 464 in the chain 469 reaches the driven sprocket 471, the top end of the clamping lever 466 is engaged and forced radially outward with respect thereto by the disc 474 which is mounted on and rotated by the same shaft system 472b as is the driven sprocket 471. The card cloth belt 473 continues to tenter the fabric 410 until the projecting outboard edge has travelled to a point where it will be clamped by the tentering clips 464.

This clamping action is achieved as follows. When the lever 466 of each clip 464 is rotated on its fulcrum pin 467 by coming in contact with the disc 474, the clamping edge 466a of the lever 466 is lifted from the frame 465 leaving a gap 475 between the clamping edge 466a and the frame 465. As each clip 464 then moves around the driven sprocket 471 and the disc 474, the projecting outboard edge of the fabric 410 becomes inserted into this gap 475. As the upper end of the lever 466 loses contact with the disc 474 the action of the spring 468 forces the lever 466 to rotate about the pin 467 to firmly clamp the outboard edge of the fabric 410 between the clamping edge 466a and the frame 465. It should be noted that any "pull" exerted by the fabric 410 tending to shrink to its unspread condition only serves to tighten the grip of the clip 464 on the fabric 410.

When clip 464 reaches the end of the track 470 nearest the winding frame 300 (see FIG. 33) and is about to engage the idler sprocket 471', its lever 466 is contacted and again rotated by a similar disc 474' which causes the fabric 410 to be successively released by each clip 464 at a location as near to the point of its being laid down on the drums advancing through the winding frame 300 as is permitted by machine interferences.

The necessity and means for centering the fabric 410 quite exactly in the fabric let-off assembly 400 and for spreading and thereafter tentering said fabric 410 to desired width until it is wrapped on the drums advancing through the winding frame 300 have already been described. As previously indicated one further quality of the fabric delivered to the winding frame 300 from the fabric let-off assembly 400 must be closely controlled. This is the pitch of the fabric as wound on the drums which is determined by the angular orientation $\alpha$, in a horizontal plane, of the centerline of the fabric 410 delivered to the winding frame 300 with respect to the longitudinal axis of the locked drums passing through the winding frame 300 (FIG. 33). This angle $\alpha$ must be equal to the angle $\beta$ formed by the plane of rotation of the drive wheels 302 with the longitudinal axis of the locked drums advancing through the winding frame 300 although these respective angles $\alpha$ and $\beta$ will fall on opposite sides of the axis of the advancing drums. The angular orientation $\alpha$ of the fabric 410 with respect to the winding frame 300 is controlled by manually adjusting the angular orientation of the entire fabric let-off assembly 400 with respect to the winding frame 300 at the same time as the angular orientations $\beta$ of the drive wheels 301, 302 and 303 are adjusted. This will always be when the machine is not in operation. Improper orientation of the let-off assembly 400 will result in the fabric 410 being subjected to bending in its own plane, and the ultimate effect will be wrinkles in the carcass plies.

Referring now particularly to FIG. 33, the entire fabric let-off assembly 400 is pivotally attached, at the pivot point 476, to a thrust bearing mounted on a cross-piece 315d which, in turn, is fixedly mounted atop the side frames 315b and 315c of the winding frame 300. The entire fabric let-off assembly 400 may be rolled about the pivot point 476 on the casters 408, 408' and 408'' (see FIGS. 73 and 74). To fix as well as to change the angular orientation of the fabric let-off assembly 400 about the pivot point 476, the fabric let-off assembly 400 is attached to the frame of the drum loader 200 by means of a screw 477 provided with a handwheel 478 rotatably attached to said frame. Screw 477 mates with a nut 479 affixed to the frame 407 of the fabric let-off assembly 400. The angular orientation of the path of the fabric 410 with respect to the winding frame 300 is at all times indicated by the pointer 480 mounted on the cross-piece 315d and the protractor 481 mounted on the let-off assembly 400.

Referring now particularly to FIG. 83, the operation of the electrical drive and control system for the fabric let-off assembly 400 will be described. As a starting point in this description it will be assumed that the machine and the fabric let-off assembly 400 are in normal automatic operation, that the fabric 410 just supplied and/or being supplied to the let-off assembly 400 from the fabric supply roll 411 is perfectly centered, that photoelectric cell units S–PC1 and S–PC4 are "seeing light" while photocell units S–PC2 and S–PC3 are "seeing dark," that the edge control units 435 and 435a are detecting fabric 410 of the exactly desired width, each edge of the centered fabric 410 being, therefore, in alignment with the intended helix of application of said edge to the axially interconnected drums, that the dancer roll 413 is in a position intermediate between limit switches S–LS9 and S–LS10, that the motor S–M2 is not running, and that the winding frame 300 is drawing fabric 410 through the let-off assembly 400. The electrical conditions in the control system, then, are as follows: main switch S–S1 (lines 1–3) is closed supplying 220 volt, three phase current to the motor drive system; transformer S–T1 (lines 14–15) is, therefore, energized supplying 110 volt, single phase current to the control system; limit switch contacts S–LS1 (line 17), S–LS2 (line 17), S–LS3 (line 17), S–LS4 (line 17), S–LS5 (line 17), S–LS6 (line 17), S–LS7A (line 17), S–LS8A (line 17), S–LS7B (line 43) and S–LS8B (line 45) are all closed, none of these switches being actuated; control relay S–CR1 (line 17) has previously been energized by momentarily closing the start button S–PB1 (line 17) and is now locked in by a closed relay contact S–CR1a (line 18); relay contact S–CR1b (line 43) is closed providing a path for energization of the fabric centering controls; relay contact S–CR1c (line 51) is closed and contact S–CR1d (line 51) is open signalling the main panel that the fabric let-off assembly 400 is in operating condition; motor relay S–MR1 (line 41) is energized and relay contacts S–MR1a (line 1), S–MR1b (line 2), S–MR1c (line 3) and S–MR1d (line 36) are closed; motor S–M1 (lines 1–3), the tentering drive, is running and the magnetic slip clutch S–MC1 (line 36) is energized through contact S–MR1d (line 36) and power supply S–PW1 (line 32); motor relay S–MR2 (line 37) is unenergized, limit switch contact S–LS10 (line 38) being open and unactuated and locking contact S–MR2d (line 37) being open; contacts S–MR2a (line 4), S–MR2b (line 5) and S–MR2c (line 6) are open and motor S–M2 (lines 4–6), the fabric supply motor, is not running; limit switch S–LS9 (line 37) is closed and unactuated; the various photocell actuated contacts are in the following conditions (their respective closing conditions being also indicated as follows: DC—closed when "seeing dark," LC—closed when "seeing light"): S–PC1A (LC) (line 43) is closed, S–PC1B (DC) (line 45) is open, S–PC2A (LC) (line 43) is open, S–PC2B (DC) (line 46) is closed, S–PC2C (LC) (line 47) is open, S–PC3A (LC) (line 43) is open, S–PC3B (LC) (line 46) is open, S–PC3C (DC) (line 47) is closed, S–PC4A (LC) (line 43) is closed, S–PC4B (DC) (line 45) is open and S–PC4C (DC) (line 48) is open; motor relays S–MR3 (line 45) and S–MR4 (line 43) are unenergized, contacts S–MR3a (line 7), S–MR3b (line 8), S–MR3c (line 9), S–MR4a (line 10), S–MR4b (line 11) and S–MR4c (line 12) are open, and motor S–M3 (lines 7–9) is not running in either direction; contacts S–MR3d (line 43), S–MR4d (line 45), S–MR3e (line 49) and S–MR4e (line 49) are closed; control relays S–CR2 (line 46) and S–CR3 (line 48) are not energized; relay contacts S–CR3a (line 49) and S–CR2b (line 50) are therefore, open while contacts S–CR2a (line 49) and S–CR3b (line 50) are closed; and solenoids S–S1A (line 49) and S–S1B (line 50) are not energized, hence solenoid valve S–SV1 (FIG. 80) is closed.

Considering first the operation of the supply truck assembly 402 and the fabric tensioning assembly 403, as the winding frame 300 continues to draw fabric 410 through the left-off assembly 400, the dancer roll 413 rises until the switch actuator 414b contacts and actuates limit switch S–LS10 closing switch contact S–LS10 (line 38). This action completes a circuit through S–LS10 (line 38) and S–LS9 (line 37) energizing motor relay S–MR2 (line 37). Contact S–MR2d (line 37) closes locking in relay S–MR2 (line 37) and contacts S–MR2a (line 4), S–MR2b (line 5) and S–MR2c (line 6) close starting motor S–M2 (lines 4–6). As fabric 410 is fed to the fabric tensioning assembly 403 from the fabric supply roll 411, the dancer roll 413 and the switch actuator 414b descend deactuating limit switch S–LS10. Contact S–LS10 (line 38) opens, but relay S–MR2 (line 37) remains locked in through contacts S–MR2d (line 37) and S–LS9 (line 37).

When the dancer roll 413 has descended far enough (and the tensioning assembly 403 has its full inventory of fabric 410) the switch actuator 414b actuates limit switch S–LS9 opening contact S–LS9 (line 37) and thereby de-energizing relay S–MR2 (line 37). Contacts S–MR2a (line 4), S–MR2b (line 5), S–MR2c (line 6) and S–MR2d (line 37) open and motor S–M2 (lines 4–6) stops. Then, as the dancer roll 413 again begins to rise, contact S–LS9 (line 37) again closes readying a path for the next energization of relay S–MR2 (line 37).

If the dancer roll 413 and the switch actuator 414b should override limit switch S–LS10 to actuate switch S–LS5, contact S–LS5 (line 17) will open de-energizing the fail relay S–CR1 (line 17) and shutting down the entire machine. Similarly, an override of switch S–LS9 causes contact S–LS6 (line 17) to open shutting down the entire machine before apparatus or fabric can be damaged.

Considering now the operation of the fabric centering control assembly 404, it will be apparent that the following several conditions will cause this control system to act:
(1) Photocell S–PC1 sees dark.
(2) Photocell S–PC4 sees dark.
(3) Photocell S–PC2 sees light.
(4) Photocell S–PC3 sees light.
(5) Photocell S–PC1 sees dark while S–PC3 sees light.
(6) Photocell S–PC4 sees dark while S–PC2 sees light.
(7) Photocells S–PC1 and S–PC4 both see dark.
(8) Photocells S–PC2 and S–PC3 both see light.

The first six of these conditions indicate that the fabric "wandered" off center on the roller 412 while the last two indicate that the fabric 410 has varied in width and may have wandered off center.

Under condition 1, contact S–PC1A (LC) (line 43) will open but no action will result. Contact S–PC1B (DC) (line 45) will close energizing relay S–CR2 (line 46). Contact S–CR2a (line 49) will open but no action will result; however contact S–CR2b (line 50) will close energizing solenoid S–S1B (line 50), which, in turn, opens solenoid valve S–SV1 (FIG. 80) to admit fluid to cylinder 421 so as to retract the piston rod 421a and move the truck 409 to correct the fabric wander. When sufficient correction has been applied so that S–PC1 again sees light, contact S–PC1A (LC) (line 43) will close, and contact S–PC1B (DC) (line 45) will again open de-energizing relay S–CR2 (line 46). Contact SCR2a (line 49) will close and contact S–CR2b (line 50) will open, de-energizing solenoid S–S1B (line 50), and closing valve S–SV1 restoring the circuit to normal with the truck 409 remaining in its new position.

Under condition 2, contact S–PC4A (LC) (line 43) will open but no action will result. Contact S–PC4B (DC) (line 45) will close, but no action will result because S–PC1B (DC) (line 45) and S–PC3B (LC) (line 46) remain open. Contact S–PC4C (DC) (line 48) will close energizing relay S–CR3 (line 48). Contact S–CR3b (line 50) will open insuring that solenoid S–S1B (line 50) will not become energized, and contact S–CR3a (line 49) will close energizing solenoid S–S1A (line 49). Valve S–SV1 (FIG. 157) will be opened to admit fluid to cylinder 421 moving the truck 409 in the opposite direction from the movement under condition 1 until the wander is corrected and S–PC4 again sees light. The circuit will then be restored to normal in a manner similar to that described under condition 1.

Under condition 3, contact S–PC2A (LC) (line 43) will close, but no action will result since contact S–PC3A (LC) (line 43) remains open. Contact S–PC2B (DC) (line 46) will open but no action will result. Contact S–PC2C (LC) (line 47), however, will close energizing relay S–CR3 (line 48) which results in the same corrective action as in condition 2 above.

Under condition 4, contact S–PC3A (LC) (line 43) will close, but no action will result since S–PC2A (LC) (line 43) remains open. Contact S–PC3C (DC) (line 47) will open preventing relay S–CR3 (line 48) from becoming energized. Contact S–PC3B (LC) (line 46) will close energizing relay S–CR2 (line 46) which results in the same corrective action as in condition 1 above.

Under condition 5, contact S–PC1A (LC) (line 43) will open and contact S–PC3A (LC) (line 43) will close, but no action will result since these two actions neutralize each other and, in any event, contact S–PC2A (LC) (line 43) remains open. Contact S–PC1B (DC) (line 45) will close and contact S–PC3B (LC) (line 46) will close providing parallel paths for the energization of relay S–CR2 (line 46). Then the same corrective action will occur as under conditions 1 and 4 above.

Under condition 6, contact S–PC4A (LC) (line 43) will open and contact S–PC2A (LC) (line 43) will close, but no action will result since these two actions neutralize each other and, in any event, contact S–PC3A (LC) (line 43) remains open. Contact S–PC4B (DC) (line 45) will close and contact S–PC2B (DC) (line 46) will open, no action resulting as contacts S–PC1B (DC) (line 45) and S–PC3B (LC) (line 46) remain open. Contacts S–PC2C (LC) (line 47) and S–PC4C (DC) (line 48) will both close providing parallel paths for the energization of relay S–CR3 (line 48) and the same corrective action will occur as under conditions 2 and 3 above.

Under condition 7, contacts S–PC1A (LC) (line 43) and S–PC4A (LC) (line 43) open, contacts S–PC2A (LC) (line 43) and S–PC3A (LC) (line 43) already being open; so motor relay S–MR4 (line 43) does not become energized. Contact S–PC1B (DC) (line 45) closes energizing relay S–CR2 (line 46) and contact S–PC4C (DC) (line 46) closes energizing relay S–CR3 (line 48). Contacts S–CR3a (line 49) and S–CR2b (line 50) close, but contacts S–CR2a (line 49) and S–CR3b (line 50) open; so neither solenoid S–S1A (line 49) nor solenoid S–S1B (line 50) become energized because, until the location of at least one edge of the fabric 410 is determined by the control system, it will not be apparent whether the cart 409 should be shifted to the right or to the left or should be held stationary. Contact S–PC4B (DC) (line 45) will close energizing motor relay S–MR3 (line 45). Contacts S–MR3a (line 7), S–MR3b (line 8) and S–MR3c (line 9) will close starting motor S–M3 (lines 7–9) rotating in such a direction that supports 416 and 416′ carrying, respectively, photocell units S–PC1 and S–PC4, will move apart at equal rates until either S–PC1 or S–PC4 or both see light again. Simultaneously, contact S–MR3d (line 43) will open doubly insuring that relay S–MR4 (line 43) will not become energized and contact S–MR3e (line 49) will open doubly insuring that neither solenoid S–S1A nor solenoid S–S1B become energized. If neither S–PC1 nor S–PC4 sees light unitl they have spread to accommodate the maximum fabric width limit which the let-off assembly 400 will tolerate, limit switch S–LS8 will be actuated. Contact S–LS8B (line 45) will be opened de-energizing motor relay S–MR3 (line 45) and contact S–LS8A (line 17) will open shutting down the entire machine by de-energizing the fail relay S–CR1 (line 17).

As soon, however, as either S–PC1 or S–PC4 sees light (before reaching the fail limit) contact S–PC1B (DC) (line 45) or contact S–PC4B (DC) (line 45) will open de-energizing relay S–MR3 (line 45) and stopping motor S–M3 (lines 6–9). It will then be apparent whether condition 1 or condition 2 exists and the control system will react accordingly, or in the event that both S–PC1 and S–PC4 should again see light simultaneously, then it will be apparent that no wander correction will be required and that all components will return to their "normal" condition as described at the commencement of this discussion of the electrical system.

Under condition 8, contacts S–PC1A (LC) (line 43), S–PC2A (LC) (line 43), S–PC3A (LC) (line 43) and S–PC4A (LC) (line 43) will all be closed energizing motor relay S–MR4 (line 43). Contacts S–MR4a (line 10), S–MR4b (line 11) and S–MR4c (line 12) will close starting motor S–M3 (lines 6–9) rotating in the opposite direction from its direction of rotation under condition 7, and photocell units S–PC2 and S–PC3 will travel toward each other until one or both of them again see light or until limit switch S–LS7 is actuated when the distance between S–PC2 and S–PC3 equals the minimum fabric width which the let-off assembly 400 will tolerate, in which latter event contacts S–LS7B (line 43) and S–LS7A (line 17) will open shutting off motor S–M3 and failing the entire machine. Neither relay S–CR2 (line 46) nor relay S–CR3 (line 48) will become energized because contacts S–PC2B (DC) (line 46) and S–PC3C (DC) (line 47) will open. Contacts S–MR4d (line 45) and S–MR4e (line 49) will open doubly preventing, respectively, the energization of relay S–MR3 (line 45) and solenoids S–S1A (line 49) and S–S1B (line 50).

When, short of fail width, either S–PC2 or S–PC3 again sees dark, contact S–PC2A (LC) (line 43) or S–PC3A (LC) (line 43) will open de-energizing relay S–MR4 (line 43) and shutting off motor S–M3 (lines 6–9), and the control system will be returned to normal, to condition 3, or to condition 4 as the case may be. If both S–PC2 and S–PC3 see dark simultaneously, the control system will be returned to the normal conditions first described, no wander correction being required.

It will be apparent to one skilled in the art that, while after each of the aforementioned error conditions has been corrected the control system will tend to return to normal, in the actual operation of the fabric let-off assembly 400, the aforementioned conditions may shift almost constantly without necessarily achieving a normal condition between the various adjustments conditions. For instance, the control system may go from "normal" to condition 1 to condition 5 to condition 1 to condition 7 to condition 4 to normal again. The sequence of operation of the control system in such a situation will be readily apparent, however, from FIG. 160 and from the foregoing discussion, to one skilled in the art.

Finally, in the event that any of the limit switches S–LS1, S–LS2, S–LS3 or S–LS4 should become actuated by virtue of the fabric spreading assembly 405 not being able to spread the fabric 410 to the desired width, contacts S–LS1 (line 17) S–LS2 (line 17), S–LS3 (line 17) or S–LS4 (line 17) will open de-energizing relay S–CR1 (line 17) and failing the entire machine.

From the foregoing description it will be apparent that an apparatus and method in accordance with the invention have many advantages. The apparatus and method of the present invention are operative as a fully integrated and automatic machine and method capable of making tire carcasses of uniform quality at a high production rate. While the apparatus has been described in connection with the manufacture of two-ply carcasses, it will be obvious to those skilled in the art that tire carcasses of a different number of plies, for example, four plies, can be readily constructed by apparatus in accordance with the invention by utilizing additional units such as fabric let-off units, winding frames, cutters, and transfer apparatus operatively synchronized and controlled in a manner similar to corresponding units described in the specification. Also, the apparatus can be used to fabricate carcasses of different sizes when drums of different lengths are intermixed or substituted in the apparatus, by controlling the relative speeds of the winding frames automatically to maintain synchronization of the winding frames with the turrets in accordance with the individual drum lengths. Thus, by feeding longer or shorter drums into the apparatus, longer or shorter carcasses may be produced within tolerances determined by the settings of the various photocells and limit switches, for example, the limit switches actuated by the rack of the gap control apparatus to control the relative speeds of the winding frames.

Further, the band-positioning apparatus has the advantage that it is automatically capable of extending retracted bands of the drums prior to their entrance into a drum loader. The drum loader has the advantage that it is capable of automatically feeding drums into a winding frame at a desired rate while supporting a central cam.

The drum has the advantage of being readily and selectively interconnectable with like drums. The cam has the advantage of controlling the coupling of the drums while aiding in controlling the operation of the cutter. The winding frames have the advantage of supporting and driving the drums at accurately synchronized speeds in cooperation with fabric let-off units which accurately supply fabric to the drums on the winding frames, with controlled overlap of adjacent windings and without wrinkling the fabric. The gap control apparatus has the advantages of maintaining a predetermined gap between drums and of correcting gap errors both immediately and also on an average basis. Also, the gap control correction is measured between a drum pushed by the line of drums in the first winding frame and a drum connected to the line of drums in the second winding frame. The correction occurs immediately in less than the passage time of one drum along the gap-measuring apparatus. The cutter has the advantages of being synchronized for travel with the drums and of automatically, circumferentially severing the fabric between the drums while traveling.

The transfer apparatus has the advantage of utilizing rollers effective to transfer rotating and non-rotating drums between winding frames to a turret loader. For this purpose, the transfer apparatus utilizes a friction drive roller which have a polyurethane covering, and roller-driving means for driving the roller at a speed intermediate the approach speed of the drum and the speed of the line of drums being approached. The roller-driving means includes a clutch which slips when more than a predetermined torque is applied thereto upon impact with the line of drums. The transfer apparatus also indicates the rotation of a drum at a predetermined point.

The apparatus and method of the invention may also be used advantageously to manufacture tubular bands such as, for example, two-ply carcass structures having no beads and carcass structures in which one of the plies is a liner for tubeless tires.

Another advantage of the apparatus is the utilization of fabric having longitudinal cords therein, thereby avoiding the necessity of bias-cutting and splicing fabric. The angle of wrap of the fabric can be readily altered and the width of the fabric may be altered as desired to control the cord angle of the carcass. During such changes the point of contact of each drive wheel with the ply-bearing drum remains the same because the axis of rotation of each adjustable frame supporting the drive wheel is normal to and intersects the axis of rotation of the corresponding drive wheel and is normal to and intersects the longitudinal axis of the drums.

The terms "fabric" and "sheet material" are used interchangeably herein.

While there have been described what are at present considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. Apparatus for making tubular bands of sheet material comprising: a plurality of axially aligned drums; means for interconnecting said drums to preserve predetermined spacings therebetween; means for continuously supplying sheet material to said drums; means for driving said drums axially and rotationally along a fixed path of motion to wind said sheet material helically around said drums, thereby to fashion said sheet material into a tubular structure on said drums; and means responsive to the position of said drums along their path of motion for actuating said interconnecting means.

2. Apparatus of claim 1 further comprising means for cutting the sheet material between adjacent drums along their path of motion.

3. Apparatus in accordance with claim 1 for making tubular bands of sheet material which includes a plurality of means for continuously supplying plies of sheet material to said drums; means for driving said drums axially and rotationally along a fixed path of motion to wind the plurality of plies of sheet material each helically around said drums, thereby to fashion a plurality of tubular plies of sheet material on said drums; and at least one means for cutting said tubular plies into tubular bands of sheet material.

4. Apparatus in accordance with claim 1 for making tubular plies of sheet material which includes cam means extending longitudinally through said drums for actuating said connecting means to control the interconnection of said drums in accordance with the position of said drums along said cam means.

5. Apparatus for fashioning sheet material into tubular ply bands comprising: a plurality of axially aligned drums; means for interconnecting said drums end to end; cam means for actuating said interconnecting means to connect and disconnect said drums; means for continuously supplying sheet material to said drums; means for axially rotating said drums; means to provide relative translational motion between said drums and said sheet material supply means; and means for severing the tube of sheet material thus formed on each drum from the remainder of said sheet material.

6. The apparatus of claim 5 further comprising means for removing the drum containing the tube of sheet material severed from the remainder of said sheet material to a position exposing at least one end of said tube of sheet material for subsequent operation on said end.

7. The apparatus of claim 6 further comprising means for removing said tubular ply bands of sheet material from said drums.

8. Apparatus in accordance with claim 1 for making tire carcass plies in which said plurality of axially aligned drums includes a plurality of movable fingers at one end of each drum and a generally tapered device having a plurality of axially spaced recesses at the other end of each drum, the fingers of each drum being adapted to register with a selected recess in the tapered device of the adjacent drum for interconnecting said drums with predetermined spacings therebetween; the apparatus also including cam means fixedly positioned with respect to said support means and extending longitudinally through said drums for actuating said connecting means to control the interconnection of said drums in accordance with the position of said drums along said cam means.

9. Apparatus in accordance with claim 1 for making tire carcass plies which includes an elongated substantially cylindrical cam shaft of stepped diameter fixedly positioned with respect to said support means and extending longitudinally through said drums for actuating said connecting means to control the interconnection of said drums in accordance with the position of said drums along said cam shaft.

10. Apparatus in accordance with claim 1 for making tire carcass plies which includes elongated support means for said drums; an elongated substantially cylindrical cam shaft of stepped diameter extending longitudinally through said drums; clamp means spaced along said support means for supporting one end of said cam shaft in fixed relation to said support means, the other end of said cam shaft being supported by said drums; said cam shaft being effective to actuate said connecting means to control the interconnection of said drums in accordance with the position of said drums along said cam shaft.

11. Apparatus in accordance with claim 10 for making tire carcass plies which includes cutting means to cut said sheet material between said drums into distinct cylinders of fabric.

12. Apparatus for making tire carcass plies comprising: a plurality of displaceable axially aligned drums including means for interconnecting said drums with first and second predetermined spacings therebetween; fixedly positioned cam means extending axially through said drums for actuating said connecting means to control the interconnection of said drums in accordance with the position of said drums along said cam means; first supply means for continuously supplying sheet material to said drums; first winding means for driving said drums, maintained at said first predetermined spacing, axially and rotationally past said first supply means, to wind said sheet material helically around said drums to form a first ply for tire carcasses; means for cutting the sheet material between drums; second supply means for continuously supplying sheet material to said drums; and second winding means for driving said drums maintained at said second predetermined spacing axially and rotationally past said second supply means, to wind the fabric helically around the drums to form a second ply for tire carcasses; second cutting means for cutting the fabric between drums to form individual windings of sheet material on each drum; and driving means for advancing said drums between said first and second winding means.

13. Apparatus in accordance with claim 12 for making tire carcass plies in which said connecting means includes a plurality of movable fingers at one end of each drum and a generally tapered device having a plurality of axially spaced recesses at the other end of each drum, the fingers of each drum being adapted to register with a selected recess in the tapered device of the adjacent drum for interconnecting said drums with predetermined spacings between.

14. Apparatus in accordance with claim 12 for making tire carcass plies in which said first winding means drives said drums axially and with a first rotation to wind the sheet material helically around said drums in a given sense to form a first tire carcass ply; and in which said second winding means drives axially and with a rotation opposite to said first rotation to wind the sheet material helically around said drums in the opposite sense to form a second ply for tire carcasses.

15. Apparatus in accordance with claim 12 for making tire carcass plies which includes means interconnecting said first and second winding means for maintaining a predetermined average ratio between the speeds of said drums driven by said first and said second winding means and effective to correct errors in the ratio of said speeds, to cause said first and second winding means to transport the same number of drums in a given time interval.

16. Apparatus in accordance with claim 12 for making tire carcass plies in which said connecting means is effective to interconnect drums while said drums travel along said first winding means and said first cutting means and in which said connecting means is effective to disconnect said drums as said drums emerge from said cutting means; in which said connecting means is effective to interconnect said drums while said drums travel along said second winding means and said second cutting means and in which said connecting means is effective to disconnect said drums as said drums emerge from said second winding means.

17. In apparatus for making tire carcass plies, a drum loader comprising elongated support means; a plurality of axially aligned drums displaceable along said support means and including means for interconnecting said drums with predetermined spacings therebetween; an elongated, substantially cylindrical cam member of stepped diameter fixedly positioned with respect to said support means and extending axially through a portion of said drums for actuating said connecting means, thereby controlling the interconnection of said portion of drums in accordance with their position along said cam member; means for driving said drums along said support means; two pairs of retractable clamps spaced along said support, the distance therebetween being greater than one drum length, for supporting one end region of said cam member, said portion of drums supporting the remainder of said cam member; and means responsive to the position of said portion of drums along said support means for successively opening only one of said pairs of clamps at a time to allow another drum to join said portion of drums.

18. A drum loader in accordance with claim 17 in which said cam member is effective to cause rotational axial interconnection of said drums after said drums move along said support means beyond said second pair of clamps.

19. In apparatus for making tire carcass plies, a drum loader comprising: elongated support means; a plurality of axially aligned drums displaceable along said support means and including means for interconnecting said drums with predetermined spacings therebetween; an elongated cylindrical cam member of stepped diameter fixedly positioned with respect to said support means and extending axially through a portion of said drums for actuating said connecting means, thereby controlling the interconnection of said portion of drums in accordance with their position along said cam member; means for driving said drums along said support means; and means responsive to the rotation of a drum for indicating whether said drums are interconnected to prevent susbtantial relative rotation therebetween during movement along said elongated support means.

20. The apparatus of claim 17 wherein each of said retractable pairs of clamps grips said cam member along a surface normal to the axis of said cam member, thereby preventing axial displacement of said cam member.

References Cited

UNITED STATES PATENTS

| | | | |
|---|---|---|---|
| 1,708,129 | 4/1929 | Gammeter | 156—187 |
| 1,733,405 | 10/1929 | Gammeter | 156—132 |
| 2,071,716 | 2/1937 | Wikle | 156—396 |
| 2,319,643 | 5/1943 | Sternad et al. | 156—396 |
| 2,818,907 | 1/1958 | Sapp | 156—396 |
| 3,216,879 | 11/1965 | Mallory et al. | 156—396 X |
| 3,223,573 | 12/1965 | Deist | 156—405 X |

EARL M. BERGERT, *Primary Examiner.*

H. ANSHER, *Assistant Examiner.*